(12) United States Patent
Walker et al.

(10) Patent No.: US 7,826,923 B2
(45) Date of Patent: *Nov. 2, 2010

(54) PRODUCTS AND PROCESSES FOR VENDING A PLURALITY OF PRODUCTS

(75) Inventors: Jay S. Walker, Ridgefield, CT (US); Paul T. Breitenbach, Wilton, CT (US); Daniel E. Tedesco, Shelton, CT (US); Sih Y. Lee, Northvale, NJ (US); Paul D. Signorelli, Ridgefield, CT (US); Geoffrey M. Gelman, Brooklyn, NY (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 635 days.

This patent is subject to a terminal disclaimer.

(21) Appl. No.: 11/530,279

(22) Filed: Sep. 8, 2006

(65) Prior Publication Data

US 2007/0100649 A1    May 3, 2007

Related U.S. Application Data

(63) Continuation-in-part of application No. 10/902,397, filed on Jul. 29, 2004.

(60) Provisional application No. 60/715,088, filed on Sep. 8, 2005.

(51) Int. Cl.
*G06F 17/00* (2006.01)

(52) U.S. Cl. .................. 700/238; 700/236; 700/237; 700/240; 700/242; 705/16

(58) Field of Classification Search ............. 700/236, 700/237, 238, 240, 242; 705/16
See application file for complete search history.

(56) References Cited

U.S. PATENT DOCUMENTS

| 2,607,463 | A | 8/1952 | Saigh |
| 3,442,442 | A | 5/1969 | Neidig |
| 3,573,747 | A | 4/1971 | Adams et al. |
| 3,609,250 | A | 9/1971 | Morris |
| 3,688,276 | A | 8/1972 | Quinn |

(Continued)

FOREIGN PATENT DOCUMENTS

CA    2 070 736    6/1992

(Continued)

OTHER PUBLICATIONS

Brochure, "Introducing the Digital MenuBoard", Siren Technologies, Inc., (www sirentech com), 4 pp.

(Continued)

*Primary Examiner*—Gene Crawford
*Assistant Examiner*—Timothy R Waggoner
(74) *Attorney, Agent, or Firm*—Fincham Downs, LLC; Carson C. K. Fincham

(57) ABSTRACT

Package deals comprising component products from inventory groups are offered and sold to customers of vending machines. In some embodiments, an association of the component products with the inventory groups is indicated by at least one of a placement of the component products and/or physical indicia associated with the component products.

49 Claims, 3 Drawing Sheets

U.S. PATENT DOCUMENTS

| | | |
|---|---|---|
| 3,691,527 A | 9/1972 | Yamamoto |
| 3,705,384 A | 12/1972 | Wahlberg |
| 3,718,906 A | 2/1973 | Lightner |
| 3,747,733 A | 7/1973 | Knickerbocker |
| 3,937,929 A | 2/1976 | Knauer |
| 3,947,882 A | 3/1976 | Lightner |
| 4,008,792 A | 2/1977 | Levasseur et al. |
| RE29,450 E | 10/1977 | Goldsby et al. |
| 4,108,361 A | 8/1978 | Krause |
| 4,237,537 A | 12/1980 | Pitches et al. |
| 4,245,730 A | 1/1981 | Bachmann et al. |
| 4,258,837 A | 3/1981 | Manos et al. |
| 4,282,575 A | 8/1981 | Hoskinson et al. |
| 4,316,532 A | 2/1982 | Levasseur |
| 4,323,770 A | 4/1982 | Dieulot et al. |
| 4,341,951 A | 7/1982 | Benton |
| 4,376,479 A | 3/1983 | Sugimoto et al. |
| 4,412,292 A | 10/1983 | Sedam et al. |
| 4,417,671 A | 11/1983 | Kawaski et al. |
| 4,420,751 A | 12/1983 | Paganini et al. |
| 4,454,670 A | 6/1984 | Bachmann et al. |
| 4,494,197 A | 1/1985 | Troy et al. |
| 4,498,570 A | 2/1985 | King et al. |
| 4,500,880 A | 2/1985 | Gomersall et al. |
| 4,518,098 A | 5/1985 | Fleischer |
| 4,554,446 A | 11/1985 | Murphy et al. |
| 4,567,609 A | 1/1986 | Metcalf |
| 4,574,947 A | 3/1986 | Hutchings |
| RE32,115 E | 4/1986 | Lockwood et al. |
| 4,587,984 A | 5/1986 | Levasseur et al. |
| 4,593,361 A | 6/1986 | Otten |
| 4,598,378 A | 7/1986 | Giacomo |
| 4,603,390 A | 7/1986 | Mehdipour et al. |
| 4,639,875 A | 1/1987 | Abraham et al. |
| 4,654,800 A | 3/1987 | Hayashi et al. |
| 4,669,730 A | 6/1987 | Small |
| 4,677,553 A | 6/1987 | Roberts et al. |
| 4,679,150 A | 7/1987 | Hayashi et al. |
| 4,689,742 A | 8/1987 | Troy et al. |
| 4,723,212 A | 2/1988 | Mindrum et al. |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane et al. |
| 4,766,548 A | 8/1988 | Cedrone et al. |
| 4,799,156 A | 1/1989 | Shavit et al. |
| 4,815,741 A | 3/1989 | Small |
| 4,817,166 A | 3/1989 | Gonzalez et al. |
| 4,817,990 A | 4/1989 | Krost |
| 4,825,045 A | 4/1989 | Humble |
| 4,833,607 A | 5/1989 | Dethloff et al. |
| 4,834,231 A | 5/1989 | Awane et al. |
| 4,839,507 A | 6/1989 | May |
| 4,854,590 A | 8/1989 | Jolliff et al. |
| 4,857,840 A | 8/1989 | Lanchais |
| 4,859,838 A | 8/1989 | Okiharu |
| 4,878,248 A | 10/1989 | Shyu et al. |
| 4,882,473 A | 11/1989 | Bergeron et al. |
| 4,882,675 A | 11/1989 | Nichtberger et al. |
| 4,882,688 A | 11/1989 | Kondziolka et al. |
| 4,899,906 A | 2/1990 | Bella |
| 4,906,828 A | 3/1990 | Halpern |
| 4,908,761 A | 3/1990 | Tai |
| 4,910,672 A | 3/1990 | Off et al. |
| 4,922,435 A | 5/1990 | Cahlander et al. |
| 4,922,522 A | 5/1990 | Scanlon |
| 4,937,853 A | 6/1990 | Brule et al. |
| 4,947,028 A | 8/1990 | Gorog |
| 4,949,256 A | 8/1990 | Humble |
| 4,963,723 A | 10/1990 | Masada |
| 4,973,952 A | 11/1990 | Malec et al. |
| 4,982,337 A | 1/1991 | Burr et al. |
| 4,982,346 A | 1/1991 | Giruard et al. |
| 4,992,940 A | 2/1991 | Dworkin |
| 4,993,714 A | 2/1991 | Golightly |
| 4,999,763 A | 3/1991 | Ousborne |
| 5,007,518 A | 4/1991 | Crooks et al. |
| 5,010,485 A | 4/1991 | Bigari |
| 5,034,739 A | 7/1991 | Gruhl |
| 5,036,472 A | 7/1991 | Buckley |
| 5,039,848 A | 8/1991 | Stoken |
| 5,056,019 A | 10/1991 | Schultz et al. |
| 5,058,044 A | 10/1991 | Stewart et al. |
| 5,064,999 A | 11/1991 | Okamoto et al. |
| 5,081,685 A | 1/1992 | Jones, III et al. |
| 5,091,713 A | 2/1992 | Horne et al. |
| 5,117,354 A | 5/1992 | Long et al. |
| 5,117,407 A | 5/1992 | Vogel |
| 5,119,295 A | 6/1992 | Kapur |
| 5,128,862 A | 7/1992 | Mueller |
| 5,132,914 A | 7/1992 | Cahlander et al. |
| 5,136,658 A | 8/1992 | Mori |
| 5,172,328 A | 12/1992 | Cahlander et al. |
| 5,173,851 A | 12/1992 | Off et al. |
| 5,176,224 A | 1/1993 | Spector |
| 5,177,342 A | 1/1993 | Adams |
| 5,185,695 A | 2/1993 | Pruchinicki |
| 5,189,607 A | 2/1993 | Shirasaki et al. |
| 5,191,410 A | 3/1993 | McCalley et al. |
| 5,192,854 A | 3/1993 | Counts |
| 5,201,010 A | 4/1993 | Deaton et al. |
| 5,204,675 A | 4/1993 | Sekine |
| 5,216,595 A | 6/1993 | Protheroe |
| 5,223,698 A | 6/1993 | Kapur |
| 5,231,569 A | 7/1993 | Myatt et al. |
| 5,239,165 A | 8/1993 | Novak |
| 5,243,515 A | 9/1993 | Lee |
| 5,245,533 A | 9/1993 | Marshall |
| 5,253,165 A | 10/1993 | Leiseca et al. |
| 5,256,863 A | 10/1993 | Ferguson et al. |
| 5,257,179 A | 10/1993 | DeMar |
| 5,262,941 A | 11/1993 | Saladin et al. |
| 5,267,452 A | 12/1993 | Zinsmeyer et al. |
| 5,269,521 A | 12/1993 | Rossides |
| 5,274,547 A | 12/1993 | Zoffel et al. |
| 5,283,731 A | 2/1994 | Lalonde et al. |
| 5,287,268 A | 2/1994 | McCarthy |
| 5,297,031 A | 3/1994 | Gutterman et al. |
| 5,302,811 A | 4/1994 | Fukatsu |
| 5,309,355 A | 5/1994 | Lockwood |
| 5,315,093 A | 5/1994 | Stewart |
| 5,315,664 A | 5/1994 | Kumagai |
| 5,319,542 A | 6/1994 | King, Jr. et al. |
| 5,325,291 A | 6/1994 | Garrett et al. |
| 5,339,250 A | 8/1994 | Durbin |
| 5,353,218 A | 10/1994 | De Lapa et al. |
| 5,353,219 A | 10/1994 | Mueller et al. |
| 5,367,452 A | 11/1994 | Gallery et al. |
| 5,368,129 A | 11/1994 | Von Kohorn |
| 5,371,796 A | 12/1994 | Avarne |
| 5,380,991 A | 1/1995 | Valencia et al. |
| 5,381,155 A | 1/1995 | Gerber |
| 5,383,111 A | 1/1995 | Homma et al. |
| RE34,915 E | 4/1995 | Nichtberger et al. |
| 5,408,417 A | 4/1995 | Wilder |
| 5,415,319 A | 5/1995 | Risolia |
| 5,420,606 A | 5/1995 | Begum et al. |
| 5,422,473 A | 6/1995 | Kamata |
| 5,425,108 A | 6/1995 | Hwang et al. |
| 5,434,394 A | 7/1995 | Roach et al. |
| 5,440,336 A | 8/1995 | Buhro et al. |
| 5,445,295 A | 8/1995 | Brown |
| 5,450,938 A | 9/1995 | Rademacher |

| | | | | | |
|---|---|---|---|---|---|
| 5,452,344 A | 9/1995 | Larson | 5,734,838 A | 3/1998 | Robinson et al. |
| 5,459,306 A | 10/1995 | Stein et al. | 5,737,710 A | 4/1998 | Anythonson |
| 5,481,094 A | 1/1996 | Suda | 5,739,512 A | 4/1998 | Tognazzini |
| 5,482,139 A | 1/1996 | Rivalto et al. | 5,748,485 A | 5/1998 | Christiansen et al. |
| 5,495,412 A | 2/1996 | Thiessen | 5,754,653 A | 5/1998 | Canfield |
| 5,504,475 A | 4/1996 | Houdou et al. | 5,758,328 A | 5/1998 | Giovannoli |
| 5,504,675 A | 4/1996 | Cragun et al. | 5,761,648 A | 6/1998 | Golden et al. |
| 5,510,979 A | 4/1996 | Moderi et al. | 5,768,142 A | 6/1998 | Jacobs |
| 5,511,646 A | 4/1996 | Maldanis et al. | 5,769,269 A | 6/1998 | Peters |
| 5,513,117 A | 4/1996 | Small | 5,774,868 A | 6/1998 | Cragun et al. |
| 5,521,364 A | 5/1996 | Kimura et al. | 5,774,870 A | 6/1998 | Storey |
| 5,526,257 A | 6/1996 | Lerner | 5,774,874 A | 6/1998 | Veeneman et al. |
| 5,536,045 A | 7/1996 | Adams | 5,780,133 A | 7/1998 | Enstrom |
| 5,537,314 A | 7/1996 | Kanter | 5,791,991 A | 8/1998 | Small |
| 5,544,040 A | 8/1996 | Gerbaulet | 5,794,207 A | 8/1998 | Walker et al. |
| 5,544,784 A | 8/1996 | Malspina | 5,799,284 A | 8/1998 | Bourquin |
| 5,546,316 A | 8/1996 | Buckley et al. | 5,806,044 A | 9/1998 | Powell |
| 5,550,746 A | 8/1996 | Jacobs | 5,809,144 A | 9/1998 | Sirbu et al. |
| 5,557,721 A | 9/1996 | Fite et al. | 5,816,918 A | 10/1998 | Kelly et al. |
| 5,564,546 A | 10/1996 | Molbak et al. | 5,819,285 A | 10/1998 | Damico et al. |
| 5,568,406 A | 10/1996 | Gerber | 5,822,216 A | 10/1998 | Satchell, Jr. et al. |
| 5,572,653 A | 11/1996 | DeTemple et al. | 5,822,736 A | 10/1998 | Hartman et al. |
| 5,581,064 A | 12/1996 | Riley et al. | 5,831,862 A | 11/1998 | Hetrick et al. |
| 5,591,972 A | 1/1997 | Noble et al. | 5,832,457 A | 11/1998 | O'Brien et al. |
| 5,592,375 A | 1/1997 | Salmon et al. | 5,832,458 A | 11/1998 | Jones |
| 5,592,376 A | 1/1997 | Hodroff | 5,842,178 A | 11/1998 | Giovannoli |
| 5,592,378 A | 1/1997 | Cameron et al. | 5,842,212 A | 11/1998 | Ballurio et al. |
| 5,596,501 A | 1/1997 | Comer et al. | 5,844,808 A | 12/1998 | Konsmo et al. |
| 5,602,377 A | 2/1997 | Beller et al. | 5,845,259 A | 12/1998 | West et al. |
| 5,604,901 A | 2/1997 | Kelly et al. | 5,845,265 A | 12/1998 | Woolston |
| 5,608,643 A | 3/1997 | Wichter et al. | 5,848,399 A | 12/1998 | Burke |
| 5,611,051 A | 3/1997 | Pirelli | 5,850,446 A | 12/1998 | Berger et al. |
| 5,611,052 A | 3/1997 | Dykstra et al. | 5,855,007 A | 12/1998 | Jovicic et al. |
| 5,612,257 A | 3/1997 | Tsering | 5,855,008 A | 12/1998 | Goldhaber et al. |
| 5,612,527 A | 3/1997 | Ovadia | 5,857,175 A | 1/1999 | Day et al. |
| 5,612,868 A | 3/1997 | Off et al. | 5,860,362 A | 1/1999 | Smith |
| 5,613,620 A | 3/1997 | Center et al. | 5,864,604 A | 1/1999 | Moen et al. |
| 5,615,269 A | 3/1997 | Micali | 5,864,822 A | 1/1999 | Baker, III |
| 5,620,079 A | 4/1997 | Molbak | RE36,116 E | 2/1999 | McCarthy |
| 5,621,201 A | 4/1997 | Langhans et al. | 5,870,716 A | 2/1999 | Sugiyama et al. |
| 5,621,640 A | 4/1997 | Burke | 5,870,717 A | 2/1999 | Wiecha |
| 5,630,357 A | 5/1997 | Akiyama | 5,870,719 A | 2/1999 | Maritzen et al. |
| 5,631,724 A | 5/1997 | Sawada et al. | 5,873,069 A | 2/1999 | Reuhl et al. |
| 5,632,010 A | 5/1997 | Briechle et al. | 5,875,110 A | 2/1999 | Jacobs |
| 5,633,839 A | 5/1997 | Alexander et al. | 5,878,139 A | 3/1999 | Rosen |
| 5,637,859 A | 6/1997 | Menoud | 5,878,400 A | 3/1999 | Carter, III |
| 5,638,302 A | 6/1997 | Gerber | 5,878,401 A | 3/1999 | Joseph |
| 5,638,985 A | 6/1997 | Fitzgerald | 5,883,810 A | 3/1999 | Franklin et al. |
| 5,651,075 A | 7/1997 | Frazier et al. | 5,887,271 A | 3/1999 | Powell |
| 5,664,115 A | 9/1997 | Fraser | 5,890,136 A | 3/1999 | Kipp |
| 5,665,953 A | 9/1997 | Mazzamuto et al. | 5,905,246 A | 5/1999 | Fajkowski |
| 5,666,493 A | 9/1997 | Wojcik et al. | 5,907,830 A | 5/1999 | Engel et al. |
| 5,675,662 A | 10/1997 | Deaton et al. | 5,918,213 A | 6/1999 | Bernard et al. |
| 5,685,435 A | 11/1997 | Picioccio et al. | 5,923,016 A | 7/1999 | Fredregill et al. |
| 5,687,087 A | 11/1997 | Taggart | 5,924,078 A | 7/1999 | Naftzger |
| 5,687,322 A | 11/1997 | Deaton et al. | 5,924,080 A | 7/1999 | Johnson |
| 5,692,132 A | 11/1997 | Hogan | 5,924,082 A | 7/1999 | Silverman et al. |
| 5,701,252 A | 12/1997 | Facchin et al. | 5,927,541 A | 7/1999 | Stoken et al. |
| 5,708,782 A | 1/1998 | Larson et al. | 5,930,145 A | 7/1999 | Yuyama et al. |
| 5,710,557 A | 1/1998 | Schuette | 5,930,771 A | 7/1999 | Stapp |
| 5,710,886 A | 1/1998 | Christensen et al. | 5,937,391 A | 8/1999 | Ikeda et al. |
| 5,710,887 A | 1/1998 | Chelliah et al. | 5,938,717 A | 8/1999 | Dunne et al. |
| 5,713,795 A | 2/1998 | Von Kohorn | 5,947,328 A | 9/1999 | Kovens et al. |
| 5,717,866 A | 2/1998 | Naftzger | 5,948,038 A | 9/1999 | Daly et al. |
| 5,719,396 A | 2/1998 | Jack et al. | 5,949,688 A | 9/1999 | Montoya et al. |
| 5,724,518 A | 3/1998 | Helbing | 5,956,695 A | 9/1999 | Carrithers et al. |
| 5,724,886 A | 3/1998 | Ewald et al. | 5,959,869 A | 9/1999 | Miller et al. |
| 5,726,450 A | 3/1998 | Peterson et al. | 5,959,945 A | 9/1999 | Kleiman |
| 5,727,163 A | 3/1998 | Bezos | 5,963,452 A | 10/1999 | Etoh et al. |
| 5,727,164 A | 3/1998 | Kaye et al. | 5,963,939 A | 10/1999 | McCann et al. |
| 5,732,398 A | 3/1998 | Tagawa | 5,964,660 A | 10/1999 | James et al. |
| 5,732,950 A | 3/1998 | Moody | 5,970,469 A | 10/1999 | Scroggie et al. |
| 5,734,150 A | 3/1998 | Brown et al. | 5,974,399 A | 10/1999 | Giuliani et al. |

| | | | |
|---|---|---|---|
| 5,988,346 A | 11/1999 | Tedesco et al. |
| 5,991,740 A | 11/1999 | Messer |
| 5,995,942 A | 11/1999 | Smith et al. |
| 5,997,236 A | 12/1999 | Picioccio et al. |
| 5,997,928 A | 12/1999 | Kaish et al. |
| 5,999,914 A | 12/1999 | Blinn et al. |
| 6,009,412 A | 12/1999 | Storey |
| 6,012,834 A | 1/2000 | Dueck et al. |
| 6,012,890 A | 1/2000 | Celorio Garrido |
| 6,014,634 A | 1/2000 | Scroggie et al. |
| 6,016,504 A | 1/2000 | Arnold et al. |
| 6,017,157 A | 1/2000 | Garfinkle |
| 6,018,718 A | 1/2000 | Walker et al. |
| 6,021,394 A | 2/2000 | Takahashi |
| 6,026,370 A | 2/2000 | Jermyn |
| 6,026,375 A | 2/2000 | Hall et al. |
| 6,029,139 A | 2/2000 | Cunningham et al. |
| 6,029,141 A | 2/2000 | Bezos et al. |
| 6,035,284 A | 3/2000 | Straub et al. |
| 6,038,551 A | 3/2000 | Barlow et al. |
| 6,048,267 A | 4/2000 | Wichinsky |
| 6,049,777 A | 4/2000 | Sheena et al. |
| 6,050,387 A | 4/2000 | Iwaki |
| 6,050,568 A | 4/2000 | Hachquet |
| 6,052,667 A | 4/2000 | Walker et al. |
| 6,055,513 A | 4/2000 | Katz et al. |
| 6,056,194 A | 5/2000 | Kolls |
| 6,058,373 A | 5/2000 | Blinn et al. |
| 6,058,375 A | 5/2000 | Park |
| 6,059,142 A | 5/2000 | Wittern, Jr. et al. |
| 6,061,660 A | 5/2000 | Eggleston et al. |
| 6,067,570 A | 5/2000 | Kreynin et al. |
| 6,073,840 A | 6/2000 | Marion |
| 6,075,214 A | 6/2000 | Sato et al. |
| 6,076,070 A | 6/2000 | Stack |
| 6,078,866 A | 6/2000 | Buck et al. |
| 6,085,168 A | 7/2000 | Mori et al. |
| 6,085,169 A | 7/2000 | Walker et al. |
| 6,086,380 A | 7/2000 | Chu et al. |
| 6,098,879 A | 8/2000 | Terranova |
| 6,101,485 A | 8/2000 | Fortenberry et al. |
| 6,115,649 A | 9/2000 | Sakata |
| 6,119,099 A * | 9/2000 | Walker et al. ............... 705/16 |
| 6,131,085 A | 10/2000 | Rossides |
| 6,134,534 A | 10/2000 | Walker et al. |
| 6,167,327 A | 12/2000 | Broker et al. |
| 6,167,382 A | 12/2000 | Sparks et al. |
| 6,170,631 B1 | 1/2001 | Miyazaki |
| 6,192,349 B1 | 2/2001 | Husemann et al. |
| 6,193,154 B1 | 2/2001 | Phillips et al. |
| 6,205,435 B1 | 3/2001 | Biffar |
| 6,223,163 B1 | 4/2001 | Van Luchene |
| 6,236,971 B1 | 5/2001 | Stefik et al. |
| 6,247,047 B1 | 6/2001 | Wolff |
| 6,249,772 B1 | 6/2001 | Walker et al. |
| 6,253,069 B1 | 6/2001 | Mankovitz |
| 6,260,024 B1 | 7/2001 | Shkedy |
| 6,266,651 B1 | 7/2001 | Woolston |
| 6,321,984 B1 | 11/2001 | McCall et al. |
| 6,330,490 B1 | 12/2001 | Kim et al. |
| 6,330,544 B1 | 12/2001 | Walker et al. |
| 6,341,314 B1 | 1/2002 | Doganata et al. |
| 6,370,513 B1 | 4/2002 | Kolawa et al. |
| 6,397,193 B1 * | 5/2002 | Walker et al. ............... 705/16 |
| 6,405,174 B1 | 6/2002 | Walker et al. |
| 6,449,658 B1 | 9/2002 | Lafe et al. |
| 6,466,830 B1 | 10/2002 | Manross et al. |
| 6,467,686 B1 | 10/2002 | Guthrie et al. |
| 6,512,570 B2 | 1/2003 | Garfinkle et al. |
| 6,553,346 B1 | 4/2003 | Walker et al. |
| 6,571,150 B2 | 5/2003 | Arai et al. |
| 6,584,448 B1 | 6/2003 | Laor |
| 6,587,031 B1 | 7/2003 | Daugherty et al. |
| 6,587,835 B1 | 7/2003 | Treyz et al. |
| 6,594,646 B1 | 7/2003 | Okayama et al. |
| 6,615,241 B1 | 9/2003 | Miller et al. |
| 6,636,733 B1 | 10/2003 | Helferich |
| 6,644,547 B1 | 11/2003 | White |
| 6,684,195 B1 | 1/2004 | Deaton et al. |
| 6,708,203 B1 | 3/2004 | Makar et al. |
| 6,754,636 B1 | 6/2004 | Walker et al. |
| 6,874,612 B1 | 4/2005 | Uland |
| 6,957,125 B1 | 10/2005 | Rifkin |
| 6,970,837 B1 | 11/2005 | Walker et al. |
| 6,980,887 B2 | 12/2005 | Varga et al. |
| 7,014,108 B2 | 3/2006 | Sorenson et al. |
| 7,058,581 B1 | 6/2006 | Young |
| 7,084,737 B1 | 8/2006 | Moore et al. |
| 7,216,089 B1 | 5/2007 | Ota et al. |
| 7,218,991 B2 * | 5/2007 | Walker et al. ............... 700/234 |
| 7,236,946 B2 | 6/2007 | Bates et al. |
| 7,357,314 B2 | 4/2008 | Kusakawa |
| 7,499,769 B2 * | 3/2009 | Walker et al. ............... 700/240 |
| 2002/0077724 A1 | 6/2002 | Paulucci et al. |
| 2002/0099604 A1 | 7/2002 | Lewis et al. |
| 2002/0107610 A1 | 8/2002 | Kaehler et al. |
| 2002/0111157 A1 | 8/2002 | Stieber et al. |
| 2002/0120496 A1 | 8/2002 | Scroggie et al. |
| 2003/0033292 A1 | 2/2003 | Meisel et al. |
| 2003/0040838 A1 | 2/2003 | Lagunzad et al. |
| 2003/0088465 A1 | 5/2003 | Monteverde |
| 2003/0139969 A1 | 7/2003 | Scroggie et al. |
| 2004/0162633 A1 | 8/2004 | Kraft et al. |
| 2004/0243478 A1 | 12/2004 | Walker et al. |
| 2005/0060062 A1 | 3/2005 | Walker et al. |
| 2005/1265806 | 7/2005 | Roatis et al. |
| 2006/0122885 A1 | 6/2006 | Ota et al. |
| 2008/0051934 A1 | 2/2008 | Tedesco et al. |

FOREIGN PATENT DOCUMENTS

| | | | |
|---|---|---|---|
| CA | 2 217 739 | 4/1996 |
| EP | 0 085 546 A2 | 8/1983 |
| EP | 0 512 509 | 11/1992 |
| EP | 512413 | 11/1992 |
| EP | 0 779 587 A2 | 9/1996 |
| EP | 0 779 587 A3 | 9/1996 |
| EP | 0 817 138 A1 | 1/1998 |
| EP | 0 856 812 A2 | 5/1998 |
| EP | 0 862 150 A2 | 9/1998 |
| GB | 2 109 305 A | 6/1983 |
| GB | 2 265 032 A | 9/1993 |
| GB | 2 317 257 A | 3/1998 |
| JP | 58132886 A | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 6035946 | 2/1994 |
| JP | 7065218 A | 3/1995 |
| JP | 7078274 | 3/1995 |
| JP | 07098779 | 4/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 8329323 A | 12/1996 |
| JP | 09016836 A | 1/1997 |
| JP | 9062908 A | 3/1997 |
| JP | 9097288 | 4/1997 |
| JP | 9190478 A | 7/1997 |
| JP | H9-198554 | 7/1997 |
| JP | 10187820 | 7/1998 |

| | | |
|---|---|---|
| JP | 10214284 | 8/1998 |
| JP | 10240830 | 9/1998 |
| JP | 10269049 | 10/1998 |
| JP | 10289372 | 10/1998 |
| JP | 11088560 | 3/1999 |
| JP | 2003150769 | 5/2003 |
| KR | 9503826 B | 4/1995 |
| WO | WO 97/16797 | 5/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/44749 | 11/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | WO 98/48388 | 10/1998 |
| WO | WO 98/49658 | 11/1998 |
| WO | WO 98/58355 | 12/1998 |
| WO | WO 99/04326 | 1/1999 |
| WO | WO 99/07121 | 2/1999 |
| WO | WO 99/09508 | 2/1999 |
| WO | WO 99/38125 | 7/1999 |
| WO | WO 99/12177 | 11/1999 |

OTHER PUBLICATIONS

Rehayem, Gilbert, "Opinion: X-Press Betting", Information Systems & Technology, Ontario Lottery Corp, 1 pg.
Samuelson, Paul A., "Economics $8^{th}$ Edition", McGraw-Hill Book Company, Copyright 1948, 1951, 4 pp.
"Cape Town", Reuters Ltd, Nov. 8, 1979, PM Cycle, 1 pg.
"Save the mark", Financial Times (London), Feb. 1, 1983, Section I, Men & Matters at p. 12, 1 pg.
Cook, Louise, "ConsumerWatch: Clip, Snip, Save", The Associated Press, Mar. 12, 1984, Business News Section, 2 pp.
Greene, Jan, "Farm bills please assns; National Grocers Association", Supermarket News, vol. 35, Dec. 23, 1985 at p. 6, 1 pg.
"POS spectrum: a lottery looks to POS for growth", UMI, Inc., POS News, Jan. 1989, vol. 5, No. 7, p. 8, ISSN: 0896-6230, Coden: Bhorad, 1 pg.
Kuttner, Robert, "Computers May Turn The World Into One Big Commodities Pit", Business Week, Sep. 11, 1989, Section: Economic Viewpoint, No. 3123 at p. 17, 2 pp.
Schrage, Michael, "An Experiment In Economic Theory; Labs Testing Real Markets", The Record, Nov. 26, 1989, Section: Business at p. B01, 3 pp.
"Let's Play the Cash Register Receipts Lottery", The New York Times, Dec. 25, 1990, Section 1, p. 30, col. 4, Editorial Desk, 1 pg.
Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals at p. 22, 2 pp.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082, 3 pp.
Brochure: "Combo 3/6—Snack Food/Cold Drink Combination Vendor", U-Select-It, a Wittern Group Company, (www uselectit com), undated, 2 pp.
Brochure: "Multi-max Distributed Vending System", Fortune Resources, Inc., (www multi-max com), undated, 2 pp.
Brochure: "World Class Compact Series—Snack & Cold Can Merchandiser", Raddatz Product Development Corp., (www rpdvending com), undated, 4 pp.
Maras, Elliot, "Software opens doors to scientific machine menuing", Automatic Merchandiser, Feb. 1996, Section: p. 36, ISSN: 0002-7545, 5 pp.
Choate, Robert, "Why technology brings a great future for vending", Automatic Merchandiser, Oct. 1, 1997, Section: No. 10, vol. 39, p. 16, 1061-1797, 2 pp.
Brochure: "The VC3800 Combination Vendo", Effective Nov. 13, 2002, Seaga Manufacturing, Inc., (www seagamfg com), 1 pg.
Sereno, Jennifer, "Vending machines get fancier", Wisconsin State Journal, Mar. 27, 2004, Section: Business, 4 pp.
Website: "E-vending.com—Snack Vending Machines, Online Vending Machine Catalog", (http www e-vending com/combo_snack_pop_vending_machines_photos htm), download date: Jul. 1, 2004, 3 pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 pg.
Pelline, Jeff, "Travelers Bidding on Airline Tickets SF firm offers chance for cut-rate fares" The San Francisco Chronicle, Aug. 19, 1991, Sections: News at p. A4, 3 pp.
"Vendmaster Windows for Vending News," VendMaster, (http://www.vendmaster.com/news_main.html), download date: Feb. 6, 1998, 9 pp.
Del Rosso, Laura, "Ticket-bidding firm closes its doors; Marketel International; Brief Article", Travel Weekly, Mar. 12, 1992, Section: vol. 51, No. 21, p. 1, ISSN: 0041-2082, 2 pp.
Fink, Ronald, "Data processing: Pepsico.", Financial World, Sep. 29, 1992, Vol. 161, No. 19, p. 52(1), ISSN: 0015-2064, 2 pp.
Gelernter, David, "The Cyber-Road Not Taken; Lost on the Info-Highway? Here's Some Stuff that Could Really Change Your Life", The Washington Post, Apr. 3, 1994, Section: Outlook, p. Cl, 5 pp.
Smith, Alison, "Survey of UK Consumer Credit and Asset Finance", Financial Times, Nov. 3, 1994, Section: p. VI, 3 pp.
Website: "FAQ: CSH Coke Machine Information", Institute of Information & Computing Sciences, (http //www cs uu nl/wais/html/na-dir/csh-coke-machine-info html), Feb. 4, 1995, 6 pp.
Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8, 2 pp.
"Spain: BBV launches new card", Cards International, Jun. 22, 1995 at p. 5, 1 pg.
Knippenberg, Jim, "Will local radio empires strike back?", The Cincinnati Enquirer, Jul. 23, 1995, Section: Tempo at p. F01, 1 pg.
Brochure, "Cyber Bid", Net Fun Ltd., Copyright 1996, 9 pp.
Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK, 11 pp.
Hadley, Kimberly, "Pastors praying anti-arson effort will burn bias", The Nashville Banner, Jul. 26, 1996, Section: News at p. A13, 2 pp.
Gapper, John, "NatWest reports rise in bad debt", Financial Times, Jul. 31, 1996, Section: News: UK; at p. 09, 2 pp.
Gilbert, Allan Z., "A call to action for wireless data communication", Automatic Merchandiser, Aug. 1996, Financial Management section, 3 pp.
"Lynx Technology: Lynx to provide business leasing programme through Schroder Leasing", M2 Presswire, Aug. 9, 1996, 2 pp.
Taylor, Paul, "Towards a dream market", Financial Times (London), Sep. 4, 1996, Section: Survey - FT IT; at p. 03, 2 pp.
"Public Internet Kiosks, Inc. Receives First Order For Its 'Internet Station'—The Vending Machine of the Future", PR Newswire, Sep. 16, 1996, 2 pp.
Singletary, Michelle, "Electronic World, Unchecked Problem? U.S. Move to Paperless Payments Raises Worries About Those Who Don't Use Banks", The Washington Post, Mar. 4, 1997, Section: Financial at p. C01, 4 pp.
French, Simone A. et al., "A Pricing Strategy to Promote Low-Fat Snack Choices through Vending Machines", American Journal of Public Health, May 1997, vol. 87, No. 5, 3 pp.
"Avco Financial Services", National Home Furnishing Association, (http //www homefurnish comNHFA/avco htm), download date: May 23, 1997 2 pp.

Website, "Catalina Marketing Corporation", (http //catalinamktg com/prodcdir htm), download date: May 29, 1997, 16 pp.
Riordan, Teresa, "Patents; A novel approach to making a better spermicide harks back to some old-fashioned methods", The New York Times, Jun. 9, 1997, Section D, p. 2, col. 1, Business/Financial Desk, 3 pp.
Nairn, Geoff, "The key to your identity: Falling costs will allow fingerprint verification to be widely used, reports Geoff Nairn", Financial Times (London), Jul. 15, 1997, Section: Technology; at p. 12, 3 pp.
"The United Computer Exchange, How It All Works", (http //www uce com/howitworks html), download date: Jul. 23, 1997, 6 pp.
"Classified 2000: The Internet Classifieds", Classifieds2000, Inc., (http //www classifieds2000 com/cgi-cls/Display exe?C2K+aboutus), download date: Aug. 6, 1997, 3 pp.
"General trading information and terms provided by tradingfloor. com", (http //www tradingfloor com/info htm), download date: Aug. 14, 1997, 11 pp.
"NASDAQ", Information Sheet, (http //home axford com/corfin/ corf1 1 htm), download date: Aug. 15, 1997, 3 pp.
Brochure, "For the Crew & the Customer: The Best Drive-Thru & Grill Service", Olivetti North America, Winter 1998, 2 pp.
"VendMaster: Windows and Vending Software, Reports", (http //www vendmaster com/reports_main html), download date: Feb. 6, 1998, 12 pp.
King, Brad, "Music competition; With MP3s under attack and major labels designing new standards, three Bay Area firms try to corner the market on online music", SF Weekly, Apr. 28, 1999, Section: Music, 4 pp.
Turnis, Jane, "Charity Begins with Pepsi Recycling Can in Colorado Springs, Colo.", The Gazette (Colorado Springs), Dec. 9, 1998, 1 pg.
PCT International Search Report for International Application No. PCT/US98/21216, filed Oct. 8, 1998, in the name of Tedesco et al., and entitled "Method And Apparatus For Dynamically Managing Vending Machine Inventory Prices", mailed May 4, 1999, 3 pp.
Ringle, Ken, "The Sell Phone: Dial 'M' for Munchies", The Washington Post, Jun. 19, 1999, Section: Style, p. C01. 2 pp.
Walker, Leslie, "A Sales Pitch With That Soda?" The Washington Post, Jun. 24, 1999, Section: Financial, p. E01, 1 pp.
"'Digital kiosks' at train stations to offer news, music, games", Deutsche Presse-Agentur, Jul. 15, 1999, Section: International News, 1 pg.
"Mitsubishi's New ChipConnect Software Development Kits and Reference Designs Enable Web-Controlled Embedded Systems Using em Ware's EMIT Architecture", Business Wire, Jul. 19, 1999, 4 pp.
Heid, Jim, "The Hits Just Keep on Coming as Downloadable Music Rocks the Web", PC World, Aug. 1999, pg.
"Asia's first EAT on Ice opens", Travel Trade Gazette Asia, Oct. 1, 1999, Section: Business, 2 pp.
Skinner, Greg, "Digitalia: ratings and ravings", Kidscreen, Oct. 1, 1999, Section: New Media, The Cyber Space, p. 40, 2 pp.
"Briefing—Asia Information Technology", Asia Pulse, Feb. 18, 2000, Section: General News, 4 pp.
"Vending machines go high-tech", Journal of Business, Mar. 9, 2000, Section: vol. 15, No. 6, p. A1, ISSN: 10756124, 3 pp.
"USA Technologies Expands Distribution of TransAct Credit Card Device & Payment System", Business Wire, Apr. 27, 2000, 2 pp.
"USA Technologies Targets e-Port At Interactive Media Market; Innovative Internet Appliance Featured at @d:tech Internet Conference; Adtech2000", Business Wire, May 9, 2000, 3 pp.
"Coinstar Launches Turn-Key Philanthropic Initiative for Supermarket Partners; Retailers Can Now Tailor Coins That Count Programs to Support Local Non-Profits", Business Wire, May 10, 2000, 2 pp.
"MP3.com and Djangos.com Partner to Re-Invent Retail Music Industry; Alliance Provides Consumers with Instant Online Access to Purchased CDs", PR Newswire, Jun. 14, 2000, Section: Financial News, 3 pp.
"Are in-store kiosks the future?", Music Week, Jun. 24, 2000, Section: p. 22, 1 pg.
"USA Technologies Files 15 More Patents to Protect e-Port Internet Appliance Device", Business Wire, Jun. 26, 2000, 3 pp.

"Marcus Theatres Corporation First to Offer eKiosk High-Speed Internet Access to Movie Goers", PR Newswire, Aug. 21, 2000, 2 pp.
"E-tailer Notes: The Outernet, planned entertainment chain . . . ", Audio Week, Aug. 28, 2000, 1 pg.
"Re Directorate", Regulatory News Service, Sep. 1, 2000, 2 pp.
Website: "USEDvending.com—New Personal Care Products Vending Machines", (http //www usedvending com/newpersonalcare htm), download date: Oct. 24, 2000, 3 pp.
Website: "e-vending.com homepage—Vending, Joke & Vending Machines", (http www e-vending com/jokes htm), download date: Oct. 24, 2000, 2 pp.
Berk, Christina Cheddar, "Many Vending Machines Opt Out of High-Tech Fixes", The Wall Street Journal Online, (http //online wsj com/article_email/), download date: Nov. 5, 2003, 3 pp.
Anne Henry, "High-tech Vending: Vending Machine OEMs Begin to Resemble Their Consumer electronics Counter Parets When It Comes To Rapid-fire Implementation of Technology, Original Equipment Manufacturers," Appliance, Dec. 1991, vol. 48 No. 12; p. 39; ISSN: 0003-6781, 5 pp.
"Vendingmi$er," Optimum Energy Products Ltd.: Energy Measurement & Control, (http://www.optimumenergy.com/products/miser.htm), download date: Aug. 12, 1998, 2 pp.
"WWW.PRIZEPOINT.COM is Live On the Internet!; New 'Reward Entertainment' Meets Needs of Growing Mass-Market Audience Online" Business Wire Feb. 1, 1999, 4 pp.
"In Online Auction First, Auction Universe Offers a 10% Rebate On Purchases During April" Business Wire Apr. 6, 1999, 3 pp.
Vickers, Amy, "Clicks mean points in the loyalty game; The success of offline loyalty schemes has been the model for online imitations, but consumers need greater flexibility" New Media Age, Section: Loyalty; p. 12-16 Apr. 29, 1999, 6 pp.
Corey, Matt, "Clip 'n' pay; proposed increase in coupon processing fees raises production cost issues" Food and Beverage Marketing, Section: No. 6, vol. 18; p. 18; ISSN: 0731-3799 Jun. 1, 1999, 4 pp.
Petersen, Scot, "New breed of auctioneer moving into mainstream; online auctions; Industry Trend or Event" PC Week, p. 30; ISSN: 0740-1604 Nov. 8, 1999, 6 pp.
"Creating reward programmes that really encourage loyalty; Loyalty schemes need to be simple, encourage redeeming and recognise long-standing customers says David Rankin" Brand Strategy, Section: Features; p. 8 Jan. 21, 2000, 5 pp.
"Using Aadvantage Miles" American Airlines—American Eagle, download Feb. 10, 2000, 11 pp.
"PrizePoint Entertainment: Learn More" http://www.prizepoint.com, download Feb. 10, 2000, 3 pp.
"Surfbuzz" http://www.surfbuzz.com download date Jun. 8, 2000, 4 pp.
U.S. Appl. No. 08/943,483, "System and Method for Facilitating Acceptance of Conditional Purchase Offers (CPO's)." Filed Oct. 3, 1997, 32 pp.
U.S. Appl. No. 09/219,267, "Method and Apparatus for Facilitating Electronic Commerce Through Providing Cross-Benefits During a Transaction" Filed Dec. 23, 1998, 33 pp.
U.S. Appl. No. 09/274,281, "Method and Apparatus for Providing Cross-Benefits via a Central Authority" Filed Mar. 22, 1999, 53 pp.
U.S. Appl. No. 09/282,747, "Method and Apparatus for Providing Cross-Benefits Based on a Customer Activity" Filed Mar. 31, 1999, 71 pp.
U.S. Appl. No. 09/322,351, "Method and Apparatus for Providing Cross-Benefits and Penalties" Filed May 28, 1999, 68 pp.
Jones, Jeanne, "Data Readers Streamline Management; Scanner Technology Aids Retailers As Well As Plants, Wholesalers", The Houston Post, Jun. 26, 1994, Section: Business at p. D1, 4 pp.
Fiorini, Phillip, "No Place for Penny?'/Smallest coin doesn't make cents to some", USA Today, Jul. 29, 1994, Section: News at p. 1A, 3 pp.
Gilbert, Allan Z., "Operators can gain with creative merchandising", Automatic Merchandiser, Oct. 1992, p. 80, ISSN: 1061-1797, 3 pp.
"Coupons get serious; supermarkets use barcodes to prevent misredemptions", Chain Store Age Executive with Shopping Center Age, Oct. 1992, Section: vol. 68, No. 10, p. 68, ISSN: 0193-1199, 2 pp.

"Winn-Dixie/The Salvation Army Report Contributions For War Against Hunger", PR Newswire, Jun. 10, 1993, Section: Financial News, 1 pg.

Hirschfeld, David, "Increasing Profits Through Automation", Independent Vendors Association Quarterly, Apr./May/Jun. 1997, 10 pp.

Burke, Raymond R., "Do You See What I See? The Future of Virtual Shopping", Journal of Academy of Marketing Science, Fall 1997, 17 pp.

"Planet City Y2K Sales Program to Benefit Non-Profits" PR Newswire, New York; Aug. 30, 1999, 2 pp.

Online shopping gives schools new fund-raising tool Education: Websites donate percentages of purchases, but PTA's proceed cautiously, [Morning Edition]; Elizabeth Chey; Orange County Register; Santa Ana, California; Nov. 21, 1999; 2 pp.

School Fund-Raising Goes Online (Yes, You Can Still Buy Wrapping Paper) Peggy O'Crowely Newhouse News Service, Washington, Oct. 11, 1999, 2 pp.

Pushing for Plastic, Ken Clark; Chain Store Age; May 2000; 1 pg.

Wal-Mart to Contribute Through Vending Machines (City Edition) Greensboro News Record; Greensboro, N.C. May 10, 1995, 1 pg.

Pepsi Wins Contract, Coke is Out at APS, Rebecca Roybal Journal Staff Writer, Albuqerque Journal; Albuquerque, N.W. May 25, 2000, 3 pp.

People and events; Herald, Rock Hill, S.C. Jun. 1, 1995, 2 pp.

Manning, Steven, Students for Sale, The Nation, New York, Sep. 29, 1999, 5 pp.

Businessline, Chennai, "Testing Limits of Corporate Sponsorships", Oct. 17, 1999, 3 pp.

"Coca-Cola's School Deal not too Hard to Swallow", Seattle Times; Seattle Washington, 2 pp.

McKinney, Jeff, "Merchant Program Could Pay Off for Provident", The Cincinnati Enquirer Financial, Financial Section, p. E02, Mar. 24, 1996, 2 pp.

Evans, Judith, "Who Was that Masked Cybershopper? MasterCard-Visa Agreement on Credit Card Security May Make On-Line Commerce Fly", The Washington Post, Feb. 2, 1996, 2 pp.

"NCR 7452 Workstation", (http://www.ncr.com/product/retail/products/catalog/7452.shtml), download date: Sep. 23, 1997, 3 pp.

Fitzgerald, Kate, "Amex Program Moves Loyalty to Next Level: Custom Extras Finds a Medium Customers Can't Ignore: Billing Statements", Advertising Age, News p. 2 Nov. 4, 1996, 2 pp.

Fickenscher, Lisa, "Amex to Start Free Rewards Program with Discounts on Merchandise", The American Banker, p. 10, Oct. 18, 1996, 2 pp.

"Industry Briefs", Card News, Phillips Business Information, Inc., vol. 12, No. 11, Jun. 9, 1997, 2 pp.

Fickenscher, Lisa, "Merchant: American Express Seeks to Mine its Data on Cardholder Speding Patterns", The American Banker, p. 20, Mar. 24, 1997, 2 pp.

Hoeschen, Brad, "Brookfield Square Hopes Mall Card Strikes a Chord", The Business Journal of Milwaukee, Inc., 1997, Business Dateline; Business Journal-Milwaukee, Sep. 12, 1997, 2 pp.

Davis, Charles, "Dispensing the Future", Electronic Payments International, Feature Section, p. 12, May 1997, 5 pp.

"SaveSmart—How SaveSmart Works for Consumers", (http://savesmart.com/consumerhowitworks.html), Copyright 1998, 7 pp.

"Welcome to Planet U, Providers of U-pons—Internet Coupons", (http://www.webcertificate.com:443/webcert/faq-details.asp), Copyright 1998, 8 pp.

"NCR 7453 PC-Based Point-of-Sale Solution", Copyright 1998, NCR Corporation, 1 pg.

"Webcertificate, the Perfect Gift-Giving Solution . . . It's Quick! It's Easy! It's Secure!", (http://www.webcert.faq/detail.asp), Copyright 1998, 13 pp.

"Shop the Marketplace, 1-800-Flowers.com", (http://www.1800flowers.com/flowers/welcome.asp), Copyright 1998, 4 pp.

"The Leader in Internet Shopping Systems for Supermarkets and Drug Stores", groceriesonline., Copyright 1996, Groceries Online, Inc., (http://www.groceries-onlline.com), Copyright 1996, 4 pp.

"Brother Industries is Pushing Ahead with Its New PC Software . . . ", IDC Japan Report, Aug. 30, 1991, Section: vol. 17, p. 53, 1 pg.

Naik, Gautam, "In Digital Dorm, Click on Return for Soda", The Wall Street Journal, Jan. 23, 1997, Section: Online, 3 pp.

Shea, Barbara, "Read Fine Print When Comparing Car Rentals", Feb. 9, 1997, St. Louis Post-Dispatch, Section: Travel & Leisure, 2 pp.

Website: "CSH Drink Machine(s)", (http://www.csh.rit.edu/proj/drink.html), Jan. 29, 1998, 2 pp.

Desjardins, Doug, "Hollywood's Investment in Online Video Retailer Gets Mixed Reviews", Video Store, Aug. 9, 1998, Section: p. 1, ISSN: 0195-1750, 3 pp.

Bowman, Jr., Ward S., "Tying Arrangements and the Leverage Problem", The Yale Law Journal, Nov. 1957, vol. 67, pp. 19-36, 10 pp.

Stigler, George J., "The Theory of Price", The Macmillan Company, Copyright 1952, 14 pp.

Stigler, George J., "The Theory of Price", The Macmillan Company, Third Edition, Copyright 1966, p. 82-94, 208-215, 8 pp.

Narasimham, Cakravarthi, "A Price Discrimination Theory of Coupons", Marketing Science, Spring 1984, No. 2, 20 pp.

"First Virtual Holdings Releases Beta Software for Secure Transactions on the Microsoft Merchant Server", PR Newswire, Mar. 31, 1997, Section: Financial News, 2 pp.

"Six Vendors Sign on for Early Electronic Commerce Venture", Information, Inc., Voice Technology News, Dec. 13, 1994, 2 pp.

"The Easy, Pain-Free Way to Buy or Lease your Next Car", What is AutoSeek; (http://www.autoseek.com/#what), download date: May 28, 1997, 4 pp.

Lockwood Tooher, Nora, "Macy's New Gift Card Gets Trial Run in Warwick", The Providence Journal-Bulletin; Oct. 1, 1998, Section: Business, 1E, 2 pp.

Caruso, Denise, "Digital Commerce; the Boom in Online Shopping Adds a Twist to the Old Quandary of How to Tax Interstate Purchases", The New York Times, View Related Topics, Dec. 28, 1998, 3 pp.

Godwin, Nadine, "New Software Was Key Lure in $17 Million Agency Buyout", Travel Weekly, Nov. 26, 1984, Section: vol. 43, 4 pp.

"Woodside Management Systems, Inc., Today Announced . . . ", PR Newswire, Apr. 1, 1986, 2 pp.

Tellis, Gerard J., "Beyond the Many Faces of Price: An Integration of Pricing Strategies", Journal of Marketing, Oct. 1986, 15 pp.

Godwin, Nadine, "Agency, funded by 3M, Set to Market Software; Travelmation Touts Trip Planner to Corporations; Designed to Eliminate Client-Agent Telephone Calls ; Business Travel Update", Travel Weekly, Oct. 13, 1986, 4 pp.

Godwin, Nadine, "Agency Dares to Launch its Own Air Res System; Travelmation System Provides Greater Versatility, Automation Report", Travel Weekly, Oct. 23, 1986, 5 pp.

Thomas Cook Travel USA Has Announced . . . , PR Newswire, Jan. 12, 1987, 2 Bawa, Kapil, et al., "The Coupon-Prone Consumer: Some Findings Based on Purchase Behavior Across Product Classes", Journal of Marketing, Oct. 1987, 2 pp.

Bawa, Kapil, et al., "The Coupon-Prone Consumer: Some Findings Based on Purchase Behavior Across Product Classes", Journal of Marketing, Oct. 1987, 12 pp.

Nomani, Sr., A, "Air Crashes Stir Signs of Anxiety in Travelers", Wall Street Journal, Aug. 1,1989, 2 pp.

Carlsen, Clifford, "From Airline Tickets to Human Organ, The Electronic Markets are Booming", San Francisco Business Times, Aug. 14, 1989, 2 pp.

Golden, Fran, "AAL's Riga Doubts Marketel's Appeal to Retailers", Travel Weekly, Nov. 13, 1989, Section: Business, 2 pp.

"Letters to BusinessExtra", The San Francisco Chronicle, Dec. 26,1989, Section: Business, 3 pp.

Wallace, David, "Company Planning to Let Flyers Bid on Airfares", Philadelphia Business Journal, Mar. 26, 1990, 3 pp.

Greenberg, Peter S., "The Savvy Traveler: Lower Air Fares for Consumers Not in the Cards . . . ", Los Angeles Times, Jul. 8, 1990, 2 pp.

Carey, Christopher, "Firm Offers Auctions for Airline Tickets", St. Louis Post-Dispatch, Aug. 7, 1991, Section: Business, 2 pp.

Upton, Kim, "News and Briefs: French Say Monoliths Off-Limits to Visitors", Los Angeles Times, Aug. 25, 1991, 2 pp.

"Buy Low, Fly High", USA Today, Nov. 14, 1991, 2 pp.

Feldman, Joan M., "To Rein in those CRSs; Computer Reservation Systems", Air Transport World, Dec. 1991 5 pp.

"Traveler's Notes: Bookit Report", Consumer Reports Travel Letter, Dec. 1991, 1 pg.

"CRTL's Blue Ribbon Deals for 1992", Consumer Reports Travel Letter, Jan. 1992, 2 pp.

"Newsletters", The Atlanta Journal and Constitution, Mar. 1, 1992, 1 pg.

Hainer, Cathy et al., "Where Vacationing Kids get Good Care", USA Today, Apr. 1, 1992, 2 Weatherford, Lawrence R., and Bodily, Samuel E., "A Taxonomy and Research Overview of Perishable-Asset Revenue Management: Overbooking and Pricing", Operations Research, Sep.-Oct. 1992, 16 pp.

Spencer, Milton H., and Amos, Orley M., "Contemoporary Economics Eighth Edition", Worth Publishers, Copyright 1993, 5 pp.

Rejendran, K.N., and Tellis, Gerard J., "Contextual and Temporal Components of Reference Price", Journal of Marketing, Jan. 1994, 13 pp.

Feldman, Joan, "Reclaiming Control; New Software to Close Gap Between Project and Actual Revenues", Aug. 1995, 5 pp.

*United States* vs. *Eastman Kodak Co*., United States Court of Appeals for the Second Circuit, decided Aug. 1995, 16 pp.

Bronnenberg, Bart J., "Limited Choice Sets, Local Price Response and Implied Measure of Price Competition", Journal of Marketing Research, 1996, 20 pp.

Prentice, Michael, "Search for the Lowest Fare: Getting the Lowest Fares Takes Work, But It's Worth the Effort", The Ottawa Citizen, Oct. 9, 1996, 3 pp.

"Auctioning Unsold Airline Tickets", Insight (USA), download date: Oct. 26,1996, 1 pg.

"Web Ventures Presents Bookit!", (http://www.webventures.com/bookit), Copyright 1996, 1 pg.

"Salomon Brothers' Malduits Says Internet is Aviation's 'Third Revolution' - Will Earn Billions", World Airline News, Mar. 21, 1997, 2 pp.

Feldman, Joan M., "Pricing and Cybersales; Internet Airline Tickets and Sales Reservations", Feb. 1998, 4 pp.

Adyanthaya, Surain, "Revenue Management: The Black Art", Interavia Business & Technology, Sep. 1998, 4 pp.

"Airfare Bargains on the Net: About E-mail Lists", (http://travel.epicurious.com/travel/c_planning/02_airfares/email/intro.html), copyright 1998, 17 pp.

"AirTech - FlightPass FAQ", (http://www.airtech.com/at_faqflightpass.htm), Oct. 5, 1998, 4 pp.

Varian, Hal R., "First Monday: Differential Pricing and Efficiency", (http://www.firstmondaydk/sissue2/different/), Copyright 1996, 18 pp.

Kephart, Jeff, "Price Dynamics of Vertically; Introduction", (http://www.research.ibm/infoecon...), Aug. 15, 1998, 3 pp.

"Bookit! Airfare Bidding System (Fax for Your Plane?)", Consumer Reports Travel Letter, Sep. 1991, 3 pp.

Nelson, Janet, "Practical Traveler; Airlines Relaxing Policy on No-Refund Tickets", The New York Times, Sep. 22, 1991, 4 pp.

"Traveler's Notes: Easier Airfare Bidding", Consumer Reports Travel Letter, Oct. 1991, 1 pg.

Website: "VendMaster - Windows for Vending PRO with Inventory", (http://vendmaster.com/pro_inv_main.html), download date: Jul. 16, 1998, 2 pp.

Burke, Raymond R., "Virtual Shopping: Breakthrough in Marketing Research", Havard Business Review, Mar.-Apr. 1996, 9 pp.

Joseph, Anthony, "Baby the Engine and Other Saving Tips", The Christian Science Monitor, Nov. 4, 1986, 3 pp.

"Coupons & More - Welcome to coolsavings.com", Copyright 1996-1999, (http://208.134.320.42/cgi-win/tempprs.exe/first.htm), 3 pp.

"A Personal Shopping Organizer for the Web Savvy Consumer. MyKillerApp Offers A Personalized Shopping Experience to Meet the Unique Needs of Every Individual User", (http://www.killerapp.com/html/main/pr004.html), Oct. 2, 1998, 2 pp.

"New Wave Marketing", Promotion Times, An SCA Quarterly Newsletter - First Quarter, undated, 2 pp.

"Global Second-Generation and Frequent-Buyer Set New Trends", Marketing News, Marketing News, Jun. 7, 1985, 1 pg.

Lacher, Lisa, "Coupon Gimmich Registers Profits", Business Record, Dec. 7, 1987, 2 pp.

Stevens, Lawrence, "Hypermarket Challenge", ComputerWorld, Dec. 19, 1988, Section: Software and Services, 2 pp.

McIntyre, Faye, "Small Businesses May Prefer Alternatives to Advertising", South Dakota Business Review, Jun. 1989, 4 pp.

"Safeway Introduces Store-Generated Coupons", PR Newswire, May 1, 1990, 1 pg.

Ramirez, Anthony, "The Pizza Version of Dialing '911'", The New York Times, Sep. 9, 1991, 3 pp.

Blattberg, Robert C., et al., "Interactive Marketing: Exploiting the Age of Addressability", Sload Management Review, 15 pp.

O'Kane, Gerry, "Parking Your Car by Computer", South China Morning Post, Mar. 23, 1993, Section: 3 pp.

McDowell, Bill, "Frequency Marketing Builds Repeat Business; Management", Information Access Company, Reed Publishing USA, Building Supply Home Centers, Aug. 1993, 5 pp.

Arend, Mark, "Debit Frenzy? Not Quite but Getting There", ABA Banking Journal, Apr. 1994, 4 pp.

Rubel, Chad, "Young Firm Armed with Technology Fights and Old Giant; ETM to Ticketmaster: Let's Rock", American Marketing Association, Marketing News™, Jun. 19, 1995, 3 pp.

"Tecmark Reward Terminal", Tecmark Services, Inc., Copyright 1996, (http://www.tecmark.com/terminal.htm), 1 pg.

"Staples the Office Superstore to Participate in Visa 'Rewards for your Home' Promotion; Savings Will Be Offered to Thousands of Visa Staples Customers", Business Wire, Mar. 25, 1996, 2 pp.

"Retailers in Small N. D. Town Join Forces (Discount Points Corp Launches Discount Points, a multi-retailer Consumer Discount Program)", Tire Business, Apr. 29, 1996, 3 pp.

Wagner, Jim, "Cameras Tell Mall What Door You Use, How Often you Go", Albuquerque Tribune, Aug. 9, 1996, Section: Evening, 2 pp.

"Click This Box for Extra Pepperoni; CyberSlice Routes Online Orders", The Dallas Morning News, Dec. 2, 1996, 2 pp.

"Frequent Shopper Programs Are Taking Off", Grocery Marketing, Jan. 1997, vol. 63, No. 1, p. 54, 2 pp.

"Grocery Shopping Goes Online in Many Markets; Technology Spurs Remote Ordering Concept", The Dallas Morning News, May 12, 1997, 2 pp.

Popyk, Bob, "Turn Customers Into Torchbearers", Information Access Company, A Thomson Corporation Company, National Trade Publications, Boating Industry, Sep. 1997, 3 pp.

"Acxiom Case-In-Point Study - Bloomingdale's, Inc.", "Pushing Technology's Edge Upscale Department Store Applies Database for Profit", (http://www.axciom.com/cip-cs-b.htm), download date: Sep. 23, 1997, 2 pp.

"From Our Family to Yours . . . 5 Weeks of Coupon Values for a Valuable Customer", Shoprite, Wakefern Food Corporation, Copyright 1998, 1 pg.

Heller, Al, "Chain Pharmacy: Forecast '98: New Technology Advances Pharmacy Productivity", Lebhar-Friedman, Inc., Drug Store News, Jan. 12, 1998, 4 pp.

"Advanced Mechanics Internet Specials", (http://www.metroplexweb.com/advcpn2.htm), download date: Mar. 12, 1998, 2 pp.

"Website: New Partners, More Exciting Rewards: The Membership Rewards Program for 1998", (http://www.americanexpress.com/rewards.news/docs/1998new_mr.shtml), download date: Mar. 12, 1998, 38 pp.

Website: "U.P.C. Coupon Code Guidelines Manual" (http://www.uc-council.org/d31-3.htm), download date: Mar. 12, 1998, 10 pp.

Rubenstein, Ed, "Internet Continues to Fortify Takeout Sector for Operators", Lebhar-Friedman, Inc., Nation's Restaurant News, Mar. 23, 1998, 5 pp.

Information Packet: "My Points® - Universal Rewards Currency, MotivationNet, Inc.", Apr. 1998, 29 pp.

Hemsley, Steve, "Research and Destroy' - Point-of-Purchase Research Provides Brand managers . . . ", Centaur Communications, Ltd., Marketing Week, Apr. 16, 1998, Section: Point of Purchase, 3 pp.

"WellsPark Group Launches 'V.I.P. Rewards', The Most Comprehensive Relationship Marketing Program Ever Created by a Mall Developer", Business Wire, Inc., May 19, 1998, 2 pp.

"Catching Red Light Runners", Business Communications Company, Advanced Transportation Technology News, Jun. 1998, 2 pp.

Amato-McCoy, Deena, "Co-Branded Acme Credit Card Rewards Loyal Users", Information Access Company, A Thomson Corporation Company, Capital Cities Media, Inc., Supermarket News, Jun. 15, 1998, 2 pp.

"Acme Markets, U.S. Bankcorp Debuts Visa Rewards Card", Phillips Business Information Card News, Jun. 22, 1998, vol. 13, No. 12, 1 pg.

Rubenstein, Ed, "Technology: Prepaid Program lets Galleria Guests Dine 'a la card'", Nation's Restaurant News, (http://nrn.com), Jun. 29, 1998, 1 pg.

"DataCard Partners with CSI to Offer Card-Based Loyalty Solution to Merchants", Business Wire, Inc., Jul. 9, 1998, 1 pg.

Albright, Mark, "Grocery Savings via Web Coupons", Times Publishing Company, St. Petersburg Times, Jul. 22, 1998, 2 pp.

Campos, Frellie, "Discount Shopping Program Extended to Residents", Pacific Business News, Sep. 21, 1998, 3 pp.

"Garage Management Needs", "Unit Tracking with the General Manager Professional", (http://www.ddacobusy.com/garage/idxgarg.htm), download date: Mar. 16, 1999, 2 pp.

"Route Sales Automation - Track Customers, Orders, Sales and Inventory! Route accounting . . . ", "Point of Sale System Carried in the Palm of your Hand", (http://www.Dacobusy.com/), download date: Mar. 16, 1999, 1 pg.

"Alphatech, Inc., Looking to the Future", (http://www.alphatech.com/), download date: Mar. 25, 1999, 1 pg.

"Alphatech: Technologies and Projects", (http://www.alphatech.com/secondary/techpro/compvis.html), download date: Mar. 25, 1999, 1 pg.

"IMPS: Vehicle License Plate Recognition System", "IMPS Integrated Multi-Pass System State of the Art Vehicle Plate Recognition System", (http://www.signaport.com/optasia/imps), download date: Mar. 25, 1999, 3 pp.

"MSTAR Main - Moving and Stationary Target Acquisition and Recognition (MSTAR)", (http://alphatech.com/secondary/techpro/projects/mstar/MSTAR_TopLevel.html), download date: Mar. 25, 1999, 2 pp.

"Welcome to Q Lube!" (http://www.qlube.com/), download date: Mar. 25, 1999, 1 pg.

Website: "Pricing, The Professional Pricing Society Conference Agenda", (http://www.pricing-advisor.com/conf_agn.htm), download date: Jun. 19, 1999, 10 pp.

Press Release: "Priceline.com Delivers Savings for Flexible Travelers in Side-by-Side Price Comparison", Priceline.com, Stamford, CT, May 28, 1999, 4 pp.

"Travel Industry Bellwether for A1 Commerce Players", Jupiter Communications, Copyright 1999, Jupiter Strategic Planning Services, 2 pp.

"Circuit City to Integrate E-Commerce with Store Shopping: Retailer's E-Superstore—www.circuitcity.com —to Open in July", PR Newswire, Jun. 15, 1999, 3 pp.

"Wal-Mart vs. Amazon: The Fight Begins", Yahoo! News, Jun. 9, 1999, 3 pp.

"Mercata - Group Buying Power", (http://www.mercata.com/cgi-bin/mercata/v1/pages/home.jsp), download date: Jun. 7, 1999, 3 pp.

Lazarus, David, "E-Commerce, Japanese Style", Wired Online, Jun. 7, 1999, 3 pp.

"Kmart Expands Inventory Via In-Store Kiosks", Jun. 20, 1999, RT News, (www.retailtech.com), 1 pg.

"Web Voucher", (www.pinex.com.uk/webvoucher/), download date: Mar. 14, 1999, 2 pp.

Quinn, Jane Bryant, "New Cars for Less", Newsweek, Oct. 23, 1978, Section: The Columnists, 2 pp.

"My Auto Broker - Online Auto Broker", (http://www.adverlink.com/myautobroker/), 4 pp.

Hilts, Paul, "Technology Meets Commerce: Electronic Publishing; Includes Articles on the World Wide Web and the Annual Military Book Show", ABA '96, Publisher's Weekly, 4 pp.

"About CyberSlice", (http://www.cyberslice.com/cgi-bin/WebObjects/CyberSlice:2@httpserv01/), download date: May 6, 1997, 2 pp.

"PriceWatch", (http://icon.za/-robo/prod01.htm), download date: Jan. 14, 1997, 5 pp.

Davis, Tim, "Vending Suppliers Scurry to Meet Coke-Mandated Vendor Communication", Automatic Merchandiser, Dec. 1992, 2 pp.

Kohda, Youji and Endo, Susumu, "Ubiquitos Advertising on the WWW: Merging Advertisement on the Browser", Computer Networks and SDN Systems 28; May 1, 1996, 4 pp.

"Coupon Acceptor: Coinco", Beverage Industry, Jul. 1998, No. 7, vol. 89, p. 38, 2 pp.

"Coinco Offers BA-30 Dollar Bill Acceptor", Automatic Merchandiser, Aug. 1998, 2 pp.

Conlon et al., "Press 1 for Profit", Sales and Marketing Management, Sep. 1998, 6 pp.

Karlgaard, Rich "Keep Your Eyes on the Prize", Forbes, Sep. 21, 1998, 3 pp.

Hays, Constance, "Coke Tests Unit that Can Hike Price in Hot Weather", The New York Times, Oct. 28, 1999, 3 pp.

"Coke's Automatic Price Gouging", The San Francisco Chronicle, Oct. 29, 1999, Section: Editorial, 1 pg.

Jagsi, Ajat et al., "Coca-Cola & The 'Smart' Vending Machines", (http://mba.Vanderbilt.edu/mikesher/cources/netecon/lecture/grp1.ppt), download date: Jul. 17, 2003, 12 pp.

Website: "E-vending.com - Snack Vending Machines, Online Vending Machine Catalog", (http://www.e-vending.com/combo_snack_pop_vending_machines_photos.htm), download date: Jul. 1, 2004, 3 pp.

Riordan, Teresa, "Funneling Change to Useful Pursuits", The New York Times, Jun. 9, 1997, 3 pp.

Gay, Stephen W. "Local Businesses Adopt School", Tulsa World, Sep. 6, 1995, 2 pp.

Notice of Allowance for U.S. Appl. No. 09/612,163 mailed Nov. 27, 2001, 4 pp.

Notice of Allowance for U.S. Appl. No. 09/612,163 mailed Jul. 19, 2001, 4 pp.

Office Action for U.S. Appl. No. 09/612,163 mailed Jan. 10, 2001, 12 pp.

Office Action for U.S. Appl. No. 09/612,163 mailed Feb. 29, 2000, 7 pp.

Office Action for U.S. Appl. No. 09/612,163 mailed Jul. 6, 2000, 22 pp.

Office Action for U.S. Appl. No. 09/612,163 mailed Sep. 29, 1999, 20 pp.

Notice of Allowance for U.S. Appl. No. 10/095,372 mailed May 14, 2007, 18 pp.

Notice of Allowance for U.S. Appl. No. 10/095,372 mailed May 14, 2007, 17 pp.

Office Action for U.S. Appl. No. 10/095,372 mailed Aug. 26, 2005, 12 pp.

Office Action for U.S. Appl. No. 10/095,372 mailed Mar. 4, 2005, 9 pp.

Office Action for U.S. Appl. No. 11/761,791 mailed Mar. 31, 2010, 7 pp.

Office Action for U.S. Appl. No. 11/761,826 mailed Apr. 1, 2010, 13 pp.

Office Action for U.S. Appl. No. 11/761,842 mailed Mar. 31, 2010, 8 pp.

Office Action for U.S. Appl. No. 09/713,001 mailed Jul. 12, 2004, 8 pp.

Office Action for U.S. Appl. No. 09/713,001 mailed Dec. 10, 2003, 6 pp.

Notice of Allowance for U.S. Appl. No. 10/994,913 mailed Apr. 11, 2007, 4 pp.

Office Action for U.S. Appl. No. 10/994,913 mailed Feb. 28, 2006, 6 pp.

Office Action for U.S. Appl. No. 10/994,913 mailed Aug. 16, 2005, 7 pp.

Notice of Allowance for U.S. Appl. No. 11/745,796 mailed Jul. 30, 2009, 4 pp.

Office Action for U.S. Appl. No. 11/745,796 mailed Oct. 6, 2008, 5 pp.

Office Action for U.S. Appl. No. 11/745,796 mailed Feb. 22, 2008, 5 pp.

Notice of Allowance for U.S. Appl. No. 11/745,876 mailed Apr. 27, 2010, 6 pp.

Notice of Allowance for U.S. Appl. No. 11/745,876 mailed Jan. 19, 2010, 6 pp.

Office Action for U.S. Appl. No. 11/745,876 mailed Jan. 19, 2010, 9 pp.
Office Action for U.S. Appl. No. 11/282,525 mailed Mar. 17, 2010, 43 pp.
Examiner's Answer for U.S. Appl. No. 10/902,347 mailed Oct. 22, 2009, 21 pp.
Office Action for U.S. Appl. No. 10/902,347 mailed Nov. 26, 2008, 16 pp.
Office Action for U.S. Appl. No. 10/902,347 mailed May 21, 2008, 15 pp.
Notice of Allowance for U.S. Appl. No. 11/426,204 mailed Jan. 20, 2009, 4 pp.
Notice of Allowance for U.S. Appl. No. 11/426,204 mailed Dec. 8, 2008, 6 pp.
Office Action for U.S. Appl. No. 11/426,204 mailed Jul. 3, 2008, 5 pp.
Office Action for U.S. Appl. No. 11/426,204 mailed Feb. 4, 2008, 4 pp.
Office Action for U.S. Appl. No. 11/426,204 mailed Oct. 1, 2007, 5 pp.
Office Action for U.S. Appl. No. 11/426,204 mailed May 4, 2007, 4 pp.
Office Action for U.S. Appl. No. 11/426,215 mailed May 4, 2007, 4 pp.
Office Action for U.S. Appl. No. 11/426,221 mailed May 4, 2007, 4 pp.
Notice of Allowance for U.S. Appl. No. 11/877,109 mailed Jul. 29, 2010, 4 pp.
Office Action for U.S. Appl. No. 11/877,109 mailed Nov. 5, 2009, 5 pp.
Office Action for U.S. Appl. No. 10/902,397 mailed Jan. 6, 2010, 10 pp.
Office Action for U.S. Appl. No. 10/902,397 mailed May 18, 2009, 9 pp.
Office Action for U.S. Appl. No. 11/426,163 mailed Mar. 31, 2010, 12 pp.
Office Action for U.S. Appl. No. 11/426,163 mailed Aug. 18, 2009, 7 pp.
Office Action for U.S. Appl. No. 11/426,163 mailed Dec. 10, 2008, 15 pp.
Office Action for U.S. Appl. No. 11/426,163 mailed May 21, 2008, 15 pp.
Examiner's Answer for U.S. Appl. No. 11/426,172 mailed Oct. 15, 2009, 14 pp.
Office Action for U.S. Appl. No. 11/426,172 mailed Jan 7, 2009, 12 pp.
Office Action for U.S. Appl. No. 11/426,172 mailed Jul. 28, 2008, 9 pp.
Office Action for U.S. Appl. No. 11/426,186 mailed Sep. 28, 2009, 14 pp.
Office Action for U.S. Appl. No. 11/426,186 mailed Mar. 10, 2009, 14 pp.
Office Action for U.S. Appl. No. 11/426,186 mailed Sep. 15, 2008, 12 pp.
Office Action for U.S. Appl. No. 11/426,186 mailed May 5, 2008, 9 pp.
Written Opinion for PCT/US0425497 mailed Dec. 13, 2005, 7 pp.
International Search Report for PCT/US0425497 mailed Dec. 13, 2005, 2 pp.
Office Action for U.S. Appl. No. 10/855,247 mailed Sep. 1, 2009, 25 pp.
Office Action for U.S. Appl. No. 11/426,328 mailed May 3, 2007, 4 pp.
Office Action for U.S. Appl. No. 11/426,328 mailed Oct. 6, 2006, 6 pp.
Office Action for U.S. Appl. No. 11/757,891 mailed Dec. 9, 2009, 13 pp.
Notice of Allowance for U.S. Appl. No. 11/426,332 mailed Nov. 6, 2007, 4 pp.
Office Action for U.S. Appl. No. 11/426,332 mailed Jan. 12, 2007, 5 pp.
Office Action for U.S. Appl. No. 11/426,332 mailed Aug. 25, 2006, 5 pp.
Office Action for U.S. Appl. No. 11/426,336 mailed Oct. 6, 2006, 5 pp.
Office Action for U.S. Appl. No. 11/757,918 mailed Feb. 19, 2010, 7 pp.
International Search Report for PCT/US04/16895 2 pp.
Written Opinion for PCT/US04/16895, 3 pp.
Supplementary European Search Report for European Application No. 04753679, 2 pp.

* cited by examiner

PRODUCTS AND PROCESSES FOR VENDING A PLURALITY OF PRODUCTS

CROSS-REFERENCE TO RELATED APPLICATIONS

The present application (i) claims benefit and priority under 35 U.S.C. §119(e) to U.S. Provisional Patent Application Ser. No. 60/715,088 entitled "PRODUCTS AND PROCESSES FOR VENDING A PLURALITY OF PRODUCTS" and filed on Sep. 8, 2005, and (ii) is a continuation-in-part application which claims benefit and priority under 35 U.S.C. §120 to U.S. patent application Ser. No. 10/902,397 entitled "PRODUCTS AND PROCESSES FOR VENDING A PLURALITY OF PRODUCTS" and filed on Jul. 29, 2004, which itself claims benefit and priority to:

(a) U.S. patent application Ser. No. 09/218,085, filed Dec. 22, 1998, entitled "METHOD AND APPARATUS FOR VENDING PRODUCTS", which is a continuation-in-part that claims benefit and priority to U.S. patent application Ser. No. 09/012,163 entitled "METHOD AND APPARATUS FOR AUTOMATICALLY VENDING A COMBINATION OF PRODUCTS" and filed on Jan. 22, 1998, and which issued as U.S. Pat. No. 6,397,193 on May 28, 2002, and which itself is a continuation-in-part application that claims benefit and priority to (i) U.S. patent application Ser. No. 08/947,798 entitled "METHOD AND APPARATUS FOR DYNAMICALLY MANAGING VENDING MACHINE INVENTORY PRICES" and filed on Oct. 9, 1997, and (ii) U.S. patent application Ser. No. 08/920,116 entitled "METHOD AND SYSTEM FOR PROCESSING SUPPLEMENTARY PRODUCT SALES AT A POINT-OF-SALE TERMINAL" and filed on Aug. 26, 1997, and which issued as U.S. Pat. No. 6,119,099 on Sep. 12, 2000, which is a continuation-in-part application that claims benefit and priority to U.S. patent application Ser. No. 08/822,709 entitled "SYSTEM AND METHOD FOR PERFORMING LOTTERY TICKET TRANSACTIONS UTILIZING POINT-OF-SALE TERMINALS" and filed on Mar. 21, 1997, and which issued as U.S. Pat. No. 6,267,670 on Jul. 31, 2001;

(b) U.S. patent application Ser. No. 09/713,001, filed Nov. 17, 2000, entitled "SYSTEM FOR VENDING PHYSICAL AND INFORMATION ITEMS", now abandoned, which itself claims benefit and priority to (i) U.S. Provisional Patent Application Ser. No. 60/243,153 entitled "SYSTEM FOR VENDING PHYSICAL AND INFORMATION ITEMS" and filed on Oct. 25, 2000, and (ii) U.S. Provisional Patent Application Ser. No. 60/226,830 entitled "METHOD AND APPARATUS FOR OPERATING A VENDING MACHINE" and filed on Aug. 22,2000;

(c) U.S. patent application Ser. No. 10/095,372, filed Mar. 11, 2002, entitled "METHOD AND APPARATUS FOR VENDING A COMBINATION OF PRODUCTS", which itself is a continuation-in-part application that claims benefit and priority to U.S. Patent Application Serial No. 09/012,163 entitled "METHOD AND APPARATUS FOR AUTOMATICALLY VENDING A COMBINATION OF PRODUCTS" and filed on Jan. 22, 1998, and which issued as U.S. Pat. No. 6,397,193 on May 28, 2002, and which itself is a continuation-in-part application that claims benefit and priority to (i) U.S. patent application Ser. No. 08/947,798 entitled "METHOD AND APPARATUS FOR DYNAMICALLY MANAGING VENDING MACHINE INVENTORY PRICES" and filed on Oct. 9, 1997, and (ii) U.S. patent application Ser. No. 08/920,116 entitled "METHOD AND SYSTEM FOR PROCESSING SUPPLEMENTARY PRODUCT SALES AT A POINT-OF-SALE TERMINAL" and filed on August 26, 1997, and which issued as U.S. Pat. No. 6,119,099 on Sep. 12, 2000, which is a continuation-in-part application that claims benefit and priority to U.S. patent application Ser. No. 08/822,709 entitled "SYSTEM AND METHOD FOR PERFORMING LOTTERY TICKET TRANSACTIONS UTILIZING POINT-OF-SALE TERMINALS" and filed on Mar. 21, 1997, and which issued as U.S. Pat. No. 6,267,670 on Jul. 31, 2001;

(d) U.S. patent application Ser. No. 10/855,247, filed May 27, 2004, entitled "METHOD AND APPARATUS FOR MANAGING VENDING MACHINE OFFERS", which itself claims benefit and priority to U.S. Provisional Patent Application Ser. No. 60/473,815 entitled "METHOD AND APPARATUS FOR MANAGING VENDING MACHINE OFFERS" and filed on May 28, 2003;

(e) U.S. Provisional Patent Application Ser. No. 60/491,215, filed Jul. 30, 2003, entitled "APPARATUS, SYSTEM AND METHOD FOR VENDING A COMBINATION OF PRODUCTS";

(f) U.S. Provisional Patent Application Ser. No. 60/536,277, filed Jan. 13, 2004, entitled "APPARATUS, SYSTEM AND METHOD FOR VENDING A COMBINATION OF PRODUCTS"; and (g) U.S. Provisional Patent Application Ser. No. 60/560,960, filed Apr. 9, 2004, entitled "PRODUCTS AND PROCESSES FOR VENDING A PLURALITY OF PRODUCTS VIA DEFINED GROUPS".

BACKGROUND

Applicants have previously recognized that significant benefits ensue from vending machines configured to identify a combination of products and offer the combination of products for a promotional price. For example, a parent application, U.S. patent application Ser. No. 10/095,372, describes, among other features, the creation of promotional product combinations based on supply and/or demand data.

The advantages of Applicants' previous inventions are significant. Nevertheless, given the complexity of the relevant market forces, it would be advantageous for additional apparatus, systems and methods that permit vending machines and/or operators thereof to offer a combination of products.

DETAILED DESCRIPTION

I. Introduction

Figure 1:
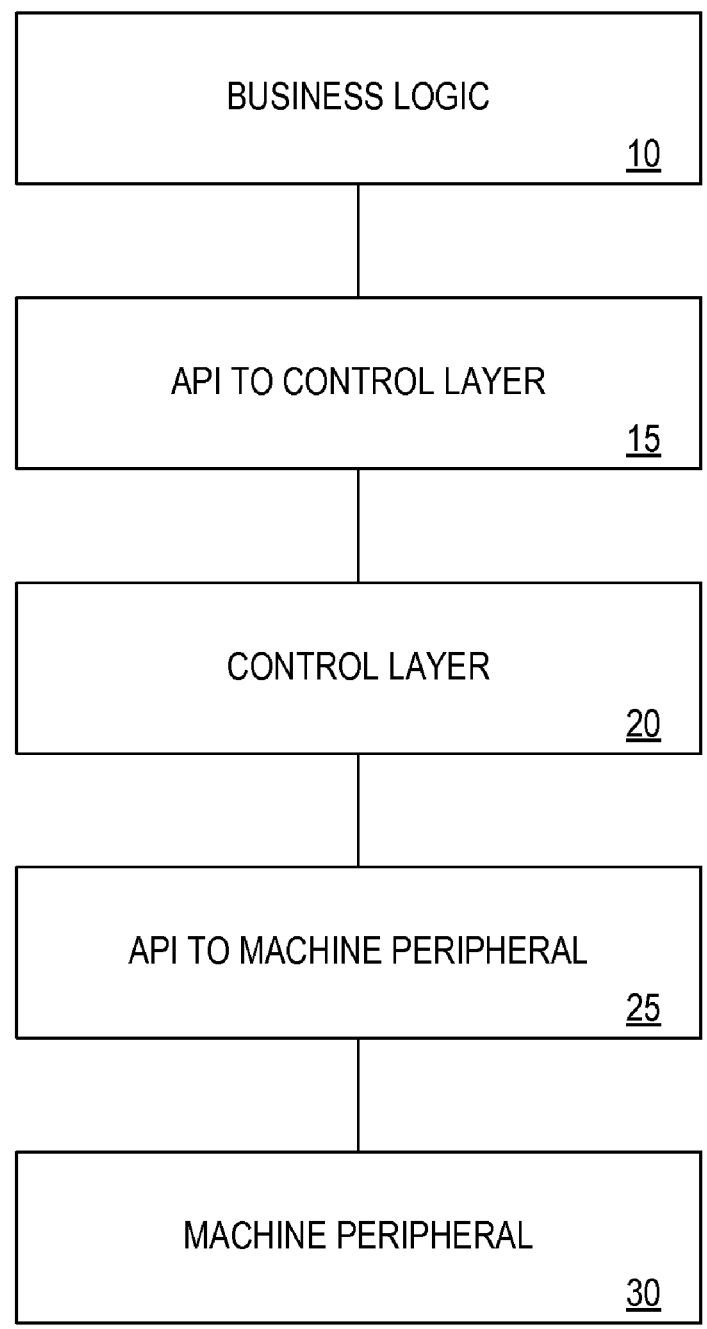
FIG. 1 depicts an embodiment of control software comprising abstract components.

Some embodiments described herein are associated with providing, by at least one vending machine, a package offer comprising an offer to buy at least a first component product from a first inventory group and a second component product from a second inventory group for a single price, wherein the first and second component products are indicated as being associated with the first and second inventory groups via (i) first and second placements of the first and second component products, respectively, and/or (ii) first and second physical indicia associated with the first and second component products, respectively. Embodiments may also or alternatively be directed to receiving, at the at least one vending machine, an indication of a selection by a customer of the first component product from the first inventory group, and processing, based at least in part on the receiving of the indication of the customer's selection of the first component product from the first inventory group, a sale, for a single price, of (i) a unit of the first component product from the first inventory group and (ii) a unit of the second component product from the second inventory group.

Some embodiments are associated with providing, by at least one vending machine, a package offer comprising an offer to buy a number of products associated with a non-price numerical limit, for a single price. Embodiments may also or alternatively comprise (i) receiving, at the at least one vending machine, an indication of a selection by a customer of a first component product associated with a first non-price numerical value, (ii) determining, by the at least one vending machine, by subtracting the first non-price numerical value from the non-price numerical limit, a remaining non-price numerical value, and/or (iii) determining, by the at least one vending machine, at least one second component product that is associated with a second non-price numerical value that is less than or equal to the remaining non-price numerical value. Some embodiments may also or alternatively recite providing, to the customer and by the at least one vending machine, an opportunity to purchase the at least one second component product along with the first component product, for the single price.

II. Terms and Definitions

Actual Product Velocity, Actual Sales Rate—The actual rate at which a given product is sold by a vending machine during a period of time. The actual rate may be expressed in various forms, including units sold per time, sales revenue per time, and gross profit per time. In one or more embodiments, the period of time used as the basis for calculating an actual sales rate may be a "fill period" or "sales period", as defined herein.

Column—A physical area within a vending machine capable of storing, holding, housing or otherwise including one or more products until it is appropriate to dispense such one or more products (e.g., upon receipt of payment from a customer; upon selection of a component product pursuant to a package offer). In one or more embodiments, a column may include an entire shelf of a vending machine. In one or more embodiments, a column may include a portion of a shelf of a vending machine (e.g., a "row"), such as that which is (a) typically identified to a consumer and/or vending machine control system (e.g., a processor; an application-specific integrated circuit) by a two character alphanumeric identifier (e.g., "A1") and (b) stocked with one or more particular items (e.g., cans of Diet Coke®), one or more similar items (e.g., 12 oz. cans), or one or more items sharing the same retail price (e.g., items priced at $0.75).

Component Product—a product, of which a unit may be sold (e.g., pursuant to an offer, such as a package offer) along with at least one other unit of the same or another product.

Fill Period, Sales Period—The period of time between restock dates.

Full Price, Retail Price—In some embodiments, the price that is normally charged for the purchase of one unit of a given product when purchased alone, (i.e. not as a component product).

Ideal Product Velocity, Target Product Velocity, Ideal Sales Rate, Target Sales Rate, Target Velocity—The desired rate at which a given product should be sold by a vending machine during a period of time, such as a sales period. The desired rate can help achieve various goals, including a desired profit, sales, inventory level and/or amount of transactions. Moreover, such goals can be represented as, e.g., a value to be achieved by a certain time, or as a value averaged over a period of time. Thus, in some embodiments, an ideal velocity may be set or calculated for each inventoried product indicating the rate at which products must be sold in order to deplete the vending machine's inventory to a certain level by the end of a given sales period (i.e. by the restock time/date or an expiration time/date). For example, an ideal product velocity may be calculated by a vending machine control system (e.g., a processor; an application-specific integrated circuit) after an operator inputs a restock date and a desired remaining inventory for the restock date (e.g., an operator may wish to have only one unit of each product remaining at the restock date so that the machine sells as many units as possible without completely selling out and thereby disappointing customers). Thus, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units of Soda A must be sold per day within the sales period in order to realize the ideal product velocity. As discussed herein, in one or more embodiments, a vending machine control system (e.g., a processor; an application-specific integrated circuit) may periodically, substantially continuously, or otherwise evaluate the difference between a product or products' actual product velocity and ideal product velocity for the purpose of making package offer decisions (e.g., in proactive inventory grouping embodiments, determining which products to assign to a certain inventory group). The actual rate at which a given product should be sold may be expressed in various forms, including units of the product sold per time, sales revenue from sales of units of the product per time, and profit from sales of units of the product per time.

Income Contribution Factor, Profit Contribution Factor—A measure of the revenue or profit realized due to the sale of a particular product. In some embodiments, a product's income contribution factor may be defined by the total amount of revenue or the total amount of profit generated by the product during a certain time period (e.g., during a fill period, between certain dates, every twenty four hours). In other embodiments, a product's income contribution factor may be represented as a percentage, such as that which may be calculated by dividing the amount of profit generated by the product in a certain period of time by the total amount of profit generated by some or all products sold through the vending machine in the time period. For example, if a vending machine realized $100 in total profit during a fill period, and a certain product was responsible for generating $12 of the profit, that product's income contribution factor could be represented as the percentage '12%'. In some embodiments, an income contribution factor may be used in determining how to allocate a product to one or more inventory groups.

Inventory Group, Package Group—A set of products. An inventory group may include a single product, or more than one product. In many embodiments, a customer may select a component product from an inventory group. In certain proactive inventory grouping embodiments, pursuant to a package offer, customers may select at least two component products, a component product selected from each of at least two inventory groups, for a single price. In certain reactive inventory grouping embodiments, pursuant to a package offer, customers may select a second component product from an inventory group that is revealed after a first component product is selected from a first inventory group. In one or more embodiments, inventory groups may be communicated to customers through colored LEDs located proximately to inventoried products (e.g., products in a "red" group may be communicated via proximately located red LEDs; products in a "green" group may be communicated via proximately located green LEDs). Alternatively or additionally, in one or more embodiments, inventory groups may be communicated to customers through one or more LCD screens. Further still, in one or more embodiments, inventory groups may be communicated to customers by virtue of the underlying component products' physical placement within one or more vending machines. For example, a first inventory group may comprise any products stocked in one or more particular columns of a vending machine, whereas a second inventory group may comprise any products stocked in one or more other columns of the vending machine. Alternatively or additionally, a first inventory group may comprise some or all of the products stocked within a first vending machine, and a second inventory group may comprise some or all of the products stocked within a second (e.g., nearby) vending machine. Furthermore, in one or more embodiments, inventory groups may be communicated to customers through the placement of physical indicia (e.g., stickers, signs, cards, flags, price tags, RFID tags) on or near the underlying component products. In some proactive and reactive inventory grouping embodiments, inventory groups may be determined by a vending machine control system (e.g., a processor; an application-specific integrated circuit) during a sales period. In other embodiments, inventory groups are not determined during a sales period (as in some proactive or reactive inventory grouping embodiments), but are rather determined prior to a sales period by an operator or other person, and are stored (e.g., in a memory) accessible to a vending machine control system.

Operator—The owner (or employee or agent thereof) of a vending machine.

Package Offer, Package Deal, Combination Deal, Combination Offer, Combination Product Offer, "Load-up" Deal, Value Combo Deal, Combo Deal—An offer enabling a customer to purchase at least two products. In many embodiments the at least two products are sold for a single price. In many embodiments, the two products are dispensed to the customer essentially simultaneously (e.g., within seconds of each other). In other embodiments, the two products are dispensed to the customer at different times (e.g., within days of each other). Typically, package offers are configured so the price of the at least two products is less than the sum of the prices of the two products, and thus the customer saves money compared to the sum of the individual component products' retail prices. However, in one or more embodiments, individual retail prices may not be communicated to consumers.

Package Instance, Potential Package—A combination of specific component products according to a package offer. Thus, a package offer defines one or more (but typically many) package instances. In some embodiments, package instances are constructed and compared to other package instances for the purpose of determining which products may be made available for selection by a customer pursuant to a package offer. In some proactive inventory grouping embodiments, package instances are constructed and compared in order to determine how to apportion inventory between two inventory groups. In some reactive inventory grouping embodiments, package instances are constructed and compared in order to determine the composition of an inventory group from which a customer may select a second component product after a first component product has been selected. Further, in some embodiments, an operator may record one or more specific package instances in a memory accessible to or part of a vending machine, so that a vending machine may process package offers pursuant to the stored specific package instances.

Package Price—The price that is charged (typically in a single transaction) for the units of products purchased pursuant to a package offer. In some embodiments, package prices reflect a net-savings to the customer when compared to the sum of the respective retail prices of the individual component products.

Product Cost, Item Cost, Cost—The cost to the operator of a unit of selling a given product. The product cost may reflect the fixed cost and/or the variable cost in selling a unit of the product. In some embodiments, stored rules may instruct a vending machine control system to not sell a product or products unless the cost of the product(s) is equal to or less than a certain price (e.g., a retail price, a package price). For example, in one or more embodiments, an operator may instruct a vending machine to only sell packages of products if the sum of the cost of two or more items selected by a customer is less than or equal to a given amount, such as an amount tendered by the customer. In other embodiments, stored rules may instruct a vending machine control system to sell a product or products even though the cost of the product or products is greater than a retail price or package price, as may be the case where the product or products' actual sales rates are above or below a certain threshold (e.g., where actual sales rates fall short of target sales rates).

Product, Item—A good or service provided by (e.g., sold by, dispensed by, handled by) a vending machine. Examples of goods provided by vending machines include beverages (e.g., cans of soda) and snacks (e.g., candy bars). Services provided by vending machines include providing access to electronic data or services (e.g., a vending machine may enable WiFi Internet access; a vending machine may permit a customer to download ring tones or other files to a cellular telephone; a vending machine may permit a customer to download songs to an MP3 player or other device).

Restock Date, Restock Time—The time and/or date that a vending machine is scheduled to be restocked by an operator (or agent thereof) of a vending machine.

Various embodiments, including products and processes, are disclosed for facilitating the sales of combinations of units of products. The disclosed embodiments are particularly suitable for use in one or more vending machines or like apparatus. In some embodiments, one or more vending machines are configured to facilitate the sale of two or more products for a single price pursuant to a package offer. According to an embodiment, a vending machine or other apparatus is configured to increase sales and/or profitability through novel processing of sales data, cost data and/or other data available to the vending machine.

In particular, various embodiments allow groups of products to be defined according to various criteria. Customers are prompted to purchase products from the groups. Thus, appropriate definition of the groups can lead to benefits such as increased sales and/or profits per time.

According to a "proactive inventory grouping" embodiment of the present invention, on a periodic, substantially continuous or event-triggered basis, sales and/or cost data is monitored and evaluated against stored rules for the purpose of determining how to apportion inventory among at least two inventory groups from which, pursuant to a package offer, a customer may select and purchase at least two products for a single price. Such an evaluation and determination may be made by a vending machine and/or a human (e.g., an operator) associated therewith. In determining how to apportion inventory to the different inventory groups, a vending machine or operator may consider a value rating of one or more products. For example, products having a relatively high value rating may be allocated to a first inventory group, while products having a relatively low value rating may be allocated to a second inventory group. Thereafter, package offers encouraging the purchase of at least two products (e.g., at least one product from each of at least two inventory groups) may be output to prospective customers, for example, through one or more output devices and/or through static indicia (e.g., painted or printed signs or stickers affixed to a vending machine and/or to component products). For example, a scrolling light emitting diode (LED) display may read "Pick any item from the red group and any item from the green group for $1.00!", and shelf-mounted LED displays located adjacent to the various qualifying products may contemporaneously flash in red and/or green to indicate the products' inventory grouping statuses (i.e. green or red). Alternatively or additionally, an operator may mount a sign to a vending machine to indicate a package offer. For example, a sign may read, "Pick any item from the top shelf and any item from the bottom three shelves for $1". The vending machine may be further configured to process package offer transactions in accordance with such advertised package offers by (i) receiving, through an input device, an indication of customer acceptance and (ii) dispensing a combination of products consistent with the advertised package offer.

According to a "reactive inventory grouping" embodiment, a customer is offered the ability to purchase a combination of products for a single price by the customer selecting a first product from a first group of inventoried products, and then the customer picking a second product from a second inventory group that is revealed to the customer after the first product is selected. In determining which inventoried products will be included in the second inventory group, a vending machine may consider a value rating of one or more products.

Further, according to some embodiments, a value rating of one or more products may be determined by considering one or more of (i) the time remaining until a restock date, (ii) the time remaining until an expiration date of a product or products, (iii) an actual sales rate of a product or products, (iv) a target or ideal sales rate of a product or products, (v) the fixed cost of a product or products, (vi) the variable cost of a product or products; (vii) the retail price of an individual unit of a product or products, (viii) the profit margin of a product or products at a given sale price such as a retail price, (ix) the profit margin of a package instance comprising a given combination of products, (x) the historical acceptance rate of a package instance comprising a given combination of products, (xi) one or more products' income or profit contribution factor(s) (e.g., measures of one or more products' historic success in the marketplace), (xii) the availability to an operator via wholesale markets of one or more products; (xiii) the number of units of a product or products in the inventory of one or more vending machines; (xiv) the number of units of a product or products in the inventory of an operator (e.g., in a warehouse; on a delivery truck); (xv) the amount of or degree to which coupons, discounts (e.g., volume discounts), rebates, trade credits or other incentives are available to vending machine operators and/or customers from product suppliers; and/or (xvi) any other consideration.

III. Apparatus and Architecture

A. Introduction

Generally, a vending machine according to various embodiments can include a device configured to manage sales transactions with customers by, among other things, receiving payment from customers, controlling the pricing and/or distribution of goods and/or controlling entitlements to services.

B. Machine Casing/Cabinetry

In some embodiments, suitable machine cabinetry may be constructed from any suitable material, including but not limited to any combination of (1) commercial grade (e.g., sixteen-gauge) steel (e.g., for exterior panels and internal shelving), (2) transparent materials such as glass or Plexiglas (e.g., for product display windows), (3) rubber (e.g., for waterproofing insulation), (4) plastic, and/or (5) aluminum.

Many commercially available machine casings can be adapted to work in accordance with various embodiments. For example, in snack machine embodiments, a suitable machine casing may comprise the 129 SnackShop manufactured by Automatic Products International, Ltd. of Saint Paul, Minn., which stands at 72"/1829 mm wide, has a width of 38 7/8"/988 mm, and a depth of 35"/889 mm. Other suitable snack machine casings include the A La Carte® machine or Studio™ series machines from Automatic Products, and the GPL SnackVendor model # 159 from Crane Merchandising Systems/Crane Co. of Stamford, Conn. Yet other adaptable snack machine casings are available from AMS Merchandising Systems, Inc. and The Wittern Group, Inc. In beverage machine embodiments, machine casings commercially available from Dixie Narco, Inc. of Williston, South Carolina may be employed. Other adaptable beverage machine casings are available from other manufacturers, including AMS Merchandising Systems, Inc., Royal Vendors, Inc., Sanden Vendo America, Inc., and The Wittern Group, Inc. Beverage machine casings may comprise a "cooler" or "glass front" style front panel, featuring a transparent front panel (e.g., glass) enabling customers to see inventory for sale. Alternatively, beverage machine casings may comprise a "bubble front" style front panel, featuring a decorative front panel, typically used to advertise a logo of a product manufacturer commercially interested in the vending machine's operation. In one or more embodiments, two vending machine casings are operatively connected. For example, a snack machine casing and a beverage machine casing may be operatively connected to facilitate package offers comprising both snacks and beverages. In such embodiments, a first "master" machine may host logic/control apparatus and transaction processing equipment (e.g., a keypad, a coin acceptor, a bill validator), whereas a second, operatively linked "satellite" or "side car" machine may merely comprise product storage and dispensing apparatus. An exemplary master and satellite vending machine configuration is described with reference to U.S. Pat. No. 6,059,142, entitled APPARATUS AND METHOD FOR VENDING MULTIPLE PRODUCTS, issued May 9, 2000 to Wittern, Jr. et al., the entirely of which is incorporated by reference herein for all purposes.

Other embodiments are contemplated as well, including combination snack and beverage vending machine embodiments, such as those available from Crain Co.

Further details concerning the suitability of machine casing/cabinetry are well known in the art, and need not be described in further detail herein.

C. Inventory Storage and Dispensing Mechanisms

Inventory storage and distribution functions of a vending machine configured in accordance with a snack machine embodiment of the present invention may include one or more conventional components, including: (i) a drive motor, (ii) metal shelves, (iii) a product delivery system (e.g., a chute, product tray, product tray door, etc.), (iv) dual spiral (i.e. double helix) product dispensing rods, (v) convertible (i.e. extendable) shelves, and/or (vi) a refrigeration unit. In embodiments using the casing of the model 129 SnackShop manufactured by Automatic Products, 3 removable shelves may be employed, together providing for 30 product rows and an inventory capacity of between 185 to 522 commonly vended snack products.

Inventory storage and distribution functions of a vending machine configured in accordance with a beverage machine embodiment of the present invention may include one or more conventional components, including: (i) metal and/or plastic shelving, (ii) product dispensing actuators/motors, (iii) product delivery chutes, and/or (iv) a refrigeration unit.

In many types of beverage and snack vending machines, operators will typically stock several units of the same product linearly arranged in a column, allowing individual units to be dispensed upon command. The same product may be stocked in more than one column. Similarly, more than one product may be stocked in a single column. Moreover, a vending machine may be configured to control access to services. Examples of services sold by vending machines include car washes, photography services and access to digital content (e.g., permitting the downloading of MP3 files to a handheld device).

Further details concerning vending machine inventory storage and dispensing mechanisms are well known in the art, and need not be described in further detail herein.

D. Payment Processing Mechanisms

The vending machine may also include one or more mechanisms for receiving payment and dispensing change, including but not limited to a coin acceptor, a bill validator, a card reader (e.g., a magnetic stripe reader; a smart card reader) and a change dispenser.

In a manner known in the art, a magnetic stripe card reader may read data on the magnetic stripe of a credit or debit card. Such a card reader may cooperate with conventional point-of-sale credit card processing equipment to validate card-based purchases through a conventional transaction authorization network (e.g., the credit card or debit card network). Alternatively or additionally, a card reader may cooperate with a vending machine processor and/or memory so as to validate and appropriately debit a prepaid account, such as a stored value account or a "subscription" account. Subscription accounts are as described at length in Applicant's U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; U.S. Pat. No. 5,988,346, entitled METHOD AND APPARATUS FOR ESTABLISHING AND MANAGING VENDING MACHINE SUBSCRIPTIONS, issued Nov. 23, 1999; U.S. Provisional Patent Application Ser. No. 60/527,988, filed Dec. 9, 2003 in the name of Breitenbach et al.; and U.S. Provisional Patent Application Ser. No. 60/668,405, filed Apr. 5, 2005 in the name of Walker et al.; the entirety of each of which is incorporated by reference herein for all purposes. Suitable card-based transaction processing systems and methods for use in some embodiments are available from USA Technologies, Inc., of Wayne, Pa.

Alternatively or additionally, a payment account may be identified through a wireless device, such as an RFID tag. RFID tags systems suitable for identifying a customer to a vending machine are available from PAYKEY USA, Inc. of Greenville, S.C. and USA Technologies, Inc.

In one or more embodiments, a coin acceptor, bill validator and change dispenser may communicate with a currency storage apparatus (a "hopper") and may comprise conventional devices such as models AE-2400, MC5000, TRC200 or the Cashflow Series 7000 Coin Manager by MEI/Mars, Incorporated. of West Chester, Pa., or CoinCo model 9300-L. The coin acceptor and bill validator may receive and validate currency that is to be stored by the currency storage apparatus. The change dispenser activates the return of coinage from the currency storage apparatus to the customer where appropriate (e.g., where a customer deposits more currency than is required for a given transaction). Such apparatus may feature Multidrop Bus (MDB) and/or Micromech peripheral capabilities, as is known in the art.

In one or more embodiments, a payment processing mechanism (such as a bill validator, coin acceptor or combination thereof) may receive and/or validate tokens, paper, cards (including magnetic strip cards, smart cards, or otherwise), vouchers, slips, coupons, or the like, so that customers may (1) receive discounted or free products (2) redeem prepaid products and/or (3) may access and utilize prepaid credits. For such embodiments, adaptable payment processing mechanisms include the BillPro® series bill validator from Coin Acceptors, Inc. and the MEI Series 2000 combo acceptor from MEI/Mars, Incorporated.

In another embodiment, a vending machine according to various embodiments may be configured to receive payment authorization and product selection commands through a wireless device communication network, directly or indirectly, from a customer's wireless device (e.g., a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc. Further, in such an embodiment, a cellular telephone may serve as an inpuVoutput device, as described herein.

Further details concerning vending machine payment processing mechanisms are well known in the art, and need not be described in further detail herein.

E. Input/Output Devices

According to various embodiments, a vending machine may include an input device for receiving input from (i) a customer (e.g., indicating an account; the selection of a product; the acceptance of an offer), and/or (ii) an operator (or agent thereof), for example, during stocking or maintenance of the vending machine. Also, a vending machine may include one or more output devices for outputting product or offer information to a customer or operator.

Many combinations of input and output devices may be employed according to various embodiments. In some embodiments, a vending machine may include more than one input device. For example, vending machine may include an exterior input device for receiving customer input and an interior input device for receiving operator input. In some embodiments, however, one or more input devices provide the dual functionality of receiving input data from both operators and customers. Likewise, a vending machine may comprise more than one output device (e.g., an LCD screen and several LEDs, as described herein). However, in some embodiments, such as those which feature touch screens (described herein), input and output functionality may be provided by a single device.

Many types of input devices are contemplated. Thus, an input device may comprise one or more of (1) a set of alphanumeric keys for providing input to the vending machine, such as the Programmable Master Menu® Keypad, (2) a selector dial, (3) a set of buttons associated with a respective set of product dispensers, (4) a motion sensor or other (e.g., weight) sensor, (5) a barcode reader, (6) a voice recognition module, (7) a Dual-Tone Multi-Frequency (DTMF) receiver/decoder, (8) a wireless device (e.g., a cellular telephone or wireless Personal Digital Assistant (PDA)), (9) a camera, such as digital video and/or digital still photographic camera, (10) a fingerprint reader, (11) a topical facial pattern scanner/reader, (12) an iris or retinal scanner, (13) a microphone, (14) an infrared receiver, and/or (15) any other device capable of receiving a command from a user and transmitting or otherwise facilitating the transmission of the command to a processor.

In one embodiment, a suitable fingerprint reader for use with the present invention includes the Fujitsu MBF200 Scanner, which is manufactured by Tacoma Technology, Inc of Taipai, Taiwan and Fujitsu Microelectronics America, Inc. of Tokyo, Japan. The Fujitsu MBF200 offers a resolution of 500 dpi, an image capture area of 12.8×15 mm (0.5"×0.6"), and a unit size of 60×40×15 mm (2.4"×1.6"×0.6"). The Fujitsu MBF200 may communicate with a vending machine processor through a USB interface. The Fujitsu MBF200 may be desirable in an embodiment where the vending machine processor is instructed through a Linux-based operating system. In embodiments featuring the Fujitsu MBF200, fingerprint matching software may be employed. Exemplary fingerprint matching software includes VeriFinger 4.2 from Neurotechnologija, Ltd. of Vilnius, Lithuania.

In another embodiment, a suitable fingerprint reader for use with the present invention includes the AF-S2 FingerLoc from AuthenTec, Inc. of Melbourne, Fla. The AF-S2 FingerLoc offers a resolution of 250 dpi, an image capture area of 13×13 mm (0.51"×0.51"), and a unit size of 24×24×3.5 mm (0.94"×0.94"×0.14"). The AF-S2 FingerLoc may communicate with a vending machine processor through a USB interface. The Fujitsu MBF200 may be desirable in an embodiment where the vending machine processor is instructed through a Microsoft® Windows®-based operating system. In embodiments featuring the AF-S2 FingerLoc, fingerprint matching software may be employed. Exemplary fingerprint matching software includes VeriFinger 4.2 from Neurotechnologija, Ltd. of Vilnius, Lithuania.

Likewise, many types of output devices are contemplated. For example, an output device may comprise a Liquid Crystal Display (LCD). Alternatively or additionally, an output device may also comprise one or more Light Emitting Diode (LED) displays (e.g., several alphanumeric multi-color or single color LED displays on the shelves of a vending machine associated proximately with each row of product inventory).

In one embodiment, an LED display screen is mounted atop the vending machine (via bolts or other mounting hardware) and is used to communicate offers (e.g., package offers) and other messages (e.g., product advertisements; inventory group information) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green) regarding current and upcoming promotions.

Further, in some embodiments, an output device comprises a printer. In one embodiment, a printer is configured to print on card stock paper (e.g., 0.06 mm to 0.15 mm thickness), such as the EPSON EU-T400 Series Kiosk Printer. Further, a printer may be capable of thermal line printing of various alphanumeric and graphical symbols in various font sizes (e.g., ranging from 9 to 24 point) on various types of paper. Additionally, such a printer may communicate with a processor (described herein) via an RS232/IEEE 12834 and/or bidirectional parallel connection. Such a printer may further comprise a 4KB data buffer.

Additionally, in some embodiments, an output device comprises an audio module, such as an audio speaker, that outputs information to customers audibly. Speakers may comprise conventional speakers or modern hypersonic speakers. An output device may include unidirectional or hypersonic speakers that can selectively focus sound to particular locations or customers, while not disturbing others who are not in the location of the focused sound. As stated, in some embodiments, a touch-sensitive screen or "touch screen" may be employed to perform both input and output functions. Suitable, commercially available touch screens for use according to various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use according to various embodiments may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein.

F. Logic/Control/Processing Apparatus

In one or more embodiments, the components of the vending machine, including the input device, output device, coin acceptor, bill validator, card (e.g., magnetic stripe) reader, change dispenser, currency storage apparatus, and product dispensing mechanism(s) (collectively, the "peripherals") communicate with, and are controlled by, a vending machine control system. In one or more embodiments, a vending machine control system comprises a processor, such as one based on the Intel® Pentium® or Centrino™ series processor.

The processor may be in communication with a memory and a communications port (e.g., for communicating with one or more other computers or vending machines). The memory may comprise non-volatile media and/or volatile media, such as an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver.

A memory may store a program for controlling a processor. The processor performs instructions of the program, and thereby operates according to various embodiments, and particularly in accordance with the processes described in detail herein. The program may be stored in a compressed, uncompiled and/or encrypted format. The program furthermore includes program elements that may be necessary or desirable, such as an operating system, a database management system and "device drivers" for allowing the processor to interface with the peripherals. Appropriate program elements are known to those skilled in the art, and need not be described in detail herein.

According to an embodiment of the present invention, the instructions of the program may be read into a main memory from another computer-readable medium, such as from a ROM or hard disk. The execution of sequences of the instructions in a program causes the processor to perform the process steps described herein. In alternate embodiments, hard-wired circuitry (e.g., application-specific integrated circuits) may be used in place of, or in combination with, software instructions for implementation of the processes of the present invention. Thus, embodiments of the present invention are not limited to any specific combination of hardware and software. Rather, any practicable configuration of hardware, circuitry, firmware and/or software may be employed, as would be apparent to one of ordinary skill in the art.

The memory also may store one or more databases. Some or all of the data stored in each database is described herein. The described data represents exemplary information only; those skilled in the art will understand that the number, content, and form of the data can be different from that which is described herein without departing from the spirit and scope of the invention. Further, despite any description of the databases as tabular, relational databases, an object-based model could be used to store and manipulate the data types of various embodiments and likewise, object methods or behaviors can be used to implement the processes of various embodiments. Moreover, although the memory may be described as being part of a vending machine, in some embodiments, a memory and/or any databases may be apart from a vending machine. For example, in one or more embodiments, a memory and/or any databases may be maintained at a central server, computer or controller. Additionally or alternatively, in one or more embodiments, a memory and/or any databases may be maintained at a separate vending machine. In such embodiments, remotely maintained memory and/or databases may be accessible to a vending machine through any practicable network communications means, medium or protocol, as would be apparent to one of ordinary skill in the art.

In one or more embodiments, data stored in a memory of a vending machine may be stored in a manner that permits transfer of all or some of such stored data in compliance with one or more vending industry standards for data transfer, including but not limited to the Digital Exchange Uniform Code Standard (DEX) and/or the Vending Industry Data Transfer Standard (VIDTS). Such data transfer standards may permit an operator to download vending machine inventory and sales data to a device, such as a PDA or a computer, so that the operator may use such data in determining one or more inventory groups, from which a customer may select items pursuant to an ongoing or future package offer, as described herein.

Thus, in one or more embodiments, the vending machine control system (e.g., a processor; an application-specific integrated circuit), in conjunction with the peripherals (e.g., through RS232 connections and/or other suitable connections), manages interactions with the user in accordance with stored business logic, described herein.

G. Retrofitting Conventional Vending Machines with a Separate Device

In one embodiment, one or more of the processor, the input device(s), RAM, ROM, output device(s) and a data storage device may be included, wholly or partially, in a separate device, such as the e-Port™ by USA Technologies Inc., that is in communication with a vending machine. The separate device may also be in communication with a network such as the Internet.

The e-Port™ is a credit and smart card-accepting unit that controls access to office and MDB vending equipment, and serves as a point of purchase credit card or RFID transaction device. The e-Port™ includes an LCD that allows for the display of color graphics, and a touch sensitive input device (touch screen) that allows users to input data to the device. The display may be used to prompt users interactively with, e.g., offers and information about their transaction status.

The separate device may alternatively be a programmed computer running appropriate software for performing various functions described herein. The separate device may be operable to receive input from customers, receive payment from customers, exchange information with a remotely located server and/or display messages to customers (e.g., package offer content). The separate device may be operable to instruct the vending machine that appropriate payment has been received (e.g., via a credit card read by the separate device) and/or that a particular product or products should be dispensed by the vending machine. Further, a separate device may be operable to instruct the vending machine to execute package promotions (e.g., including inventory group determinations), price changes, or the like.

Thus, a separate device may be operatively connected to a vending machine to perform the inventive processes described herein. In this manner, conventional vending machines may be retrofitted with such separate devices so as to perform the inventive processes described herein.

H. Network Embodiments

Various embodiments may be configured to operate in a network environment including a computer that is in communication, via a communications network, with one or more vending machines. The computer may communicate with the vending machines directly or indirectly, via a wired or wireless medium such as the Internet, LAN, WAN or Ethernet, Token Ring, or via any appropriate communications means or combination of communications means. Each of the vending machines may comprise computers, such as those based on the Intel® Pentium® or Centrino™ processor, that are adapted to communicate with the computer. Any number and type of machines may be in communication with the computer.

Communication between the vending machines and the computer, and among the vending machines, may be direct or indirect, such as over the Internet through a Web site maintained by computer on a remote server or over an on-line data network including commercial on-line service providers, bulletin board systems and the like. In yet other embodiments, the vending machines may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that vending machines and/or computers in communication with each other need not be continually transmitting to each other. On the contrary, such vending machines and/or computers need only transmit to each other as necessary or desirable, and may actually refrain from exchanging data most of the time. For example, a vending machine in communication with another machine via the Internet may not transmit data to the other machine for weeks at a time.

In an embodiment, a server, computer or controller may not be necessary or desirable. For example, various embodiments may be practiced on a stand-alone vending machine and/or a vending machine in communication only with one or more other vending machines. In such an embodiment, any functions described as performed by the server computer or data described as stored on the server computer may instead be performed by or stored on one or more vending machines.

In other embodiments, a vending machine may be in communication with a remote computer, such as a server, that provides the vending machine with and/or receives from the vending machine, e.g., all or some of the data described herein. Thus, in certain embodiments, the server may comprise certain elements or portions of certain elements such as a data storage device/memory.

In such an embodiment, the remote computer could be accessible, directly or indirectly, via a second computer or device (communicating over the Internet or other network) by a customer or operator. Accordingly, a customer or operator of the second computer or device could communicate with the remote computer via a Web browser. The second computer or device could, e.g., receive from the remote computer messages described herein as being output by the vending machine, and/or transmit to the remote computer input described herein as being provided to the vending machine. Similarly, various data described herein as received through an input device of a vending machine may be received through a Web browser communicating with a remote server, which in turn communicates with the vending machine. Thus, an operator of the vending machine, through a personal computer or other device, may have remote polling and reporting capabilities, may be able to transmit new business rules and instructions to the vending machine, and the like. Moreover, a customer may transact with a vending machine through his or her cellular telephone, PDA, laptop computer, or the like.

IV. Vending Machine Logic

A. General Software Architecture

An exemplary software architecture suitable for practicing various embodiments of the invention is disclosed. Based on the present disclosure, those of ordinary skill in the art will readily employ many other architectures that are within the scope of the present invention.

In one embodiment, a software-based control system executes instructions for managing the operation of the vending machine, and in particular in accordance with the inventive functionality described herein. Such vending machine operations include, but are not limited to: (1) product pricing (e.g., displaying prices via an LED, changing such prices where appropriate, etc.), (2) processing sales transactions by (i) receiving one or more product selection from a customer, (ii) processing appropriate payment via a payment processing mechanism, and/or (iii) actuating corresponding product dispensing mechanisms, (3) identifying package offers (for example, by determining inventory groups), (4) outputting package offers to customers via output devices (including display of graphics/content on LCD and LED displays), and/or (5) recording transaction information (inventory levels, acceptance rates for package offers, etc.).

In some embodiments, machine peripherals (e.g., machine hardware, including mechanical hardware such as input devices, output devices, inventory dispensing mechanisms, and payment processing mechanisms including coin acceptors, bill validators, card readers, change dispensers, etc.) may be controlled by the software-based control system through a standard RS-232 serial interface. In such embodiments, embedded APIs (Application Program Interfaces) and/or devices may be used to enable the software to actuate/control vending machine peripherals via RS-232 connectivity. Such vending machine peripherals may be operatively connected to the control system directly or indirectly, in any manner that is practicable.

As illustrated by FIG. 1, in one embodiment the control software that directs the control system can be divided into three abstract components. Such division may provide a clear partition of tasks, which may be desirable so that any future modification and new programming of one component can be applied without disrupting other components. Such division also permits certain details of a component to be safely ignored by other components. In FIG. 1 the three abstract components are illustrated, including a Business Logic component 10, a Control Layer component 20, and an exemplary Machine Peripheral component 30. As stated earlier, any number of machine peripherals may be employed. The Business Logic component 10 is connected to Control Layer component 20 via API 15; Control Layer component 20 is connected to Machine Peripheral component 30 via API 25.

In one embodiment the Business Logic component 10 visually represents the portion of the software that selects promotional instances, determines inventory groups, configures offers, and the like, as discussed herein. Such a component may access a rules database and an inventory database to perform such functions. The Control Layer component 20 visually represents the portion of the software which interfaces with at least one Machine Peripheral component 30, and thereby transmits commands to perform such functions as: (i) outputting offer information via an output device (i.e. a Machine Peripheral component 30), (ii) dispensing products via a product dispensing mechanism (i.e. a Machine Peripheral component 30), and/or (iii) dispensing change due to a customer via a payment processing mechanism, which may include a change dispenser and a currency storage apparatus (i.e. several Machine Peripheral components 30). As stated, the Machine Peripheral component 30 generally represents machine hardware, including mechanical hardware such as input devices, output devices, inventory dispensing mechanisms, and payment processing mechanisms including coin acceptors, bill validators, card readers, change dispensers, etc.

Notwithstanding the embodiment of FIG. 1, those of ordinary skill in the art will readily recognize that the control software may be abstractly represented in many, nonexclusive manners. Further, software may be developed and/or represented according to many well-known paradigms besides a "layered" paradigm.

B. Package Offer Rules and Execution Thereof

1. General Description

Applicants have recognized many effects that, when exploited according to many disclosed embodiments, can significantly increase the sales and/or profit per time period realized by a vending machine. Applicants have recognized that by, for example, selling products at a lower margin, but at a higher velocity or volume, the overall profitability of a vending machine can be increased. Accordingly, in some embodiments, an operator and/or vending machine may define, output and process package offers enabling customers to purchase a combination of products (from one or more vending machines) for a single price.

By encouraging the sale of at least two products (particularly for a single price, for a discounted price, or with a single payment) according to various disclosed embodiments, both vending machine operators and customers can benefit.

As customers are encouraged, through package offers, to purchase more products than they otherwise would, operators can benefit through increased sales volume. Operators further can benefit from the increased revenue and/or profitability (e.g., per time period, per transaction, per customer interaction) that results when such increases in sales volume substantially offset any discount from the packaged products' individual retail prices. Additionally, operators may economically configure machines to accept alternative payment forms that have higher transaction costs (e.g., credit cards) than conventional payment forms (e.g., cash) because of the higher per-transaction revenue and profit that results from selling combinations of products. The convenience of such alternate payment forms can prompt customers to spend more than they would have spent otherwise.

Customers can benefit through (i) the net-savings that often results when package prices are compared to the sum of the individual component products' retail prices, and/or (ii) the added convenience gained from the ability to purchase several products in a single transaction. Further, as vending machines may be configured to economically offer alternate payment forms, customers may benefit from the flexibility provided by an increased number of payment options.

2. Process Steps of Various Embodiments

Several embodiments of advantageous processes are described below to illustrate the wide breadth of the disclosed invention.

Although some embodiments described herein refer to a single vending machine as dispensing units of products, a plurality of vending machines may be configured to provide units of products. Typically, more than one vending machine may be employed to provide units of different types of products (e.g., a first vending machine which sells snack food and a second vending machine which sells carbonated beverages).

Further, although one or more embodiments are described herein as enabling the sale of packages comprising two component products, it should be understood that package offers may provide for the sale of any number of component products, including three, four and five component products.

Many of the embodiments below are described as being performed wholly by one or more vending machines. However, it will be readily apparent to one of ordinary skill in the art that these processes may be performed, in whole or part, by a person (e.g., an operator), by a vending machine, by components of a vending machine, and/or by a device in communication with a vending machine (e.g., a peripheral device, a remote computer, a cellular telephone, a PDA).

According to some embodiments, a memory stores instructions that, when executed by a vending machine control system (e.g., a processor; an application-specific integrated circuit), direct a vending machine or other apparatus to identify, output and/or process package offers. Thus, in one or more embodiments, an operator may identify one or more package offers, and may record an indication of the one or more package offers in a memory accessible to a vending machine control system (e.g., a processor; an application-specific integrated circuit), so that the vending machine control system may process transactions in accordance with the stored package offers. Alternatively, in one or more other embodiments, a vending machine control system may identify and store one or more package offers according to rules and processes described herein.

According to one embodiment, an operator and/or vending machine defines at least one inventory group, which includes at least two products that are available for sale by the vending machine. For example, the operator and/or vending machine may define an inventory group that includes three specific products (e.g., Snickers® candy bar, Milky Way® candy bar and Twix® candy bar). The operator and/or vending machine may define an inventory group by storing appropriate data in a database or other memory structure. For example, the Table immediately below discloses one manner of defining an inventory group.

TABLE 1

Example Definition of an Inventory Group

| Inventory Group Identifier | Products Included in the Inventory Group |
|---|---|
| G001 | P34 |
| G001 | P35 |
| G001 | P17 |
| G001 | P22 |

In the Table above, the group identified by code "G001" includes the four products identified by codes P34, P35, P17 and P22, respectively. One of ordinary skill in the art will readily understand any other ways to define an inventory group.

In an embodiment, an inventory group may include one or more products. Furthermore, in an embodiment, a product may be included in more than one group. Furthermore, in an embodiment, an inventoried product may be included in no group.

For example, in an embodiment, the operator and/or vending machine defines at least two inventory groups, and each of the at least two inventory groups includes at least one respective product that is available for sale.

As described in detail herein, there are many ways to advantageously determine which products are included in which groups. Generally, the products that are included in an inventory group may be indicated by any means of communicating information to a customer.

According to an embodiment, the vending machine outputs an indication of products that the at least one inventory group includes. For example, in an embodiment the vending machine may control an output device to communicate (e.g., to a potential customer near the vending machine) the products that the at least one inventory group includes. When there is more than one inventory group, the vending machine may output, for each of the inventory groups, an indication of products that the respective inventory group includes.

If employed, an output device may comprise a flat panel monitor, cathode ray terminal (CRT), liquid crystal display (LCD) or a like device that displays text and/or images (e.g., still graphics, animated graphics) as directed by the vending machine (e.g., that a group includes "any candy bar" or "anything in the top row"). Alternatively or additionally, the output device may comprise an audio output device such as a speaker that is operated by the vending machine to output appropriate sounds (e.g., synthesized sound, pre-recorded sound), typically verbal instructions/offers to potential customers. Sounds may be output with reference to one or more data files (e.g., wave tables, MP3 files).

Alternatively or additionally, the output device may comprise a plurality of colored lighting devices (e.g., LEDs, light bulbs, LCD panels), in which each colored lighting device is located proximate to one product column. The vending machine could selectively illuminate the plurality of colored lighting devices to indicate the products that a particular inventory group includes. For example, each product column may have proximate thereto a pair of LEDs, each a different color (e.g., red and green respectively). To indicate the products that a first inventory group includes, the vending machine could illuminate only the red LEDs that are proximate to the product columns of those included products. To indicate the products that a second inventory group includes, the vending machine could similarly illuminate the appropriate green LEDs.

Several variations may be readily made to the above-described method for indicating an inventory group. For example, each product column may include more than two LEDs. Similarly, each product column could include a single LED that is capable of displaying more than one color, or otherwise indicating more than one inventory group, as directed by the vending machine.

In one or more embodiments, the products that are included in an inventory group may be indicated by any means for denoting product columns. For example, physical indicia such as stickers, signs, flags, price tags, RFID tags or the like could be applied to certain product columns to indicate that the products of that column are included in an inventory group.

Further, in an embodiment, a sign (e.g., located atop a vending machine) or advertisment (displayed or communicated to the customer in any manner whether or not proximate to the vending machine) may inform a customer that an inventory group includes, for example, (1) all products of a certain type (e.g., categories of product such as candy bars or diet drinks; products from a certain manufacturer or brand, such as Mars®, Coca-Cola® or Cadbury-Schweppes®), (2) all products of a certain location (all products in the top shelf of the vending machine, any product from the right hand vending machine of an adjacently placed pair of vending machines, any product in any machine on the fourth floor of a building), (3) all products of a certain retail price (e.g., all products priced at $0.50 or less; all products priced between $0.51 and $0.75), and/or (4) certain products by name (e.g., a Snicker's® candy bar) or column identifier (e.g., "A1", "A2").

In some embodiments, the indication of inventory groups may be advantageously combined with the provision of an offer to the customer. For example, the vending machine may provide, to the customer, an offer to sell to the customer, for one predetermined price, (i) at least one unit of any product that is included in a first inventory group, and (ii) at least one unit of any product that is included in a second inventory group.

Offers, including package offers, may be output via many types of devices, such as via a flat panel monitor, cathode ray tube (CRT) monitor, liquid crystal display (LCD) or a like device that displays text and/or images as directed by the vending machine (e.g., that a package offer permits selection of "any candy bar and any beverage"). Alternatively or additionally, the output device may comprise an audio output device such as a speaker that is operated by the vending machine to output the appropriate sounds (e.g., synthesized sound, pre-recorded sound), typically verbal instructions/offers to potential customers. Sounds may be output with reference to one or more data files.

In an embodiment, a package offer may be provided by any means for communicating information to a customer. For example, a sign (e.g., located atop a vending machine; on the side of a vending machine; on the transparent glass of a vending machine) or advertisement (displayed or communicated to the customer in any manner whether or not proximate to the vending machine) may include an offer to sell to the customer, for one predetermined price, (i) at least one unit of any product that is included in a first inventory group (e.g., all candy bars), and (ii) at least one unit of any product that is included in a second inventory group (e.g., all products in a second vending machine).

In one or more embodiments, package offer and/or inventory group information may be transmitted to a device or computer operated by a customer. For example, package offer and/or inventory group information may be transmitted to a user's cellular telephone.

A package offer may be provided at various times. For example in one or more embodiments, the package offer may be provided in response to receiving payment or receiving any input (e.g., a touch screen has been pressed). Alternatively or additionally, a package offer may be provided after receiving a first selection of a product but before receiving a second selection of a second product.

A package offer may be particularly enticing, and thus more likely to be accepted, if the offer provides the customer with a discount or other benefit. For example, the vending machine could provide, to the customer, an offer to sell to the customer, for one predetermined price, (i) one unit of any product that is included in a first inventory group, and (ii) one unit of any product that is included in a second inventory group. The predetermined price could reflect a discount over the retail prices of the component products. In other words, the predetermined price could be less than the sum of (a) a price of one unit of any product that is included in the first inventory group, and (b) a price of one unit of any product that is included in the second inventory group.

According to one or more embodiments, an "acceptance" of an offer may include payment and/or selection of product(s) from one or more inventory groups that correspond to the offer. In one or more embodiments, such an acceptance may be provided directly to a vending machine, for example, through one or more input devices of a vending machine or other device (e.g., a keypad; a touch screen; a coin acceptor; a personal computer; a PDA; a cellular telephone). Alternatively or additionally, in one or more embodiments, the customer may use a device such as a personal computer, PDA or cellular telephone to accept a package offer (e.g., by using a keypad, microphone, and/or touch screen thereof). In such embodiments, a signal indicating acceptance may be transmitted from the device to a vending machine control system (e.g., a processor; an application-specific integrated circuit) through any wired or wireless communications means, medium or protocol, as would be apparent to one of ordinary skill in the art.

According to an embodiment, the vending machine may receive from a customer (whether or not in response to an offer) a selection of a first product that the at least one inventory group includes. For example, the vending machine may indicate that all candy bars are included in a first inventory group, and a customer may in response select a Snickers® candy bar (which the first inventory group includes).

In an embodiment, the vending machine may receive, from a customer, a selection of (i) a first product that one of the inventory groups includes, and (ii) a second product that another one of the inventory groups includes. In such an embodiment, the selection of products may be received simultaneously (e.g., by pressing a single button or icon representing a specific package instance). Alternatively, the vending machine may receive, from the customer, a first selection of a first product, and then a second selection of a second product.

As is well known, selection of products may be made in many ways. Customers may press certain combinations of buttons (e.g., "A1" indicates a particular product column, so the customer may press an "A" button and then press a "1" button on the keypad or touch screen of the vending machine). Such buttons may be physical buttons (e.g., composed of plastic and appropriately in communication with a processor of the vending machine). Such buttons may additionally or alternatively be "soft buttons" (e.g., graphically displayed on a touch-screen device, and responsive to pressure resulting from the customer pressing the appropriate areas of the touch screen). In one embodiment, soft buttons may comprise graphic icons representative of one or more products within one or more inventory groups. Many other ways of selecting one or more products are readily understood by one of ordinary skill in the art.

According to one or more embodiments, the vending machine may process a sale of (i) a unit of the first product selected by the customer, and (ii) a respective unit of at least one additional product, for a single price. In processing the sale, the vending machine will typically await sufficient payment, dispense the appropriate units of the appropriate products, and/or provide change if any change is due the customer. In some embodiments, a vending machine may debit a prepaid account, such as a "subscription" or prepaid unit account described with reference to Applicant's U.S. Pat. Nos. 6,298,972; 6,085,888; 5,988,346; U.S. Provisional Patent Application Ser. No. 60/527,988; and U.S. Provisional Patent Application Ser. No. 60/668,405.

The at least one additional product may have been explicitly selected by the customer, for example, by pressing appropriate buttons that indicate the additional product(s). Additionally or alternatively, the at least one additional product may have been selected "for" the customer by the operator and/or vending machine control system in various manners. For example, the at least one additional product may be a product which is, by default, added to an order by a customer. In another embodiment, the at least one additional product may be offered to a customer ("would you like a stick of gum for an extra ten cents?") and "selected" by the customer when the customer accepts the offer (e.g., pressing an "OK" button).

According to an embodiment, the vending machine may process a sale of a unit of the first product and a unit of the second product upon receiving from the customer one payment of at least a predetermined price. For example, the vending machine may receive from the customer a single payment (e.g., a dollar bill is inserted, a credit card account is charged) which constitutes the predetermined price. Alternatively, the vending machine may receive from the customer a single payment which exceeds the predetermined price. Further still, the vending machine may receive from the customer an authorization to debit an amount less than, equal to or greater than a predetermined price from a prepaid account, such as a "subscription" or prepaid unit account described with reference to Applicant's U.S. Pat. Nos. 6,298,972; 6,085,888; 5,988,346; U.S. Provisional Patent Application Ser. No. 60/527,988; and U.S. Provisional Patent Application Ser. No. 60/668,405. The vending machine may provide change to the customer as appropriate.

In addition to the features and embodiments described above, it may be highly advantageous to define inventory group(s) according to various processes and/or utilizing various information. Accordingly, many embodiments for defining inventory groups are described in detail immediately below.

C. Proactive Inventory Grouping

In "proactive inventory grouping" embodiments, various data (e.g., product sales data, product cost data) may be employed by an operator and/or vending machine control system to determine how to apportion inventory among inventory groups (typically at least two inventory groups) before a customer selects any product (e.g., pursuant to a package offer). Before or after the apportioning of products to inventory groups is complete, package offers encouraging the purchase of at least two products from at least two inventory groups may be provided to prospective customers (e.g., output through a vending machine's output device; printed on a sign an affixed to a vending machine by an operator).

Of course, steps performed in a proactive inventory grouping embodiment does not imply that those steps may only be performed in a proactive inventory grouping embodiment.

A proactive inventory grouping process by which one or more inventory groups are each defined to include one or more respective products may be initiated periodically, substantially continuously or after an event (e.g., a transaction, a restocking, a power-up, a command received from an operator). It can be desirable that customers throughout each day will receive the same ability to purchase products from the same inventory groups (e.g., one customer will not be offered the ability to select products from a more or less favorable inventory grouping than that which was provided to another customer that day). Thus, in embodiments where the process is initiated periodically, it may be desirable to set the time interval between process executions (i.e. defining inventory groups) so that the process is executed at convenient times (e.g., every 24 hours starting at midnight).

Alternatively or additionally, in embodiments where the process is executed after a triggering event such as a transaction with a customer, it may be desirable that the process is initiated a number of minutes after a transaction, when no intervening transaction has been initiated or otherwise processed (e.g., the process is initiated 30 minutes after a transaction, provided no intervening transaction has been consummated). In this manner, it may be safe to assume that the machine is experiencing a lull in sales, and that potential customers accordingly may not witness any change of inventory groupings/apportionments (i.e. a customer is unlikely to walk up to the machine and witness any reallocation of inventory from a "red" group to a "green" group).

Figure 2:
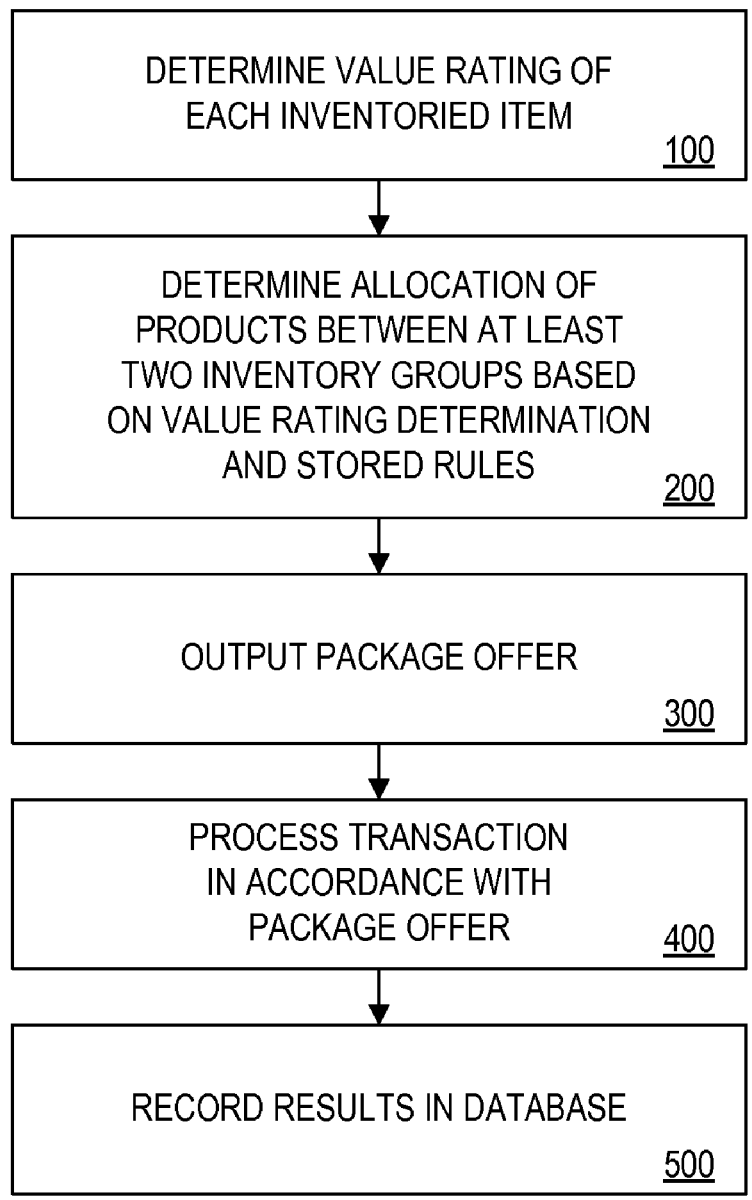
FIG. 2 illustrates an embodiment of a proactive inventory-grouping embodiment.

According to one proactive inventory grouping embodiment, which is illustrated by FIG. 2, the illustrated proactive inventory grouping process functions to, among other things, allocate products available for sale to inventory groups based on (1) the relative value ratings of the products, and/or (2) stored rules for determining, among other things, whether products should be included in package offers. A description of the steps of FIG. 2, which provides a flow chart for such a proactive inventory grouping process, follows:

1. Step 100: Determine Value Rating of Each Inventoried Item

At Step 100, the operator and/or vending machine may determine a value rating of products by, for example, accessing an inventory database to determine, among other things, products in inventory and characteristics thereof.

The value ratings of products may be used to determine the products which various inventory groups include. For example, each product that a first inventory group includes may have a rating that is not less than a rating of any product that the second inventory group includes. As another example, a first inventory group may include a certain portion of the highest rated products (e.g., the products with the five highest value ratings; the highest 50%, by value rating, of all products).

The Table immediately below describes an example inventory database:

TABLE 2

Example Inventory Database

| Product Name | Row Position Identifier | Product Category | Retail Price | Cost | Margin | Quantity at Beginning of Fill Period | Quantity Remaining | Restock Date | Actual Sales Rate | Ideal Sales Rate |
| --- | --- | --- | --- | --- | --- | --- | --- | --- | --- | --- |
| Coca-Cola ® | A1 | Beverage | $.75 | $.35 | $.40 | 20 | 8 | Jun. 30, 2003 | 1.2/day | 1.3/day |
| Diet Coke ® | A2 | Beverage | $.75 | $.30 | $.45 | 20 | 6 | Jun. 30, 2003 | 1.4/day | 1.3/day |
| A&W Root Beer ® | A3 | Beverage | $.65 | $.35 | $.30 | 20 | 9 | Jun. 30, 2003 | 1.1/day | 1.3/day |
| Doritos ® | B1 | Snack | $.50 | $.30 | $.20 | 25 | 11 | Jun. 30, 2003 | 1.4/day | 1.6/day |
| Lay's ® Potato Chips | B2 | Snack | $.75 | $.30 | $.45 | 25 | 7 | Jun. 30, 2003 | 1.8/day | 1.6/day |
| Cheetos ® | B3 | Snack | $.60 | $.30 | $.30 | 25 | 17 | Jun. 30, 2003 | 0.8/day | 1.6/day |
| Double-Mint ® | C1 | Chewing Gum | $.35 | $.20 | $.15 | 40 | 18 | Jun. 30, 2003 | 2.2/day | 2.6/day |
| Juicy Fruit ® | C2 | Chewing Gum | $.35 | $.20 | $.15 | 40 | 23 | Jun. 30, 2003 | 1.7/day | 2.6/day |
| Dentyne ® | C3 | Chewing Gum | $.40 | $.20 | $.20 | 40 | 36 | Jun. 30, 2003 | 1.1/day | 2.6/day |

As the above inventory database illustrates, for each product, a corresponding product category, retail price, cost, margin, quantity at the beginning of the fil period, quantity remaining as of the current date/time, restock date, actual sales rate and ideal sales rate. The data stored by such a database may be entered by an operator (e.g., who restocks the vending machine), determined by the vending machine with its peripheral devices (e.g., data indicating that a product has been sold, that an amount of money has been received), set randomly, and/or calculated from available data (e.g., other data stored by the inventory database or another database).

The exemplary data in the above inventory database assumes that the beginning of the fill period was Jun. 15, 2003, and that the current date is Jun. 25, 2003 (i.e. 10 days into the fill period). Further, the exemplary data in the above inventory database will be referred to throughout the remaining discussion of this process to illustrate steps of the example proactive inventory grouping embodiment in which the value rating of individual products are considered. For the purpose of this ongoing example, it shall be assumed that a package offer to a customer will define two products which may be purchased together for $1.00, in which one product is included in a first ("green") inventory group, and one product is included in a second ("red") inventory group.

At Step 100 of FIG. 2, a value rating is determined for each inventoried product. There are many ways that value ratings could be represented and many ways that value ratings could be determined.

A value rating may be represented as a numerical quantity (e.g., a sum, an average, a rate), a set of numerical quantities (e.g., a vector, a matrix), or any other quantity that may be used for purposes of calculation, comparison and/or evaluation. A value rating may also be qualitative, such as "high", "medium", or "low"; "popular" or "unpopular"; "high cost" or "low cost"; etc. In one or more embodiments, the value rating of one or more products may be determined by considering one or more of (i) the time remaining until a restock date, (ii) the time remaining until an expiration date of a product or products, (iii) an actual sales rate of a product or products, (iv) a target or ideal sales rate of a product or products, (v) the fixed cost of a product or products, (vi) the variable cost of a product or products; (vii) the retail price of an individual unit of a product or products, (viii) the retail profit margin of a product or products when sold for the retail price, (ix) the profit margin of a package instance comprising a given combination of products; (x) the historical acceptance rate of a package instance comprising a given combination of products, (xi) one or more products' income or profit contribution factor(s); (xii) the availability to an operator via wholesale markets of one or more products; (xiii) the number of units of a product or products in the inventory of one or more vending machines; (xiv) the number of units of a product or products in the inventory of an operator (e.g., in a warehouse; on a delivery truck); (xv) the amount of or degree to which coupons, discounts (e.g., volume discounts), rebates, trade credits or other incentives are available to vending machine operators and/or customers from product suppliers; and/or (xvi) any other consideration.

Thus, a value rating may be determined using a formula in which any of the above criteria (i) through (xvi) may serve as variables. For example, in one embodiment, a value rating is determined by identifying a product's retail profit margin (as determined by subtracting the product's cost from the product's retail price). For example, following the exemplary data in the above inventory database, the vending machine control system would determine that a Diet Coke® soda has a margin of $0.45. The value rating of each product may be that product's margin, some proportion of the margin, or some other variation of the margin (e.g., the product's margin multiplied by its actual sales rate).

In another embodiment, value ratings may be determined by multiplying a product's margin by its actual sales rate expressed as a percentage of the product's ideal sales rate. By using a product's actual sales rate as a basis for predicting future sales, the vending machine control system can determine the likelihood (e.g., as a percentage) that the particular product will sell at the product's ideal sales rate. In turn, by multiplying this percentage by the product's margin, a value rating can be determined that may provide some useful insight into the profit potential of a given product. The table immediately below illustrates such an embodiment in the context of the ongoing example. In the illustrated embodiment, the value rating of each product (as described above in the inventory database) is calculated by multiplying each product's margin by a percentage that reflects the product's actual sales rate divided by the product's ideal sales rate:

TABLE 3

Values calculated based on Actual and Desired Sales Rates

| Product | Margin | Actual Sales Rate | Ideal Sales Rate | Actual Sales Rate as percent of ideal sales rate | Value Rating |
|---|---|---|---|---|---|
| Coca-Cola ® | $.40 | 1.2/day | 1.3/day | 92% | $.37 |
| Diet Coke ® | $.45 | 1.4/day | 1.3/day | 107% | $.48 |
| A&W Root Beer ® | $.30 | 1.1/day | 1.3/day | 85% | $.26 |
| Doritos ® | $.20 | 1.4/day | 1.6/day | 88% | $.18 |
| Lay's ® Potato Chips | $.45 | 1.8/day | 1.6/day | 113% | $.51 |
| Cheetos ® | $.30 | 0.8/day | 1.6/day | 50% | $.15 |
| Double-Mint ® | $.15 | 2.2/day | 2.6/day | 85% | $.13 |
| Juicy Fruit ® | $.15 | 1.7/day | 2.6/day | 65% | $.10 |
| Dentyne ® | $.20 | 1.1/day | 2.6/day | 42% | $.08 |

In various embodiments, products can be scored, sorted and/or ranked based on their relative value ratings, and such data can be stored in RAM (e.g., of a vending machine; of an operator's computer) pending Step 200, below, at which point the scoring, sorting and/or ranking may be considered in the allocation of products to inventory groups. Alternatively or additionally, an operator may record an indication of the ranked products (e.g., on a piece of paper; by using a spreadsheet program such as Microsoft® Excel®; by using a database program). Thus, following the ongoing example (in which the value rating of each product in the above inventory database was calculated by multiplying each product's margin by its actual sales rate as a percentage of its ideal sales rate), inventoried products can be sorted in descending order based on their relative value ratings, as illustrated by the table immediately below:

TABLE 4

Values calculated based on Actual and Ideal Sales Rates

| Product | Margin | Actual Sales Rate | Ideal Sales Rate | Actual sales rate as percent of ideal sales rate | Value Rating |
|---|---|---|---|---|---|
| Lay's ® Potato Chips | $.45 | 1.8/day | 1.6/day | 113% | $.51 |
| Diet Coke ® | $.45 | 1.4/day | 1.3/day | 107% | $.48 |
| Coca-Cola ® | $.40 | 1.2/day | 1.3/day | 92% | $.37 |
| A&W Root Beer ® | $.30 | 1.1/day | 1.3/day | 85% | $.26 |
| Doritos ® | $.20 | 1.4/day | 1.6/day | 88% | $.18 |
| Cheetos ® | $.30 | 0.8/day | 1.6/day | 50% | $.15 |
| Double-Mint ® | $.15 | 2.2/day | 2.6/day | 85% | $.13 |
| Juicy Fruit ® | $.15 | 1.7/day | 2.6/day | 65% | $.10 |
| Dentyne ® | $.20 | 1.1/day | 2.6/day | 42% | $.08 |

In embodiments where value ratings of products are determined based on profit contribution factors, such products might be ranked or sorted according to their relative profit contribution percentages. For example, if a vending machine which sold only products A, B and C during a fill period realized a total of $100 in profit, $45 of which was generated through the sale of product A, $40 through product B and $15 through product C, then the products would be sorted in the order of A (45% of the total profit), B (40% of the total profit) and C (15% of the total profit). Further, in some embodiments, only those products that remain in inventory (i.e. are available for sale) at the time when Step 100 is executed are considered in the ranking or sorting, and thus, in the subsequent allocation procedure of Step 200, which defines one or more inventory groups.

Again, in one or more embodiments, a value rating (and thus any ensuing ranking and/or allocation to one or more inventory groups as described herein) may be based on the fixed and/or variable cost of one or more products. For example, a product having a fixed or variable cost greater than or equal to 50% of its retail price may (e.g., at Step 100) be deemed "high cost" or "low margin", and may accordingly (e.g., at Step 200) be allocated to a first inventory group, from which a customer may (e.g., at Step 400) select one or more items pursuant to a package offer. Further, a product having a fixed or variable cost less than 50% of its retail price may be deemed "low cost" or "high margin", and may be allocated to a second inventory group, from which a customer may select one or more items pursuant to a package offer. In this manner, operators and/or vending machines may allocate inventory to two or more inventory groups in a way that requires customers to offset savings afforded them through the purchase of low margin or high cost item with a required, simultaneous purchase of at least one high margin or low cost item.

2. Step 200: Determine Allocation of Products to Inventory Groups Based on Value Rating Determination and Stored Rules The value rating associated with each product may be used in assigning products to inventory groups.

In one embodiment, an inventory group may define a given number of component product "slots", or a designated number of products or units of product that may be allocated to that inventory group. In other words, an inventory group is defined in part according to how many products or units of product the inventory group should include.

For example, a vending machine may be configured to have two inventory groups, such as "green" group and "red" group, in which the red group has three component product slots and the green group has six component product slots. Thus a customer might be offered to select one component product from the three red slots (i.e. select one product from three possible products) and one component from the six green slots (i.e. select one product from six possible products). The slots of a group may be "filled" according to value ratings of products. For example, the six products having the highest profit contribution factors may be allocated to the "green" inventory group, and As described above, two or more groups may include the same product, and no group may include certain products.

In another embodiment, a predetermined percentage of the products (or of only the products which are available for sale, such as those which are currently in a vending machine's inventory) may be allocated to each group so that, for example, 50% of the products will be allocated to the "red" group and the remaining 50% of products will be allocated to the "green" group. In particular, it can be advantageous to allocate similar products to a group. For example, the top 50% (by value rating) of products are allocated to one group, and the remaining products are allocated to another group.

In another embodiment, all products having a value rating over a certain threshold (e.g., over $0.25) may be placed in a particular inventory group (e.g., in the "red" inventory group).

Each inventory group may be associated with a rule (e.g., a recorded value rating-based allocation rule) defining the products that are allocated to the inventory group. For example, in an embodiment where three component product slots are "red" and six component product slots are "green", a profitability-based allocation rule may provide that (1) the three inventoried products having the highest value ratings are to be allocated to the "red" inventory group, and (2) the six inventoried products having the lowest value ratings are to be allocated to the "green" inventory group. Thus, continuing with the ongoing example, Lay's® Potato Chips, Diet Coke® and Coca-Cola® would be allocated to the red inventory group; and A&W Root Beer®, Doritos®, Cheetos®, Double-Mint®, Juicy Fruit® and Dentyne® would be allocated to the green inventory group. Accordingly, a package offer may provide that a customer may purchase one product from the red group and one product from the green group for $1.00.

In an alternate embodiment, rather than having a fixed number of inventory slots or a percentage-based division of products among inventory groups, the number of slots in each inventory group may be determined randomly and/or pursuant to a genetic algorithm, whereby a given slot configuration is tested randomly and evaluated against other configurations.

Further, alternatively or additionally, a set of package offer rules may also be employed in determining how to allocate products to different inventory groups. An exemplary Package Offer Rules Database is represented by the Table immediately below:

TABLE 5

Package Offer Rules Database

| Package Offer Rule Number | Rule |
|---|---|
| 1 | Products from "beverage" category cannot be in same inventory grouping as products from "chewing gum" category. |
| 2 | Total margin of package instance based on $1.00 package price cannot be equal to or less than 50% of the sum of the individual component products' margins. |
| 3 | Do not allocate to inventory groups those products selling at ≧110% of target sales rate. |
| 4 | Cheetos ® must be both in red and green inventory groups |

Although rules may be represented as being stored in a database for reference, such rules may be implemented in an wide variety of manners, such as (i) "hard coded" into software, firmware and/or hardware, and (ii) coded in software/firmware/hardware with reference to parameters which are stored in a database or other memory structure. Moreover, such rules may be printed, so that an operator may reference them visually.

As illustrated, a database may provide one or more rules that govern the allocation of products to inventory groups, whether or not with reference to the value ratings of the products. The exemplary data in the above database of Table 5 depicts several rules. For example, as demonstrated by Package Offer Rule Number 1, a package offer rule may provide that products from certain categories may or may not be packaged with products from other categories. Such a rule may be desirable to ensure that only certain combinations of products are offered and/or so that certain combinations of products are not offered. For example, it may be decided (e.g., by an operator) that certain products complement each other, as may a beverage and a snack. Conversely, it may be decided (e.g., by an operator) that certain products should not be included in a package offer (e.g., as in Package Offer Rule Number 1, "beverages" cannot be included in package offers with "chewing gum"). Products that are affected by such rules (e.g., whether a product is a "beverage") can be determined, for example, by appropriate notation or data stored in an inventory database, on an RFID tag, or otherwise. For example, all products that are "beverages" can be indicated in an inventory database as such by a flag in the corresponding record of the product. Alternatively, the rule which refers to beverages can in fact directly refer to a specific plurality of products (e.g., each identified by a respective product code).

Further, as demonstrated by Package Offer Rule Number 2, a package offer rule may provide that the total margin of a package instance, based on a given package price, cannot be equal to or less than a certain percent of the sum of the individual component product's margins (based on their respective individual retail prices).

Similarly, a package offer rule may provide that the total margin of a package instance, based on a given package price, cannot be less than the margin that would result from a sale of the individual component products at their retail prices, unless a threshold volume of sales (e.g., as measured by units sold, or units sold per time period) for one or more of the component products is likely to be achieved by virtue of the component products' inclusion in a package offer. Such a rule may be desirable to ensure that any discounts offered by way of package offers are sufficiently offset by an increase in sales volume. For example, by requiring that a certain package instance have a certain historic acceptance rate, operators can rest assured that a discount offered for the products by virtue of a package price that is less than the sum of the component products' individual retail prices will not likely result in a decrease in profits.

Further still, a package offer rule may provide that products selling above or below a given actual sales rate may or may not be included in certain inventory groups (or in any inventory group). For example, Package Offer Rule Number 3 illustrates a rule that provides that a product having an actual sales rate above a certain threshold is not to be included in inventory groups (e.g., any inventory group which might be used in a package offer). Such a rule can be useful in preventing price dilution that may otherwise result when very popular products are sold on promotion through package offers. As is known, price dilution generally involves the negative effect on profitability that can ensue when a product is sold for a price lower than a customer otherwise might have paid for the product.

Some embodiments can reduce or eliminate the effects of dilution that may otherwise result when package prices are less than the sum of the individual component products' retail prices. In other words, because very popular products are highly likely to sell at their current retail prices, it may be decided (e.g., by an operator) that very popular products should not ever be sold at a discount, even for purposes of promoting the sale of additional (relatively less popular) products through package offers. Alternatively, it may be desirable to package together only products having actual sales rates above a certain threshold with products having actual sales rates below a certain threshold. In this manner, an operator may attempt to leverage the popularity of a given product to sell additional, relatively less popular products.

Further still, an inventory group may be defined to include a particular set of products based on a product the customers first selects (e.g., if product A1 is selected, then the second inventory group is defined to include products B1, B2 and B3).

Moreover, a rule may provide that particular products are to be included in some, all or no inventory groups. For example, Package Offer Rule Number 4, above, illustrates an example rule that requires Cheetos® to be included in both green and red inventory groups, regardless of value rating.

Thus, continuing with the ongoing example, the table immediately below illustrates the effect of Package Offer Rules 1, 3 and 4 on the inventory group allocations:

TABLE 6

Effect of Package Offer Rules

| Product | Product Category | Retail Price | Margin | Actual Sales Rate as percent of ideal sales rate | Preliminary Inventory Grouping (i.e. before application of Package Offer Rules) | Inventory Grouping after considering Package Offer Rules | Relevant Package Offer Rule (from Package Offer Rule Database) |
|---|---|---|---|---|---|---|---|
| Lay's ® Potato Chips | Snack | $.75 | $.45 | 113% | Red | None | 3 |
| Diet Coke ® | Beverage | $.75 | $.45 | 107% | Red | Red | N/a |
| Coca-Cola ® | Beverage | $.75 | $.40 | 92% | Red | Red | N/a |
| A&W ® Root Beer | Beverage | $.65 | $.30 | 85% | Green | None | 1 |
| Doritos ® | Snack | $.50 | $.20 | 88% | Green | Red | N/a |
| Cheetos ® | Snack | $.60 | $.30 | 50% | Green | Green, Red | 4 |
| Double-Mint ® | Chewing Gum | $.35 | $.15 | 85% | Green | Green | N/a |
| Juicy Fruit ® | Chewing Gum | $.35 | $.15 | 65% | Green | Green | N/a |
| Dentyne ® | Chewing Gum | $.40 | $.20 | 42% | Green | Green | N/a |

As shown, Package Offer Rule 3, which functions to prevent packaging of products which have sales rates greater or equal to 110% of their target sales rates, precludes the inclusion in any package offer of Lay's® potato chips, which has an actual sales rate of 113% of its target sales rate. Further, pursuant to Package Offer Rule 4, Cheetos® are allocated to both the red and green inventory groups, despite the initial value rating-based allocation of Cheetos® solely to the green inventory group. Additionally, considering Package Offer Rule 1, A&W Root Beer®, a beverage, cannot be included in the green inventory grouping because chewing gum products preliminarily exist in the green inventory grouping as a result of the above-illustrated allocation based on value rating.

Thus, without yet considering Package Offer Rule 2, the possible combinations of component products (i.e. the package instances) are illustrated in the table immediately below:

TABLE 7

Possible Combinations

| Product 1 | Product 2 |
|---|---|
| Diet Coke ® | Cheetos ® |
| Diet Coke ® | Double-Mint ® |
| Diet Coke ® | Juicy Fruit ® |
| Diet Coke ® | Dentyne ® |

TABLE 7-continued

Possible Combinations

| Product 1 | Product 2 |
|---|---|
| Coca-Cola ® | Cheetos ® |
| Coca-Cola ® | Double-Mint ® |
| Coca-Cola ® | Juicy Fruit ® |
| Coca-Cola ® | Dentyne ® |
| Doritos ® | Cheetos ® |
| Doritos ® | Double-Mint ® |
| Doritos ® | Juicy Fruit ® |
| Doritos ® | Dentyne ® |
| Cheetos ® | Cheetos ® |
| Cheetos ® | Double-Mint ® |
| Cheetos ® | Juicy Fruit ® |
| Cheetos ® | Dentyne ® |

However, considering Package Offer Rule 2, which provides that the total margin of a package instance based on a $1.00 package price cannot be equal to or less than 50% of the sum of the individual component product's margins, it becomes apparent that the package instance where Coca-Cola® and Cheetos® are purchased together for the package price of $1.00 violates Package Offer Rule 2. The table immediately below shows, for each potential instance in the ongoing example, whether or not that package instance violates Package Offer Rule 2:

TABLE 8

Violation of Package Offer Rule 2

| Product 1 | Product 1 Retail Price | Product 1 Cost | Product 1 Margin at Retail Price | Product 2 | Product 2 Retail Price | Product 2 Cost | Product 2 Margin at Retail Price | Total Margin of Package Instance at $1.00 Package Price (i.e. $1.00 - (Cost Product 1 + Cost Product 2) | Sum of Product 1 Margin at Retail Price + Product 2 Margin at Retail Price | Violates Package Offer Rule 2? |
|---|---|---|---|---|---|---|---|---|---|---|
| Diet Coke ® | $.75 | $.30 | $.45 | Cheetos ® | $.60 | $.30 | $.30 | $.40 | $.75 | No |
| Diet Coke ® | $.75 | $.30 | $.45 | Double-Mint ® | $.35 | $.20 | $.15 | $.50 | $.60 | No |
| Diet Coke ® | $.75 | $.30 | $.45 | Juicy Fruit ® | $.35 | $.20 | $.15 | $.50 | $.60 | No |
| Diet Coke ® | $.75 | $.30 | $.45 | Dentyne ® | $.40 | $.20 | $.20 | $.50 | $.65 | No |
| Coca-Cola ® | $.75 | $.35 | $.40 | Cheetos ® | $.60 | $.30 | $.30 | $.35 | $.70 | Yes |
| Coca-Cola ® | $.75 | $.35 | $.40 | Double-Mint ® | $.35 | $.20 | $.15 | $.45 | $.55 | No |
| Coca-Cola ® | $.75 | $.35 | $.40 | Juicy Fruit ® | $.35 | $.20 | $.15 | $.45 | $.55 | No |
| Coca-Cola ® | $.75 | $.35 | $.40 | Dentyne ® | $.40 | $.20 | $.20 | $.45 | $.60 | No |
| Doritos ® | $.50 | $.30 | $.20 | Cheetos ® | $.60 | $.30 | $.30 | $.40 | $.50 | No |
| Doritos ® | $.50 | $.30 | $.20 | Double-Mint ® | $.35 | $.20 | $.15 | $.50 | $.35 | No |
| Doritos ® | $.50 | $.30 | $.20 | Juicy Fruit ® | $.35 | $.20 | $.15 | $.50 | $.35 | No |
| Doritos ® | $.50 | $.30 | $.20 | Dentyne ® | $.40 | $.20 | $.20 | $.50 | $.40 | No |
| Cheetos ® | $.60 | $.30 | $.30 | Cheetos ® | $.60 | $.30 | $.30 | $.40 | $.60 | No |

TABLE 8-continued

Violation of Package Offer Rule 2

| Product 1 | Product 1 Retail Price | Product 1 Cost | Product 1 Margin at Retail Price | Product 2 | Product 2 Retail Price | Product 2 Cost | Product 2 Margin at Retail Price | Total Margin of Package Instance at $1.00 Package Price (i.e. $1.00 - (Cost Product 1 + Cost Product 2) | Sum of Product 1 Margin at Retail Price + Product 2 Margin at Retail Price | Violates Package Offer Rule 2? |
|---|---|---|---|---|---|---|---|---|---|---|
| Cheetos ® | $.60 | $.30 | $.30 | Double-Mint ® | $.35 | $.20 | $.15 | $.50 | $.45 | No |
| Cheetos ® | $.60 | $.30 | $.30 | Juicy Fruit ® | $.35 | $.20 | $.15 | $.50 | $.45 | No |
| Cheetos ® | $.60 | $.30 | $.30 | Dentyne ® | $.40 | $.20 | $.20 | $.50 | $.50 | No |

As shown in the above example, the package instance including Coca-Cola® and Cheetos® is impermissible according to Package Offer Rule 2. Thus, an operator and/or vending control system may make an adjustment to the inventory group allocations so that Coca-Cola® is not offered with Cheetos®. Because, in this example, Rule 4 provides that Cheetos® must be included in both the green and red inventory groups, Coca-Cola® may be removed from the red inventory group so that Coca-Cola® cannot be selected by a customer along with Cheetos®, a green inventory product, pursuant to a package offer. Thus, in this ongoing example, Coca-Cola® would not be assigned to either inventory group. Accordingly, Coca-Cola® would not be included in an offer that is defined solely by inventory groups, and thus could not be selected by a customer as a component product pursuant to such a package offer.

Thus, after preliminarily allocating the inventoried products in the ongoing example to red and/or green inventory groups based on their relative value ratings and then considering all the package offer rules in the exemplary Package Offer Rules Database, the possible package instances, and the component products' inventory groupings in each instance, are shown in the table immediately below:

TABLE 9

Package Instances

| Product 1 | Inventory Grouping | Product 2 | Inventory Grouping |
|---|---|---|---|
| Diet Coke ® | Red | Cheetos ® | Green |
| Diet Coke ® | Red | Double-Mint ® | Green |
| Diet Coke ® | Red | Juicy Fruit ® | Green |
| Diet Coke ® | Red | Dentyne ® | Green |
| Doritos ® | Red | Cheetos ® | Green |
| Doritos ® | Red | Double-Mint ® | Green |
| Doritos ® | Red | Juicy Fruit ® | Green |
| Doritos ® | Red | Dentyne ® | Green |
| Cheetos ® | Red or Green | Cheetos ® | Green or Red |
| Cheetos ® | Red | Double-Mint ® | Green |
| Cheetos ® | Red | Juicy Fruit ® | Green |
| Cheetos ® | Red | Dentyne ® | Green |

3. Step 300: Output Package Offer

According to the described embodiment, after the inventoried products have been allocated to the inventory group(s), the operator and/or vending machine may output a package offer to customers.

In one or more embodiments, a package offer is output via one or more output devices of a vending machine. Many methods are contemplated for communicating offers via output devices. For example, an LCD display may read "Pick one red product and one green product for $1.00!", and LED displays located proximately to several products may illuminate or flash in red and/or green as determined by the inventory groups. Following the ongoing example, the LED displays located proximately to the following products would flash in red: Diet Coke®, Doritos®, and Cheetos®. Additionally, the LED displays located proximately to the following products would flash in green: Dentyne®, Cheetos®, Double-Mint® and Juicy Fruit®.

In another embodiment, package offers may be communicated entirely through an LCD display (e.g., through digital icons representing the qualifying products). Alternatively, in another embodiment, a package offer may be communicated through a combination of static displays (e.g., painted or printed signage reading "Pick one red product and one green product for $1.00") and LED displays located proximately to qualifying component products (e.g., LEDs next to qualifying products may flash in red and/or green as appropriate).

Further still, in one or more embodiments, inventory groups (from which customers may select products pursuant to a package offer) may be communicated to customers by virtue of the underlying component products' physical placement within one or more vending machines. For example, a first inventory group may comprise any products stocked in one or more particular columns of a vending machine, whereas a second inventory group may comprise any products stocked in one or more other columns of the vending machine. Alternatively or additionally, a first inventory group may comprise some or all of the products stocked within a first vending machine, and a second inventory group may comprise some or all of the products stocked within a second (e.g., nearby) vending machine. Furthermore, in one or more embodiments, inventory groups may be communicated to customers through the placement of physical indicia (e.g., stickers, signs, cards, flags, price tags, RFID tags) on or near the underlying component products.

4. Step 400: Process Transaction in Accordance with Package Offer

After a package offer is output to a customer, a customer may accept such a package offer. Accordingly, at Step 400, the vending machine may receive, through an input device, an indication of a customer's acceptance of a package offer. Such an indication may comprise the receipt of payment (e.g., currency, a payment identifier such as a credit card number) through payment processing mechanisms such as coin acceptors, bill validators, coupon readers, and/or card readers.

In embodiments where a customer has prepaid for products, the "receipt of payment" for the offered products may comprise a command by the customer to redeem prepaid credit, units or the like. For example, the customer could enter, via a touch screen, a code which uniquely identifies his previous prepayment for a certain number of products (e.g., five units of any product, six units of any beverage). Additionally or alternatively, the prepayment could be evidenced by a magnetic strip card or bar code which is read by a peripheral of the vending machine.

Alternatively or additionally, an indication of acceptance of the offer may comprise a signal, received through an input device such as a fingerprint reader, keypad or touch screen, indicating that the customer desires to purchase a combination of products pursuant to a package offer (e.g., clicking a "YES" button on a touch screen).

In accordance with Step 400, a customer selects at least one product from each of at least two inventory groups. Thus, a customer may select a product from a first inventory group by inputting, into a keypad or touch screen, an indication of a product that the first inventory group includes (e.g., a "red" product). Following the ongoing example, a customer may select from the red inventory group either Diet Coke®, Doritos®, or Cheetos® by inputting into a keypad his or her selection of Row Position Identifier A2, B1 or B3, respectively. After the customer selects a first product from the first inventory group, the customer may be instructed to and the customer may indeed select a second product from a second inventory group. Following the ongoing example, a customer may select, from the green inventory group, Dentyne®, Cheetos®, Double-Mint® or Juicy Fruit® by inputting into a keypad his or her selection of Row Position Identifier C3, B3, C1 or C2, respectively.

In some embodiments, a default time for selecting the second product is provided such that if the customer does not select a second product from the second inventory group within the default time, the vending machine may (1) consummate the transaction as if the first selected product was purchased at its retail price by dispensing a unit of the product and providing change, if appropriate; (2) prompt the customer with a reminder message via an output device (e.g., a speaker, a touch screen); or (3) automatically identify and dispense, as the second component product, a unit of a "default" product that the second inventory group includes (e.g., a stored rule may provide that the product in the second inventory group having the highest retail profit margin is automatically dispensed).

In some embodiments, if the customer does not select an appropriate second product but rather selects an inappropriate product (e.g., selects a product that is not allocated to the second inventory group), then the vending machine may output, through an output device, an error message prompting the customer to select a product from the appropriate (second) inventory group. Such an error message may be output through any output device, such as a speaker, an LCD screen, an LED display, or the like. In some embodiments, error messages may be accompanied by suggested selections, so that the operator and/or vending machine may attempt to influence the customer's choice of the second product. For example, an error message may read, "Sorry, the product you selected is not a green item. Why not try delicious Dentyne® chewing gum?" Further, in some embodiments, an operator and/or vending machine may offer a customer who has selected a product that is not within an inventory group the option of paying an additional premium for the ability to purchase the item in the ongoing transaction.

At Step 400 the vending machine may also process payment in a conventional manner such as by (i) detecting an amount that is deposited/rendered/provided, comparing that amount to a (package) price, and dispensing change due if appropriate, or (ii) requesting a credit authorization from a remote computer, such as a computer operated by a credit card transaction processing company (e.g., First Data Corp.).

As stated, in some embodiments, payment may have been previously rendered (e.g., $5 was previously paid for the right to purchase five pairs of products in the future). If so, and if the products pursuant to such prepayment are being redeemed in the transaction, many well known processes may be employed to debit the prepaid account for the redeemed products.

Further, at Step 400, depending on which products were selected by the customer, the operator and/or vending machine control system may transmit one or more signals to one or more product dispensing apparatus of one or more vending machines to dispense the at least two products. In one embodiment, dispensing signals are sent to corresponding product dispensing actuators/motors after the customer selects all component products. In another embodiment, such dispensing signals are sent to corresponding product actuators/motors substantially immediately after each component product is selected, so that products are made available immediately following selection.

5. Step 500: Record Results in Database

At Step 500, the operator and/or vending machine records results of the transaction in a database or similar memory structure. Step 500 may include the step of (1) updating one or more inventory records in an inventory database to reflect the vending of products (i.e. the quantity available of products sold is decreased to account for sales of units of the products), and/or (2) updating an acceptance or sales rate associated with a product or products (e.g., the package instance selected by the customer) to reflect the sale of a product or products (e.g., recording the units sold, the time of the sale and/or the date of the sale). Following the ongoing example, assuming that a customer on Jun. 25, 2003 purchased, for a $1.00 package price, one can of Diet Coke® and one package of Double-Mint® gum, then the above inventory database would be updated to reflect that five units of Diet Coke® and seventeen units of Double-Mint® gum remain in inventory and available for sale. Likewise, the actual sales rates of Diet Coke® would be updated from 1.2/day to 1.3/day; the actual sales rate of Double-Mint® gum would be updated from 2.2/day to 2.3/day. Thus, through the package promotion, Diet Coke® would have reached its ideal sales rate of 1.3/day, and the actual sales rate of Double-Mint® gum would have moved significantly closer to its ideal sales rate of 2.6/day.

Updating inventory amounts and sales rate data advantageously provides the vending machine with updated market data (e.g., supply and demand data) that can be fruitfully exploited in subsequent executions of the processes of various embodiments. In other words, such updated inventory amounts and sales rates can be referenced subsequently by the vending machine control system in subsequently making definitions of inventory group (see Steps 100 and 200, supra).

D. Reactive Inventory Grouping

In "reactive inventory grouping" embodiments, a customer is offered the ability to purchase a combination of products for a single price by selecting a first product from a first group of inventoried products, and then picking a second product from a second inventory group which is revealed to the customer only after the first product is selected.

Such an embodiment can be desirable because it can provide customers with an entertaining way of interacting with a vending machine. In other words, because in this embodiment the second inventory group is not revealed to the customer until a first product is selected, customers may experience feelings of hopeful anticipation until such a second inventory group is revealed. This feeling may be analogous to the excitement and exhilaration some customers receive when gambling or playing a chance-based game.

Thus, in some embodiments, game-themed messages may be output through the one or more output devices prior to the revealing of the second inventory group, thereby incorporating a game-like feel into the customers experience with the vending machine. In other words, in some reactive inventory grouping embodiments, output devices may be configured to output game-themed animations, such as spinning slot machine reels, roulette wheels, or the like, before a second inventory group is revealed to the customer. Accordingly, such machines can present customers with the appearance that a (randomly determined) resolution or outcome of a game determines the products which the second inventory group includes. In this manner, the second inventory group may be presented as a "prize showcase" from which customers may select a prize. Additional and alternate game-themed messages and means for communicating such messages to a customer of a vending machine are described with reference to Applicant's U.S. Patent Application Ser. No. 60/527,899, entitled PRODUCTS AND PROCESSES FOR PROMOTIONS WHICH EMPLOY A VENDING MACHINE, filed Dec. 8, 2003 in the name of Walker et al., the entirety of which is incorporated by reference herein for all purposes.

Further, in some embodiments, reactive inventory grouping may be less computationally intensive or otherwise require less computing resources than, e.g., certain types of proactive inventory grouping, and accordingly can be more desirable to some vending machine operators (particularly in certain hardware environments).

Figure 3:
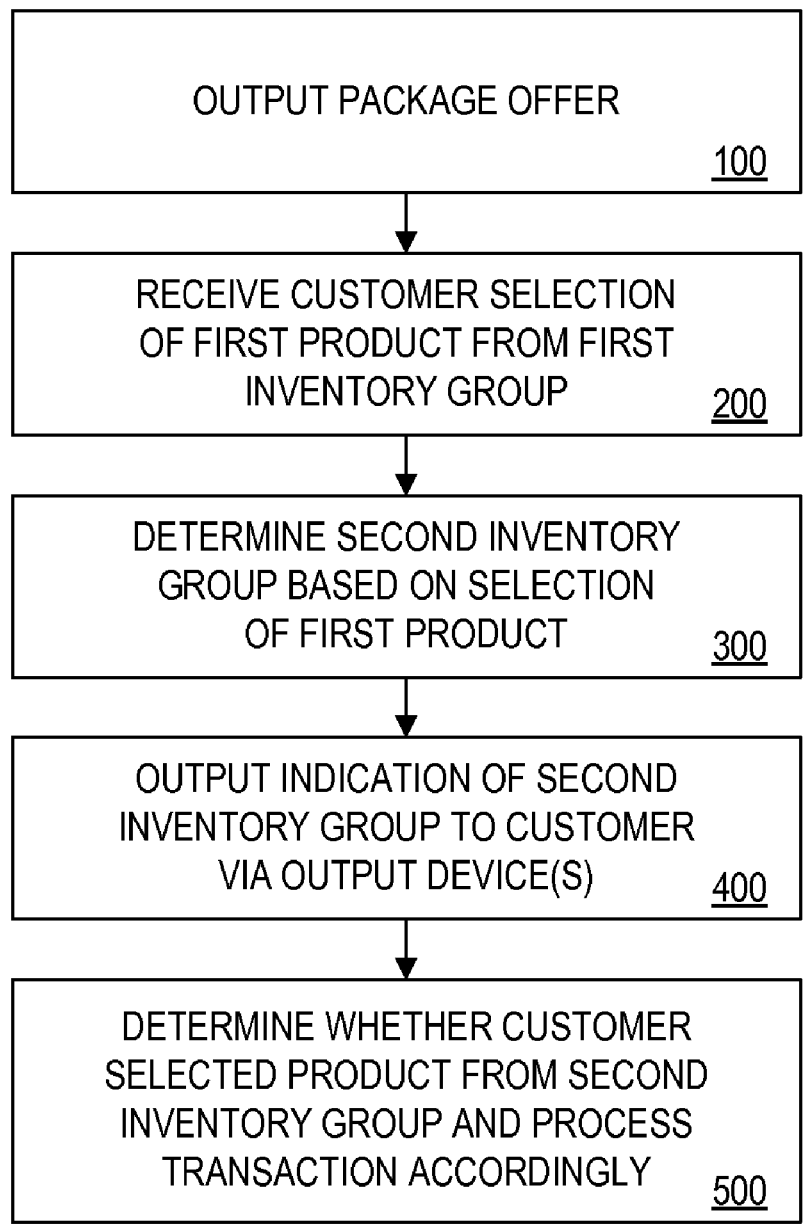
FIG. 3 illustrates an embodiment of a reactive inventory-grouping embodiment.

A description of FIG. 3, which provides a flow chart illustrating a reactive inventory grouping process, follows.

Of course, steps performed in a reactive inventory grouping embodiment does not imply that those steps may only be performed in a reactive inventory grouping embodiment.

1. Step 100: Output Package Offer

At Step 100, the operator and/or vending machine outputs a package offer to the customer regarding the availability of a package deal. For example, an LCD display may output a message reading "Pick 2 items for $1. Pick any item, and then a group of items will flash. Pick any flashing item as your second item." Alternatively, such a message may be provided through a static means (e.g., painted or printed signage). Further still, such an offer may be transmitted to a customer's device, such as a cell phone, PDA, personal computer, or the like.

2. Step 200: Receive Customer Selection of First Product from First Inventory Group At Step 200, the operator, vending machine control system and/or computer associated therewith (e.g., a server computer) receives, via one or more input devices, a signal indicating a customer's selection of a first product, and that product is determined to be included in a first inventory group. In some embodiments, this step may be accompanied or preceded by payment processing steps, including the receipt of currency or an account identifier (e.g., an alphanumeric code; a biometric identifier such as a fingerprint).

According to some embodiments, the selection of a product by a customer may be determined to not be included in the requisite inventory group. If so, then subsequent steps of the instant process might not be performed. Alternatively or additionally, if the first requested product is not within an inventory group, an operator, vending machine control system and/or computer associated therewith may (1) proceed to process a transaction in a conventional manner, (2) output an error message (e.g., informing the customer that the selected produce is not within a first inventory group), and/or (3) output a message encouraging the customer to select a product from the first inventory group.

According to one embodiment, the first inventory group may comprise all inventoried products. Thus, according to such an embodiment, a customer may select any product in inventory as the first product. Thus, in at least one embodiment, the product selected might make no difference as to which products are included in the second inventory group.

However, according to another embodiment, the first inventory group may not include all products in inventory. In one embodiment, such a subset may be predetermined (e.g., defined by an operator and/or stored in a memory accessible to the vending machine control system). In another embodiment, the first inventory group may be determined (e.g., dynamically) to include products according to sale and/or cost data pertaining to a period (e.g., such as a sales period or a period of time beginning before a current sales period. Alternatively or additionally, in one or more embodiments, the first inventory group may be determined according to stored rules or other logic mechanisms. Thus, for example, stored rules may provide that only those products selling at or less than a particular actual sales rate are to be included in the first inventory group. In this manner, the vending machine may be programmed to promote certain products in package promotions.

3. Step 300: Determine Second Inventory Group Based on Selection of First Product At Step 300, an operator, vending machine and/or computer associated therewith defines a second inventory group based, in whole or part, on the customer's selection of a first product. In some embodiments, the vending machine employs one or more rules (e.g., stored package offer rules) to determine which products are potentially eligible to be included in the second inventory group based on the first product (which was selected by the customer). For example, a package offer rule may provide that products from competing manufacturers cannot be purchased together pursuant to a package offer. Accordingly, the second inventory group would not include products which are manufactured by competitors of the manufacturer of the first, selected product. Alternatively or additionally, another package offer rule may provide that the second inventory group includes only products from categories that are "complementary" to the category of the first product. For example, if a customer were to select a beverage as his first product, the vending machine second group may only include products from the snack and gum categories.

Further, a package offer rule may provide that, if the first selected product's actual sales rate is above a certain threshold, only products selling at or less than a predetermined actual sales rate are to be included in the second inventory group. In this manner, vending machines according to various embodiments may exploit the popularity of a well-selling product to promote the sale of (relatively) less popular products.

Conversely, a package offer rule may provide that, if the first selected product's actual sales rate is below a certain threshold, only products selling above a predetermined actual sales rate are to be included in the second inventory group. In this manner, vending machines according to various embodiments may prompt customers to choose a less popular product in the hopes of a good deal on a more popular product, with an apparent element of chance involved.

Alternatively or additionally, a value rating of the first selected product and/or a value rating of each possible second product may be considered, as described above. For example, the vending machine control system may determine the value rating of one or more products and determine, based on stored rules, that only the five products having the highest value ratings may be included in the second inventory group. As in the case of the above-described proactive inventory grouping embodiments, the value rating of each possible second product may be determined by considering one or more of (i) the time remaining until a restock date, (ii) the time remaining until an expiration date of a product or products, (iii) an actual sales rate of a product or products, (iv) a target or ideal sales rate of a product or products, (v) the fixed cost of a product or products, (vi) the variable cost of a product or products; (vii) the retail price of an individual unit of a product or products, (viii) the profit margin of a product or products at a given sale price such as a retail price, (ix) the profit margin of a package instance comprising a given combination of products, (x) the historical acceptance rate of a package instance comprising a given combination of products, (xi) one or more products' income or profit contribution factor(s) (e.g., measures of one or more products' historic success in the marketplace), (xii) the availability to an operator via wholesale markets of one or more products; (xiii) the number of units of a product or products in the inventory of one or more vending machines; (xiv) the number of units of a product or products in the inventory of an operator (e.g., in a warehouse; on a delivery truck); (xv) the amount of or degree to which coupons, discounts (e.g., volume discounts), rebates, trade credits or other incentives are available to vending machine operators and/or customers from product suppliers; and/or (xvi) any other consideration.

In an embodiment, the second inventory group may determined before the customer selects the first product, but the second inventory group is only revealed or communicated to the customer after the first product is selected.

In an embodiment, a plurality of second inventory groups may be determined. Thus, selection of a product included in any one or more of the second inventory groups would be acceptable. Further still, depending on which of the second groups the second selected products is included in, different actions may be taken (e.g., awarding bonus products or credits, providing entertaining displays or sounds). Thus an entertaining set of interactions can result from differentiating between acceptable second selections.

4. Step 400: Output Indication of Second Inventory Group to Customer Via Output Device(s)

After the second inventory group is determined, an indication of the products included in the second inventory group is output at Step 400 to the customer, for example, via one or more output devices of one or more vending machines or other devices. For example, LEDs located proximately to the products may illuminate or flash. Alternatively or additionally, an LCD may output graphical icons representing the qualifying products included in the second inventory group. Futher still, an indication of the second inventory group may be transmitted to a customer's device, such as a cell phone, PDA, personal computer, or the like.

5. Step 500: Determine Whether Customer Selected Second Product from Second Inventory Group and Process Transaction Accordingly At Step 500, it is determined whether the customer selected the second product from the second inventory group. If the customer has selected a second product from the second inventory group by, for example, transmitting a signal to the vending machine processor via an input device such as a keypad, then the vending machine processor may actuate product dispensing apparatus to dispense units of the first and second selected products. (Alternatively, the vending machine control system may dispense a unit of the first product upon its selection at Step 200, and dispense a unit of the second product at Step 500 once it has been determined that the customer has selected a product from the second inventory group.)

In some embodiments, this step may be accompanied by payment processing steps, such as the receipt of payment (and/or payment identifiers, such as account identifiers) and the dispensing of appropriate change (e.g., based on the difference between any payment tendered and the package price). It should be noted that such an embodiment would allow customers to select first products before depositing any currency, and then see which products are available as second products before committing to purchase any products whatsoever. In this manner, any anxiety caused to customers by virtue of the uncertain composition of the second inventory group can be reduced or eliminated.

In some embodiments, if the customer has selected a product that is not included within the second inventory group, an operator, vending machine control system and/or computer associated therewith may (1) proceed to process a transaction in a conventional manner, (2) output an error message (e.g., informing the customer that the selected product is not within the second inventory group), and/or (3) output a message encouraging the customer to select a product from the second inventory group. For example, an LCD may output a message that reads "Sorry, but the item you have selected is not eligible for the package deal. Please select a flashing item to continue or press "no thanks" to purchase your first selection at its retail price."

In some embodiments, the vending machine control system may be configured to monitor the time starting, e.g., with a customer's initial selection of a first product. If the customer does not select a second product within a predetermined period of time, the vending machine may be configured to, e.g., consummate a transaction for the first product at its retail price, thereby assuming that the customer does not wish to select a second product from the second inventory group and accept a package offer.

Alternatively, at the end of such a predetermined period of time, the vending machine may automatically select and dispense a second product (e.g., a second product selected according to stored rules), and thereby complete a transaction at a package price. For example, stored rules may provide that the product in the second inventory group with the highest/lowest margin is automatically dispensed if no second product is selected within the predetermined period of time. Alternatively, stored rules may provide that the most/least popular product in the second inventory group (e.g., as indicated by its actual sales rate) is automatically dispensed if no second product is selected within the predetermined period of time. Thus, stored rules for determining the automatic selection of a second product may consider a value rating of one or more products.

If any products are dispensed at Step 500 (or earlier in the process, according to some embodiments), the vending machine may, as described above, record results of the transaction in a database or similar memory structure (e.g., update inventory records).

V. Alternate and Additional Embodiments

A. Alternate Proactive Inventory Grouping—Expected Profitability of Possible "Allocations" Considered In another proactive inventory grouping embodiment, products are allocated to inventory groups based on the expected or predicted profitability of each possible "inventory allocation". In other words, unlike the previously-described embodiments in which there are a predetermined or fixed number of product "slots" in each inventory group (e.g., per a stored rule), this embodiment allows allocation of products to inventory groups by evaluating the expected profitability of each possible allocation of products (e.g., to at least two inventory groups).

For example, in a vending machine configured to sell four products (e.g., products A, B, C D) in package deals from two inventory groups (e.g., red and green), in which all products are allocated to exactly one inventory group and an inventory group must contain at least one product, there are fourteen possible inventory allocations, as illustrated by the table immediately below:

TABLE 10

Allocations

| Allocation | Products in Red Group | Products in Green Group |
|---|---|---|
| 1 | A | B, C, D |
| 2 | A, B | C, D |
| 3 | A, C | B, D |
| 4 | A, D | B, C |
| 5 | A, B, C | D |
| 6 | A, B, D | C |
| 7 | A, C, D | B |
| 8 | B | A, C, D |
| 9 | B, C | A, D |
| 10 | B, D | A, C |
| 11 | B, C, D | A |
| 12 | C | A, B, D |
| 13 | C, D | A, B |
| 14 | D | A, B, C |

As stated, the expected profitability of each possible allocation would be determined. Then, the operator, vending machine control system and/or computer associated therewith would select the possible allocation with the highest expected profitability, and communicate a package offer accordingly. For example, if it was determined that Allocation 14 (in which product D is in the red inventory group and products A, B and C are in the green inventory group) is expected to be the most profitable, the vending machine may flash LEDs proximately located to each of the corresponding products in the appropriate colors to indicate that allocation of products to the two inventory groups.

There are many ways that the expected profitability of an allocation may be determined. In one or more embodiments, the expected profitability of an allocation may be determined with reference to value ratings of one or more component products in the allocation.

According to one embodiment, the expected profitability of a given allocation may be determined by summing the expected profitabilities of each possible combination instance within that particular allocation. Thus, in the allocation in which product D is in the red inventory group and products A, B and C are in the green inventory group, the expected profitability for the instances "D with A", "D with B", and "D with C" would be individually determined and then added together to determine the total expected profitability of the allocation. Further still, in one or more embodiments, such a sum may be divided by the number of possible instances in the allocation (here, four), to determine an expected profitability for the allocation.

To determine the expected profitability of each instance within a given allocation, a variety of techniques may be employed. According to one embodiment, the expected profitability of a given instance is determined by multiplying the probability that the instance will be accepted within a given period (e.g., within 24 hours) by the margin of the package instance (e.g., the package price less the cost of the component products). In such an embodiment, the probability that a given instance will be selected may be determined based on a stored (i.e. historic), received or calculated "acceptance rate" for the instance.

B. Multiple Package Offers in Proactive Inventory Grouping

In some proactive inventory grouping embodiments, vending machines and/or computers associated therewith may be configured to simultaneously (or substantially simultaneously) output a plurality of package offers. Thus, after inventory groups are defined, the vending machine may output package offers that apply to the inventory groups. For example, for particular inventory groups, an offer may provide customers with the ability to choose which of the following to purchase:

(a) two products for a first inventory group for a first package price (e.g., two products from the "green" inventory group for $1.50), (b) one product from a first inventory group and one product from a second inventory group for a second package price (e.g., one product from the green inventory group and one product from the red inventory group for $1.25), or (c) two products from a second inventory group for a third package price (e.g., two products from the red inventory group for $1.00).

Any number of offers may be output simultaneously or substantially simultaneously.

In an embodiment, offers are not output simultaneously, but are instead triggered by an event. For example, a single offer may be output after a customer provides payment (e.g., inserts currency). If the customer does not select any product within a certain amount of time (e.g., within 20 seconds of inserting currency, within 20 seconds of the offer being provided) then additional offers may be provided. In such an embodiment, the initial offer may be the most profitable but possibly less desirable to the typical customer (e.g., a relatively high package price, high margin component products), and subsequent offers may be less profitable, but more desirable to the customer (e.g., a relatively low package price, low margin component products)

In an embodiment, different sets of offers may be output at different times, according to various desirable factors described herein.

C. Targeted, Customized or Substantially Distinct Package Offers

In some embodiments, vending machines and/or computers associated therewith may be configured to output a plurality of package offers to different customers, so that certain customers or groups of customers receive package offers that are different than package offers provided to other customers. Customers may be uniquely identified (so that package offer eligibility may be determined) through the presentation of account identifiers (e.g., subscription account identifiers, credit card numbers, etc.), biometric identifiers (e.g., finger prints), or any other unique or substantially unique identifier (e.g., Social Security numbers, etc.).

In one or more embodiments, customers who may be identified through certain account identifiers (e.g., alphanumeric codes, biometric identifiers, etc.) may be offered package offers that differ from (e.g., are more valuable than) those package offers offered to customers who have not yet registered for such accounts, such as those customers who may pay with cash or other traditional means (e.g., credit cards). Such an embodiment may function to encourage such unregistered customers to establish certain types of accounts (e.g., prepaid unit or "subscription" accounts, as described herein).

Moreover, in one or more embodiments, different package offers may be output to account holders based on stored preferences or rules that the account holder or other person/entity (e.g., an operator, a product manufacturer, a beverage bottler/distributer) may have previously registered at a vending machine or through a computer or device associated therewith. For example, a stored preference rule may provide that a given customer does not wish to receive package offers comprising products containing peanuts, as the customer is allergic to peanuts. Accordingly, an operator, vending machine control system and/or computer associated therewith may consider such a rule when identifying a package offer, so that products containing peanuts are not included in any package offers provided to that particular customer. By way of another example, an operator may wish to reward certain account holders with favorable package offers, and so may register a rule which provides that account holders who redeem more than eight units of product within any three week period are to receive package offers whereby such qualifying account holders can receive any two products from a first inventory group and any one product from a second inventory group for the package price of one dollar. Apparatus, systems and methods for managing the registration and administration of account-based preferences and rules associated with prepaid unit or "subscription" accounts are described more fully with reference to Applicant's U.S. Patent Application No. 60/668,405, entitled PRODUCTS AND PROCESSES FOR ESTABLISHING MULTI-TRANSACTION RELATIONSHIPS WITH CUSTOMERS OF VENDING MACHINES, filed on Apr. 5, 2005, in the name of Walker et al.

Further still, in one or more embodiments, different package offers may be output to account holders based on prior transactional activity, such as purchase or consumption patterns. Thus, in one or more embodiments, an operator, a vending machine control system and/or a computer associated therewith may record transactional activity of one or more customers in a database. Again, customers may be uniquely identified (so that transactional activity may be recorded and subsequently referenced) through the presentation of account identifiers (e.g., subscription account identifiers, credit card numbers, etc.), biometric identifiers (e.g., finger prints), or any other unique or substantially unique identifier (e.g., Social Security numbers, etc.). In one example embodiment, the redemption patterns of identifiable customers are recorded, so that package offers comprising products not typically purchased or redeemed by such account holders may be offered. Such an embodiment may be useful to operators and product manufacturers as a way to encourage customers to try new products, and to avoid the potential for dilutionary promotions.

Alternatively, the prior transactional activity of individual customers may be used to present or suggest items to customers that the customers usually purchase or select. For example, a customer who usually selects Product A from a first inventory group and Product B from a second inventory group may be shown or suggested (e.g., on a touch screen) the package instance of Product A with Product B, so that the customer may easily and quickly select the suggested package instance, which may comprise the customer's "usual" snack. Alternatively or additionally, customers may record preferences (e.g., through a web site associated with the vending machine and/or operator) so that specific package instances are suggested to customers at participating vending machines.

D. Alternative/Additional Ways to determine and Present Package Offers

Many alternate or additional methods or formats for determining and/or communicating package offers are contemplated.

In one or more embodiments, a list of specific package instances could be output to customers via an output device, rather than (or in addition to) indicating the inventory grouping status of different products. For example, rather than merely outputting an offer that instructs prospective customers to select any "red" and any "green" product for $1, a vending machine may alternatively or additionally group certain package instances of "red" and "green" products and communicate the instances via an LCD display. Following the ongoing example from the above description of proactive inventory grouping embodiments (in which Diet Coke®, Doritos®, and Cheetos® were allocated to the red inventory group and Dentyne®, Cheetos®, Double-Mint® and Juicy Fruit® were allocated to the green inventory group), an LCD may output an offer visually representing a package instance comprising Diet Coke® with Dentyne®. Thus, rather than communicating all possible instances, only a certain number of instances may be shown through an LCD display (e.g., those with the highest or lowest historic acceptance rates; those with the highest margin). Further, package instances may be communicated through similarly colored LEDs. For example, a particular package instance comprising Diet Coke® and Dentyne® may be communicated by illuminating purple LEDs next to both Diet Coke® and Dentyne®, indicating that the products together comprise a single package instance.

In one or more embodiments, customers may be offered the ability to purchase, for a package price, any combination of products provided the total of the products' individual retail prices is less than, equal to or greater than a certain sum. For example, customers may be offered the ability to purchase, for a $1 package price, any two products having a combined retail price of $1.30.

Similarly, customers may be offered the ability to purchase any product having a first retail price (e.g., $0.85) and any product having a second retail price (e.g., $0.25) for a single package price (e.g., $1.00).

Further, in one or more embodiments, certain (but not necessarily all) products that an inventory group includes may be given a visual preference (e.g., some red LEDs may flash at faster intervals than other red LEDs; some red LEDs may be illuminated brighter than other red LEDs, etc.). Thus, particular products included in an inventory group may be emphasized or promoted over other products in the same inventory group. For example, products in an inventory group having a higher value rating may be indicated by brighter LED displays than products in that inventory group having a lower value rating. Alternatively, products that are selling at sales rates below a certain threshold may be indicated by brighter LED displays than products that are selling at sales rates above the threshold. This embodiment would help draw greater customer attention to products that are selling relatively poorly.

In yet another one or more alternate embodiments, inventory groups are not dynamically determined (e.g., as in certain proactive or reactive inventory grouping embodiments), but are rather determined according to stored rules and/or circuitry that govern which products may together comprise packages and which may not. In one or more embodiments, stored rules are generated, identified or configured by an operator and/or a computer prior to storage. In one or more embodiments, stored rules and/or circuitry may have been generated, identified or configured pursuant to one or more embodiments for determining a package offer and/or identifying inventory groups as described herein, including herein-described embodiments for identifying package offers and/or inventory groups according to value ratings of one or more products (e.g., where such value ratings may comprise cost, pricing and/or margin attributes of one or more products). Generated rules may be stored in any type of memory accessible to a vending machine control system (e.g., a processor, an application-specific integrated circuit). Alternatively or additionally, generated rules may be manifest in a software program or hardwired circuitry (e.g., an application-specific integrated circuit).

In one example of an embodiment featuring stored rules and/or hardwired circuitry, a vending machine may be configured to allow a customer to pick a certain number of products (e.g., three products) for a single package price (e.g., $1.00), provided that no two products are from the same column (e.g., the same shelf or row) of the vending machine. Thus, package offers may be communicated through indicia such as fixed signs or other advertising on or around the shelves or the vending machine. In such embodiments, upon selection of a first product, a vending machine may prevent the selection and dispensing of certain products (e.g., products from the same shelf, row or category) as second products. Alternatively, an error message, warning or other indication may be provided to the customer, and the customer allowed to select another product. Moreover, in some embodiments, upon receipt of a signal (e.g., from a keypad) potentially indicating that a customer may like to avail herself of a package offer, the vending machine may await selection of two or more products (e.g., before processing a sale) so that it may determine if the selected products qualify for a package price in accordance with the stored rules and/or hardwired circuitry.

In another example of an embodiment featuring stored rules and/or hardwired circuitry, a vending machine may be configured to recognize and sell certain, specific package instances for certain package prices. Thus, an operator and/or computer may configure a vending machine to sell items A1 and B1 for the package price of $1.00; items A1 and C1 for the package price of $1.00; and items A1 and D1 for the package price of $1.25. Thus, upon a selection of a first product, a vending machine control system (e.g., a processor; an application-specific integrated circuit) may determine whether or not it should await the customer's potential selection of a second product that may, together with the first product, comprise a package instance eligible for a package price, in which case the vending machine would process a sale for the two items at the package price. Alternatively or additionally, upon receipt of a signal (e.g., from a keypad) indicating that a customer would like to avail herself of a package offer, the vending machine control system may await selection of two or more products (e.g., before processing a sale) so that it may compare the selected products to the one or more specific package instances registered by an operator and/or computer in order to determine if the selected products qualify for a package price.

E. Multi-Machine and Cross-Machine Promotions

As stated, various embodiments can be configured to work in conjunction with two or more vending machines. Thus, according to some embodiments, pursuant to a package offer, customers may purchase two or more products for a single price, and may select and/or retrieve products from two or more vending machines.

Thus, a customer may view the inventory of two machines (which may be proximately-located), and may accept an offer output from a first machine or output from a peripheral device. The peripheral device may be stand-alone (housed in an independent casing or body) or integrated with one or more of the vending machines. The peripheral device may communicate with one or more of the vending machines (including control systems and peripherals thereof) and/or remote computers in any of a number of well-known manners.

In one or more embodiments, the vending machine or peripheral device may output a code, password, PIN, receipt or other substantially unique identifier to the customer. This identifier may be redeemed at a participating vending machine, allowing the customer to retrieve products from one or more of the participating machines.

For example, after an operator, vending machine and/or computer associated therewith allocates inventoried products to at least two inventory groups spanning at least two machines (e.g., using the above-disclosed methods), a first vending machine or a peripheral device may output an offer reading "2 for $1! Select any item from this machine AND any item from the adjoining machine for $1." A customer may then, after seeing the inventoried products (e.g., through the glass front panels of the adjacently placed vending machines), decide to accept the package offer and deposit $1 into the first machine. The customer may then select a first product from the first vending machine, and the first vending machine may then output a (substantially-unique) bar code on a piece of paper (e.g., printed by an on-board printer, pre-printed stock dispensed by a dispensing device). The customer could then be instructed, through the first vending machine's output device, to insert the piece of paper into a reader (e.g., coupon reader, ticket reader, bill acceptor, card reader, bar code reader) which is attached to or in communication with the second machine when the customer is ready to select his second product. Upon presenting the piece of paper (e.g., into the card reader), the second vending machine's processor would validate the code by querying either a local database (e.g., of previously agreed-upon codes or codes generated according to a predetermined methodology) or a remote database (e.g., of codes created and/or stored by the first machine and/or a remote computer). Alternatively, the second machine and/or computer associated therewith may apply a predetermined mathematical algorithm to the code to determine if it is a validly issued code. For example, the second machine and/or computer associated therewith may apply a checksum to the code. Alternatively or additionally, the second machine and/or computer associated therewith may determine whether or not the received code is divisible by a certain number (e.g., 3). Upon validation of the code, the second machine may permit the user to select a product pursuant to the terms of the package offer.

In one or more multi-machine embodiments wherein package offers and/or inventory groups are dynamically determined by one or more of an operator, a vending machine and/or a remote computer, the second vending machine may, upon a customer's presentation of the piece of paper, present to the customer the same inventory group as originally advertised at the time of the offer. Thus, the customer may return to select his second product at a later time (even after the second vending machines inventory has been reallocated to new inventory groupings), and the second vending machine could revert back to or recall the previous inventory grouping in effect at the time of the offer. This would allow the customer to select from the options that were originally presented to him (e.g., the products that were previously flashing in red are returned to red status upon presentment of the bar code identifier).

In one or more multi-machine embodiments, rather than a paper token being issued by a first machine or a peripheral device, a code may be downloaded to a device operated by a customer, or otherwise made accessible to a customer (e.g., output through an LCD display). For example, customer may download a code to a cellular telephone, a PDA, an iPod or other personal music storage/playback device, a watch and/or a personal computer. Subsequent to receiving the code, the customer may present the code to an input device of a second (e.g., adjacent) vending machine and/or a computer associated therewith. For example, the customer may enter the code into a keypad or touch screen of the second vending machine and/or a computer associated therewith. Alternatively or additionally, the customer may manipulate a personal device (e.g., a cell phone, PDA, etc.) so that a code previously received from a first machine or computer is transmitted by the device to the second vending machine and/or computer associated therewith. Such data transmission may take place through any medium or protocol known, including any wireless medium or protocol (e.g., radio frequency, optically-scanned bar code methodologies, etc.). The second vending machine and/or computer may, upon receipt of a code, proceed to validate the code by, for example, querying either a local database (e.g., of previously agreed-upon codes or codes generated according to a predetermined methodology) or a remote database (e.g., of codes created and/or stored by the first machine and/or a remote computer). Alternatively, the second machine and/or computer associated therewith may apply a predetermined mathematical algorithm to the code to determine if it is a validly issued code. For example, the second machine and/or computer associated therewith may apply a checksum to the code. Alternatively or additionally, the second machine and/or computer associated therewith may determine whether or not the received code is divisible by a certain number (e.g., 3). Upon validation of the code, the second machine may permit the user to select a product pursuant to the terms of the package offer.

In one or more multi-machine embodiments, codes issued from a first vending machine to a customer pursuant to a package offer may be associated with an expiration time and/or date. Thus, upon presentation of the code by a customer to a second vending machine and/or computer associated therewith, the second vending machine and/or computer associated therewith may determine whether or not the code has expired, and if so, deny the customer the ability to receive a product from the second vending machine pursuant to a package offer. In some embodiments, codes may include expiration time and/or date data, so that a vending machine and/or computer associated therewith can readily determine the expiration status of the code. In other embodiments, codes may serve as a reference to associated expiration time and/or date data, which may be retrieved from a local or remote database.

It may be beneficial in one or more embodiments to associate codes with expiration times and/or dates that are somewhat near in time relative to the issuance of the codes (e.g., so that codes expire within 10 minutes of issuance from a first machine). By having codes expire somewhat quickly, any dilutionary effects of a package promotion can be mitigated. Specifically, by requiring customers to accept delivery of all products included in a package offer within a certain, narrow time frame, customers are prevented from redeeming component products at a later time, when they may quite possibly make another purchase (e.g., when they are hungry or thirsty again). That is, while broad expiration windows may create the potential for displacement of future purchases, narrow expiration windows may not. Indeed, in one or more embodiments, a genetic algorithm is employed to determine a beneficial or substantially optimal expiration period (e.g., from a revenue or profit standpoint) for codes issued by a first machine. For example, a computer associated with the first and second vending machines may determine that revenue potential is greater when expiration periods are set to 20 minutes rather than 30 minutes, and may accordingly instruct the first machine to issue codes that expire within 20 minutes of issuance.

In one example multi-machine embodiment, pursuant to a package offer, a first machine is configured to, upon receipt of payment and/or selection of one or more products by a customer, dispense (i) any selected products and (ii) a code (e.g., printed on a paper substrate). In such an embodiment, a second (e.g., adjacently placed) vending machine is configured to, upon receipt of the code through an input device or payment processing means (e.g., a bill validator), validate the code (e.g., as described herein). Upon validation of the code, the second vending machine may register or authorize a monetary credit balance (e.g., $0.50) so that the customer may select any item or items from the second machine so long as the total of the selected items' retail prices is less than or equal to the monetary credit balance. In such an embodiment, an operator or other entity may print signage that spans the width of both adjacently placed machines, where the signage promotes the availability of package offers.

F. Display of Retail Prices

In an embodiment, retail prices are not automatically communicated by output devices to customers. Instead, a customer must affirmatively inquire as to the retail price of a particular product. In this manner, package offers are emphasized, especially in embodiments where they are actively promoted by the vending machine's output devices. However, in other embodiments, the retail prices of the individual products may be communicated contemporaneously or substantially contemporaneously with the presentation of package offers. Such display of both individual products' retail prices and package prices may indeed function to promote package offers over individual unit retail sales as customers may be able to readily ascertain the savings that may result through package offers.

In an embodiment, customers may be permitted or required to select between various modes, such as "retail" and "package" modes, before transacting with the vending machine. That is, before selecting and purchasing any products, a customer may press a button on a touch screen or otherwise indicate whether the customer would like to (1) purchase a package (e.g., two products for $1.00), or (2) purchase one product for that product's retail price.

In an embodiment, retail prices are not shown to customers at all. Rather, only package offers and package prices pursuant to package offers may be communicated to customers.

In another embodiment, retail prices are shown to a customer, but the underlying products are not for sale individually. Rather, the underlying products may only be purchased pursuant to a package offer, as described herein.

G. Preservation of Inventory Allocations for Particular Customers

In one or more embodiments, a customer may request that a particular package offer and/or inventory group allocation be preserved for him for acceptance and/or redemption at a later time. For example, a customer may notice at 9:00AM that Product A is allocated to a first inventory group and Product B is allocated to a second inventory group. The customer, having no payment means readily available to him, may request that the vending machine print a ticket or "rain check" that would later entitle him to select products from the same inventory groups as shown at 9:00AM. An expiration date/time may be associated with such a ticket or rain check. After the customer leaves the vicinity of the vending machine, the vending machine, operator and/or computer associated therewith may (e.g., at 9:30AM) dynamically reallocate inventory to the two or more inventory groups. The customer may later return to the machine (e.g., within the expiration period), for example, once the customer has obtained cash to pay for the items. Upon presentation of the ticket or rain check (e.g., into a bill validator of the vending machine), the vending machine may "revert back" to the inventory allocation state presented to the customer at 9:00AM. Of course, other means of identifying customers so that particular inventory allocations may be preserved for such customers may be used, including but not limited to account identifiers, biometrics, etc. Further still, in some embodiments, customers may preserve particular inventory allocations remotely, e.g., through a cellular phone, a personal computer (e.g., via email), or the like.

H. Opt Out of Inventory Groups for a Premium

In an embodiment, customers may be offered the option to pay a premium so that they can purchase two or more products from the same inventory group, rather than one from each. For example, a message on a vending machine's touch screen might read: Want two red items? Add $0.25." In essence, such an embodiment would give the customer the ability to buy themselves out of the predefined inventory groups and would thereby ensure that customers are given more choice.

In yet another embodiments, customers may be offered the option to perform a task or accept an additional offer (e.g., from a third party) in order to purchase two or more products from the same inventory group. For example, a customer who wishes to select two items from a single inventory group may be offered the option of receiving the desired items if the customer (i) answers survey questions (e.g., presented through the vending machine's touch screen or through the customer's cell phone), (ii) provides his or her email address, and/or (iii) registers for or otherwise opens an account (e.g., a prepaid unit or "subscription" account). Systems and methods for administering a survey at a vending machine and providing products as compensation for participation in such surveys are provided with reference to Applicant's U.S. Patent Nos. 6,161,059, 6,317,649, and 6,658,323, which share the title VENDING MACHINE METHOD AND APPARATUS FOR ENCOURAGING PARTICIPATION IN A MARKETING EFFORT, the entirety of each of which is incorporated by reference herein for all purposes. Or, a customer who wishes to select two items from a particular inventory group may be offered the option of receiving the desired items if the customer agrees to purchase a 1 year subscription to Sports Illustrated® magazine. Systems and methods for providing benefits to a customer of a vending machine in exchange for the customer's acceptance of an offer from a third party are provided with reference to Applicant's co-pending U.S. Patent Application No. 60/568,057, entitled PRODUCTS AND PROCESSES FOR PROVIDING OFFERS FOR PRODUCTS DISPENSED FROM A DISPENSING DEVICE, filed May 4, 2004, the entirety of which is incorporated by reference herein for all purposes.

I. Periodic Random Allocation of Products to Inventory Groups

In an embodiment, one or more products are selected at random and allocated to inventory groups (periodically, after each transaction, at random times). This embodiment would tend to keep the inventory groups new and exciting for vending machines with many repeat customers (e.g., vending machines in office buildings). In such an environment, customers may tend to purchase the same products repeatedly. This embodiment thus may positively influence repetitive inventory grouping/allocation patterns by encouraging or indeed requiring customers to try new products.

J. Customers Offered Choice Between One or Two Products; Confirmation Screens

In an embodiment, vending machine transactions are limited to a certain price, and customers are given a choice between one higher price product, and two or more products from two or more inventory groups. For example, transactions may be limited to purchases of $1.25 and for $1.25 customers may purchase either (1) one (large) bottle of soda, or (2) two (small) cans of soda. Further, in an embodiment, vending machines may be configured to output "confirmation screens" in response to a customer's selection so that a customer must confirm her selection through an input device (e.g., a button) before such selections are accepted and the transactions are consummated.

K. Value-Back "Bonuses"

In an embodiment, customers who select two (or more) products as part of a given single-price package offer (e.g., two products for $5) may be offered a "bonus" (e.g., a third product) upon certain conditions (e.g., if certain rules are satisfied). Thus, in some embodiments, when customers select two (or more) products that together represent more than a threshold amount of realizable profit for the machine, such customers are offered a bonus that may be valued at an amount equal to, less than, or greater than the amount of additional realizable profit beyond the threshold amount. For example, if a customer selects two products from an inventory group typically associated with high-margin products, the machine may "give value back" to the customer in the form of a bonus, in order to bolster the goodwill with the customer and hopefully spur future transactions with the customer and favorable recommendations by the customer. Such an embodiment would work particularly well in situations in which a customer selects two products that having retail prices that, when aggregated, are less than the single package price. Thus, the vending machine would not take advantage of the customer's failure to realize the markup.

Bonuses may take many forms, including: (1) printed vouchers or tickets entitling customers to discounts (e.g., for the amount that surpasses the threshold amount) or free products from one or more vending machines in the future; (2) instant cash rebates (e.g., for the amount that surpasses the threshold amount; such amounts may be dispensed through change dispensing apparatus), and (3) extra product(s) (e.g., products which are valued at approximately the amount that surpasses the threshold amount) from the same vending machine or other vending machines.

In an embodiment, where appropriate (e.g., where one or more rules are satisfied, are not satisfied), bonuses may be selected by the customer. For example, the vending machine may output a message to the customer indicating that the customer may "select any additional 'red' flashing product", and the customers selection of a red product causes a unit of the red product to be dispensed. Further, a time limit may be imposed so that if the customer does not so select an appropriate product within a threshold amount of time (e.g., two minutes after the offer is presented), the vending machine may automatically issue a cash rebate, or provide no bonus.

In an embodiment, where appropriate (e.g., where one or more rules are satisfied, are not satisfied), bonuses may be communicated to customers through game-themed content or interface. For example, utilizing a "Price is Right®" game theme, customers may be given the opportunity to "spin" a "value wheel" for a bonus product by pressing a button on a touch screen. Once the customer has pressed the button, a wheel icon may be displayed as spinning on the touch screen, ultimately stopping on an indication of a bonus to be awarded (e.g., a particular product). Many other game themes are contemplated, including "Wheel of Fortune®". Additional and alternate game-themed messages and means for communicating such messages to a customer of a vending machine are described with reference to Applicant's U.S. Patent Application Ser. No. 60/527,899, entitled PRODUCTS AND PROCESSES FOR PROMOTIONS WHICH EMPLOY A VENDING MACHINE, filed Dec. 8, 2003 in the name of Walker et al., the entirety of which is incorporated by reference herein for all purposes.

L. Transaction Status Messages/Screens

In an embodiment in which customers are permitted to choose two or more products for a single price, one or more output devices may be configured to communicate the status of a transaction to a customer. For example, after a customer selects a first product, an indication of the first product may be communicated to the customer via an output device (e.g., an icon of the selected first product may appear on an LCD display). Further, instructions regarding the selection of a second product may be communicated through such output devices. That is, after a customer has selected a first product from a first inventory group, a message may be output to the customer instructing the customer to select a second product from a second inventory group. For example, after selecting a product from a first inventory group (e.g., a product on a first shelf; a product indicated by a "green" flashing light; any product in a first machine), the customer may be instructed to pick a product from a second inventory group (e.g., a product on a second shelf; a product indicated by a "red" flashing light; any product in a second machine).

M. Package Offer Rows

In an embodiment, a vending machine may be configured to dispense two (or more) products from a particular row or other particular location for a single price. Thus, a row of a vending machine may be designated as a "package offer" row, and the vending machine may be configured to consecutively dispense, from such a row, units of two (or more) products upon tender of a package price and selection of a corresponding row identifier (e.g., "A1" may correspond to a package offer row which provides two units of Snickers® candy bars for $1.00). Further, such "package offer" rows may be configured to prevent the dispensing of single units of product for retail prices (i.e. such rows may be exclusively used for package offers).

A package offer row may be stocked with alternating types of products. For example, a Snickers® candy bar may be followed by a Milky Way® candy bar, which is followed by a Snickers® candy bar, and so on. Thus, purchasing from such a package offer row can allow diverse combinations of products (e.g., "A2" may correspond to a package offer row which provides one unit of Snickers® candy bar and one unit of Milky Way® candy bar for $1.00).

In such embodiments, a vending machine may be configured to dispense two (or more) products from a first row for a single price, while dispensing only one product from a second row for a single price. Alternatively, every row in a vending machine may be configured as a "package offer" row.

N. Alternate Methods of Determining and/or Communicating Inventory Groups and/or Package Offers Many alternative methods and rules for determining and/or communicating inventory groups from which customers may pick one or more products are contemplated. In one or more embodiments, inventory groups may be represented by certain numerical values. For example, in one embodiment, a first inventory group may represent a "single item" group, whereas a second inventory group may represent a "1.5 item" group, and yet a third inventory group may represent a "double item" group. The numerical values associated with the inventory groups may be used in determining the number and/or type of products that a customer may receive pursuant to a package offer. For example, if a customer is permitted to select three items, she may pick: (a) three from the first group, (b) two from the second group, or (c) one from the first group and one from the third group.

In one or more embodiments, inventory groups may be determined based on rules that do not necessarily consider revenue or profit potential. Thus, in one or more embodiments, inventory groups may be determined based on rules that do not necessarily or directly consider value ratings. For example, in one or more embodiments, an inventory group may be comprised of "trial" products. For example, a certain product manufacturer (e.g., Procter & Gamble) may wish to provide customers with free sample-size products when they purchase other products at full retail prices.

Further, in one or more embodiments, external events may influence the composition of one or more inventory groups. For example, if the temperature changes (as determined by a sensor operatively connected to a processor), an inventory group may be altered. By way of another example, if a certain sports team wins a certain game (e.g., as recorded in a database), an inventory group may be altered.

Further still, in one or more embodiments, inventory groups may be determined with respect to nutritional attributes of one or more products. For example, in one or more "reactive" inventory grouping embodiments, the second set of products from which the customer may choose may be determined based on the nutritional content of the first selected product. Thus, in one reactive inventory grouping embodiment, relatively healthy options may be presented to the customer as a second choice should the customer initially select a perhaps unhealthy first choice. By way of another example, a numeric limit may be set so that customer may not exceed X calories, Y grams of fat, Z carbs or Q Weight Watcher's points in a given transaction. Thus, inventory groups may be configured (e.g., dynamically) so that customers cannot pick combinations of products that exceed the numeric limit(s). For example, in one "reactive" inventory grouping embodiment, if a customer is only permitted to receive products having a total of 300 calories, the customer may be shown products having 100 or less calories if she initially picks a product having 200 calories.

In one or more reactive inventory grouping embodiments, after a customer selects one or more items from a first inventory group pursuant to a package offer, the second inventory group may be revealed or made apparent to the customer through the concealing of items in the first inventory group. For example, after a customer picks a first product, the machine may actuate (e.g., mechanically) covers located proximate to items in the first inventory group (e.g., on each column) so that after, as a result, only items in the second inventory group may be visible to a customer and/or vendable by the machine. Or, in another embodiment, a vending machine may turn off lights associated with items in the first inventory group so that only lights associated with the second inventory group remain illuminated after the customer selects one or more items from the first inventory group.

In one or more embodiments, inventory groups may be communicated to a customer's device, such as via email, SMS messaging, or otherwise.

In one or more embodiments, some or all of the specific eligible package instances may be communicated to customers (e.g., on a vending machine's touch screen; on a customer's cell phone; via email or website), in lieu of or in addition to the communication of inventory group information. Such an embodiment may be a convenient, visually efficiently way to communicate package offer and inventory group information to customers, as it would function to show customers which specific package instances are available pursuant to a package offer, rather than requiring customers to determine whether or not certain potential packages instances are eligible (e.g., whether certain products are in first and/or second inventory groups).

In one or more embodiments, inventory group information is communicated to customers (e.g., on a vending machine's touch screen; on a customer's cell phone; via email or website) in a manner such that inventory groups and the items allocated to such inventory groups are visual separated or otherwise distinguished from other inventory groups and items allocated thereto. Such an embodiment may be a convenient, visually efficient way to communicate package offer and inventory group information to customers, as it would function to readily show customers inventory groups from which they may select component products.

O. Redemption of Second Item at a Retail Establishment

In one or more embodiments, after first transacting with a vending machine, a customer may select and/or redeem one or more products, pursuant to a package offer, at a retail establishment.

For example, in one or more embodiments, after first accepting a package offer, a customer may receive a code or token, for example as described with reference to the multi-machine embodiments described herein. The customer may in turn present the code or token to a retailer, who may permit the customer to select one or more products from one or more inventory groups pursuant to a package offer. The retail establishment may employ a point-of-sale terminal or other device to validate the token or code, such as by querying a local or remote database to determine if the code was validly issued.

In one or more embodiments, after selecting and/or receiving a first product from a vending machine pursuant to a package offer, a customer may receive a code or token, for example as described with reference to the multi-machine embodiments described herein. After receiving the code or token, the customer may present the code or token to a retail establishment in order to select and/or receive a second item pursuant to the package offer. The retail establishment may employ a point-of-sale terminal or other device to validate the token or code, such as by querying a local or remote database to determine if the code was validly issued.

Further still, in one or more embodiments, after accepting a package offer and selecting two or more products from two or more inventory groups, a customer may be issued a code by a vending machine. The customer may, in turn, present the code to a retailer to redeem the two or more selected products. The retail establishment may employ a point-of-sale terminal or other device to validate the token or code, such as by querying a local or remote database to determine if the code was validly issued.

VI. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment"and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising"and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Some embodiments can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present disclosure.

What is claimed is:

1. A method, comprising:
providing, by at least one vending machine, a package offer comprising an offer to buy at least a first component product from a first inventory group and a second component product from a second inventory group for a single price, wherein the first and second component products are indicated as being associated with the first and second inventory groups via first and second placements of the first and second component products, respectively;
receiving, at the at least one vending machine, an indication of a selection by a customer of the first component product from the first inventory group; and
processing, based at least in part on the receiving of the indication of the customer's selection of the first component product from the first inventory group, a sale, for a single price, of (i) a unit of the first component product from the first inventory group and (ii) a unit of the second component product from the second inventory group.

2. The method of claim 1, further comprising:
defining the first and second inventory groups.

3. The method of claim 2, wherein the defining comprises:
selecting the first and second component products from a population of all products available for sale via the at least one vending machine.

4. The method of claim 3, wherein the selecting comprises:
determining a value rating for each of the products of the population of products available for sale at the at least one vending machine;
ranking the population of products available for sale at the at least one vending machine based on the respective value ratings; and
selecting the first and second component products from the population of all of the products available for sale via the at least one vending machine based on the respective rankings of the first and second component products.

5. The method of claim 3, wherein the selecting is conducted by an operator of the at least one vending machine and wherein the first and second placements are selected by the operator.

6. The method of claim 1, wherein the at least one vending machine comprises a first vending machine and a second vending machine, and wherein the first placement comprises a placement in the first vending machine and the second placement comprises a placement in the second vending machine.

7. The method of claim 1, wherein the sale is conducted by debiting an amount from a pre-paid unit account associated with the customer.

8. The method of claim 7, wherein the pre-paid unit account associated with the customer comprises a pre-paid unit subscription account.

9. The method of claim 1, wherein the providing is conducted in response to the receiving of the indication of the selection by the customer of the first component product from the first inventory group.

10. The method of claim 9, further comprising:
receiving, at the at least one vending machine, an indication of a selection by the customer of the second component product from the second inventory group.

11. The method of claim 10, wherein the processing is further based at least in part on the receiving of the indication of the selection by the customer of the second component product from the second inventory group.

12. The method of claim 1, further comprising:
receiving, at the at least one vending machine, an indication of a selection by the customer of a product that is not associated with the second inventory group.

13. The method of claim 12, further comprising:
notifying the customer that the customer must pick a product from the second inventory group.

14. The method of claim 12, further comprising:
providing an offer to the customer that allows the customer to purchase the product instead of the second component product, for a price in addition to the single price.

15. The method of claim 1, wherein the first inventory group comprises a first category of products and the second inventory group comprises a second category of products that is different than the first category of products.

16. The method of claim 15, wherein the first and second categories of products comprise one or more of (i) a snack category, (ii) a drink category, (iii) a candy bar category, (iv) a diet drink category, and (v) a brand category.

17. The method of claim 1, wherein the providing is conducted in response to a determination of a customer identifier associated with the customer.

18. The method of claim 1, further comprising:
receiving an indication of an acceptance, by the customer, of the package offer.

19. The method of claim 18, wherein the processing is further based at least in part on the receiving of the indication of the acceptance of the package offer by the customer.

20. The method of claim 18, wherein the receiving of the indication of the acceptance of the package offer by the customer comprises determining that the customer has interfaced with an input device associated with the package offer.

21. The method of claim 1, wherein the first placement comprises a placement in one or more first particular columns of the at least one vending machine, and wherein the second placement comprises a placement in one or more second particular columns of the at least one vending machine.

22. A method, comprising:
providing, by at least one vending machine, a package offer comprising an offer to buy at least a first component product from a first inventory group and a second component product from a second inventory group for a single price, wherein the first and second component products are indicated as being associated with the first and second inventory groups via first and second physical indicia associated with the first and second component products, respectively;
receiving, at the at least one vending machine, an indication of a selection by a customer of the first component product from the first inventory group; and
processing, based at least in part on the receiving of the indication of the customer's selection of the first component product from the first inventory group, a sale, for a single price, of (i) a unit of the first component product from the first inventory group and (ii) a unit of the second component product from the second inventory group.

23. The method of claim 22, further comprising:
defining the first and second inventory groups.

24. The method of claim 23, wherein the defining comprises:
selecting the first and second component products from a population of all products available for sale via the at least one vending machine.

25. The method of claim 24, wherein the selecting comprises:
determining a value rating for each of the products of the population of products available for sale at the at least one vending machine;
ranking the population of products available for sale at the at least one vending machine based on the respective value ratings; and
selecting the first and second component products from the population of all of the products available for sale via the at least one vending machine based on the respective rankings of the first and second component products.

26. The method of claim 24, wherein the selecting is conducted by an operator of the at least one vending machine and wherein the first and second physical indicia are selected by the operator.

27. The method of claim 22, wherein the first and second physical indicia comprise one or more of (i) a sticker, (ii) a sign, (iii) a price tag, (iv) an RFID tag, and (v) an LED device.

28. The method of claim 22, wherein the sale is conducted by debiting an amount from a pre-paid unit account associated with the customer.

29. The method of claim 28, wherein the pre-paid unit account associated with the customer comprises a pre-paid unit subscription account.

30. The method of claim 22, wherein the providing is conducted in response to the receiving of the indication of the selection by the customer of the first component product from the first inventory group.

31. The method of claim 30, further comprising:
receiving, at the at least one vending machine, an indication of a selection by the customer of the second component product from the second inventory group.

32. The method of claim 31, wherein the processing is further based at least in part on the receiving of the indication of the selection by the customer of the second component product from the second inventory group.

33. The method of claim 22, further comprising:
receiving, at the at least one vending machine, an indication of a selection by the customer of a product that is not associated with the second inventory group.

34. The method of claim 33, further comprising:
notifying the customer that the customer must pick a product from the second inventory group.

35. The method of claim 33, further comprising:
providing an offer to the customer that allows the customer to purchase the product instead of the second component product, for a price in addition to the single price.

36. The method of claim 22, wherein the first inventory group comprises a first category of products and the second inventory group comprises a second category of products that is different than the first category of products.

37. The method of claim 36, wherein the first and second categories of products comprise one or more of (i) a snack category, (ii) a drink category, (iii) a candy bar category, (iv) a diet drink category, and (v) a brand category.

38. The method of claim 22, wherein the providing is conducted in response to a determination of a customer identifier associated with the customer.

39. The method of claim 22, further comprising:
receiving an indication of an acceptance, by the customer, of the package offer.

40. The method of claim 39, wherein the processing is further based at least in part on the receiving of the indication of the acceptance of the package offer by the customer.

41. The method of claim 39, wherein the receiving of the indication of the acceptance of the package offer by the customer comprises determining that the customer has interfaced with an input device associated with the package offer.

42. The method of claim 22, wherein the first placement comprises a placement in one or more first particular columns of the at least one vending machine, and wherein the second placement comprises a placement in one or more second particular columns of the at least one vending machine.

43. A method, comprising:
providing, by at least one vending machine, a package offer comprising an offer to buy a number of products associated with a non-price numerical limit, for a single price;
receiving, at the at least one vending machine, an indication of a selection by a customer of a first component product associated with a first non-price numerical value;
determining, by the at least one vending machine, by subtracting the first non-price numerical value from the non-price numerical limit, a remaining non-price numerical value;
determining, by the at least one vending machine, at least one second component product that is associated with a second non-price numerical value that is less than or equal to the remaining non-price numerical value; and
providing, to the customer and by the at least one vending machine, an opportunity to purchase the at least one second component product along with the first component product, for the single price.

44. The method of claim 43, further comprising:
receiving, at the at least one vending machine, an indication of a selection by the customer of the second component product;
determining, by the at least one vending machine, by subtracting the second non-price numerical value from the remaining non-price numerical value, that the non-price numerical limit has been reached; and
processing, based at least in part on the determining that the non-price numerical limit has been reached, a sale, for the single price, of (i) a unit of the first component product and (ii) a unit of the second component product.

45. The method of claim 43, further comprising:
receiving, at the at least one vending machine, an indication of a selection by the customer of the second component product;
determining, by the at least one vending machine, by subtracting the second non-price numerical value from the remaining non-price numerical value, a new remaining non-price numerical value;
determining, by the at least one vending machine, at least one third component product that is associated with a third non-price numerical value that is less than or equal to the new remaining non-price numerical value; and
providing, to the customer and by the at least one vending machine, an opportunity to purchase the at least one third component product along with the first and second component products, for the single price.

46. The method of claim 43, wherein the non-price numerical limit comprises a calorie limit and the non-price numerical values comprise calorie values.

47. The method of claim 43, wherein the non-price numerical limit comprises a fat limit and the non-price numerical values comprise fat values.

48. The method of claim 43, wherein the non-price numerical limit comprises a carbohydrate limit and the non-price numerical values comprise carbohydrate values.

49. The method of claim 43, wherein the non-price numerical limit comprises a unit limit and the non-price numerical values comprise unit values.

* * * * *